United States Patent
Kawada

(10) Patent No.: US 6,640,002 B1
(45) Date of Patent: Oct. 28, 2003

(54) IMAGE PROCESSING APPARATUS

(75) Inventor: Tousuke Kawada, Chiryu (JP)

(73) Assignee: Fuji Machine Mfg. Co., Ltd., Chiryu (JP)

( * ) Notice: Subject to any disclaimer, the term of this patent is extended or adjusted under 35 U.S.C. 154(b) by 0 days.

(21) Appl. No.: 09/317,845

(22) Filed: May 25, 1999

(30) Foreign Application Priority Data

Jun. 10, 1998 (JP) ............................................. 10-162459

(51) Int. Cl.[7] .................................................. G06K 9/00
(52) U.S. Cl. ........................ 382/141; 382/209; 382/266; 348/87
(58) Field of Search ................................ 382/161, 209, 382/219, 217, 218, 143, 144, 199, 148, 288, 112, 151, 305, 145, 149; 702/35; 356/237.1; 348/87, 9; 345/87

(56) References Cited

U.S. PATENT DOCUMENTS

| | | | |
|---|---|---|---|
| 4,399,554 A | 8/1983 | Perkins, III et al. | 382/141 |
| 4,536,856 A | 8/1985 | Hiroishi | 345/87 |
| 4,581,762 A * | 4/1986 | Lapidus et al. | 382/263 |
| 4,782,238 A * | 11/1988 | Radl et al. | 250/559.36 |
| 5,012,524 A * | 4/1991 | Le Beau | 382/151 |
| 5,136,661 A | 8/1992 | Kobayasi et al. | 382/288 |
| 5,168,530 A * | 12/1992 | Peregrim et al. | 382/199 |
| 5,280,530 A * | 1/1994 | Trew et al. | 348/169 |
| 5,515,159 A | 5/1996 | Sites et al. | 356/237.1 |
| 5,566,251 A * | 10/1996 | Hanna et al. | 382/284 |
| 5,586,058 A | 12/1996 | Aloni et al. | 702/35 |
| 5,754,677 A | 5/1998 | Kawada | 382/141 |
| 5,805,722 A * | 9/1998 | Cullen et al. | 382/146 |
| 5,911,001 A * | 6/1999 | Kawada | 382/141 |
| 6,141,433 A * | 10/2000 | Moed et al. | 382/103 |
| 6,167,167 A * | 12/2000 | Matsugu et al. | 382/283 |
| 6,252,985 B1 * | 6/2001 | Mitsunaga et al. | 382/283 |
| 6,330,352 B1 * | 12/2001 | Ishikawa et al. | 382/141 |

* cited by examiner

Primary Examiner—Jayanti K. Patel
Assistant Examiner—Sheela Chawan
(74) Attorney, Agent, or Firm—Oliff & Berridge, PLC

(57) ABSTRACT

An image processing apparatus, including an image taking device which takes an image of an object, an image-data memory in which image data representing the taken image of the object is stored, a negative-search-line producing device which produces one or more negative search lines which are expected not to intersect an edge of the image of the object represented by the image data, an optical characteristic of the image significantly changing at the edge, and a judging device which judges whether one or more negative search lines intersect the edge of the image of the object.

25 Claims, 48 Drawing Sheets

```
PRELIMINARY-PROCESSING PROGRAM
begin
    while (for each object to be image-processed)
        if (pattern matching is carried out) then
            while (a master seek template is rotated by changing a rotation angle
                    to every 5 degrees from -45 degrees to +45 degrees)
                individual seek templates are produced based on the master
                seek template
            endwhile
        endif
    endwhile
end
```

FIG. 14

```
IMAGE-PROCESSING PROGRAM
begin
    if (an object is to be image-processed by only a pattern matching) then
        image processing is carried out by the pattern matching ()
    else if (an object is to be image-processed by the combination of pattern matchings) then
        image processing is carried out by a pattern matching manager ()
    else if (an object is to be image-processed on a virtual screen) then
        image processing is carried out on a virtual screen ()
    else
        image processing is carried out on a physical screen ()
    endif
end
```

FIG. 15

```
    PATTERN-MATCHING PROGRAM
begin
    a search window is set
    while (each individual seek template is moved on a rectangular spiral within the search
            window)
        while (for each of individual seek templates having rotation angles of every 5 degrees
                from -45 to 45 degrees)
            if (OK==seek step () ) then
                if (OK==re-seek step () ) then
                    if (OK==measure step () ) then
                        if (OK==re-measure step () ) then
                            if (OK==inspect step () ) then
                                return (CHECK_OK_)    // normal end
                            else
                                return (CHECK_NG_)    // abnormal end
                            endif
                        endif
                    endif
                endif
            endif
        endwhile
    endwhile
    return (ERROR)    // abnormal end
end
```

FIG. 16

```
1   %tplModel{} {
2          %find {
3                  _failCount=0;
4                  _diffRate=0.9
5                  %common{_hs=5.5,_l l=200,_,diff=20,_vf=PA} {
6                          //  LEFT/RIGHT-EDGE CHECK
7                          %linePair {_x= 32.5        _y= 27.5        _angle=0}
8                          %linePair {_x= 32.5        _y=-27.5        _angle=0}
9                          //  UPPER/LOWER-EDGE CHECK
10                         %linePair {_x= 27.5        _y= 32.5        _angle=90}
11                         %linePair {_x=-27.5        _y= 32.5        _angle=90}
12                 }
13                 _pitchX=2.2;
14                 _pitchY=2.2;
15                 _pitchA=4.5;
16                 _startA=-45;
17                 _endA=45;
18         }
19         %measure{
20                 _failCount=0;
21                 %common{_hs=3.5,_l l=200,_vf=PA} {
22                         // LEFT/RIGHT-EDGE CHECK
23                         %linePair{_x=32.5,         _y=29.0,         _angle=0}
24                         %linePair{_x=32.5,         _y=14.5,         _angle=0}
25                         %linePair{_x=32.5,         _y= 0.0,         _angle=0}
26                         %linePair{_x=32.5,         _y=-14.5,        _angle=0}
27                         %linePair{_x=32.5,         _y=-29.0,        _angle=0}
28                         // UPPER/LOWER-EDGE CHECK
29                         %linePair{_x=29.0,         _y=32.5,         _angle=90}
30                         %linePair{_x=14.5,         _y=32.5,         _angle=90}
31                         %linePair{_x= 0.0,         _y=32.5,         _angle=90}
32                         %linePair{_x=-14.5,        _y=32.5,         _angle=90}
33                         %linePair{_x=-29.0,        _y=32.5,         _angle=90}
34                 }
35         }
36         %inspect{
37                 %common{_hs=1.0,_l l=300} {
38                         %line{_x=35.0,         _y=35.0,         _angle=0}
39                         %line{_x=35.0,         _y=34.5,         _angle=0}
40                         %line{_x=35.0,         _y=34.0,         _angle=0}
                                  ⋮              ⋮                ⋮
                               %line{_x=35.0,    _y=35.0,         _angle=-90,_hs=35.0,_vf=E}
                               %line{_x=37.0,    _y=35.0,         _angle=-90,_hs=35.0,_vf=E}

```
 1   %tplMode{} {
 2       %find{
 3           _failCount=0;
 4           _diffRate=0.9;
 5           // STRAIGHT-EDGE CHECK
 6           %common{_x=29.0,_hs=3.7,_l l=200,_diff=20,_vf=PA} {
 7                   %line{_y= 15.0,          _angle=0}
 8                   %line{_y=  7.5 ,         _angle=0}
 9                   %line{_y=  0.0 ,         _angle=0}
10                   %line{_y= -7.5 ,         _angle=0}
11                   %line{_y=-15.0,          _angle=0}
12           }
13           // CIRCULAR-EDGE CHECK
14           %common{_pos=POLAR, _r=35.0,_hs=3.7,_l l=200,_diff=20,_vf=P} {
15                   %linePair{_q= 35.0,      _angle=_q}
16                   %linePair{_q=-35.0,      _angle=_q}
17                   %linePair{_q= 90.0,      _angle=_q}
18                   %line     {_q=180.0,_angle=q}
19           }
20           _pitchX=1.48;
21           _pitchY=1.48;
22           _pitchA=5.5;
23           _startA=-180;
24           _endA=180;
25       }
26       %measure{
27           _failCount=0;
28           // STRAIGHT-EDGE CHECK
29           %common{_x=29.0,_hs=1.8,_l l=200,_diff=20,_vf=PA} {
30                   %line{_y=15.0,           _angle=0}
31                   %line{_y=10.0 ,          _angle=0}
32                   %line{_y= 5.0 ,          _angle=0}
33                   %line{_y= 0.0 ,          _angle=0}
34                   %line{_y= -5.0,          _angle=0}
35                   %line{_y=-10.0 ,         _angle=0}
36                   %line{_y=-15.0,          _angle=0}
37           }
38           // CIRCULAR-EDGE CHECK
39           %common{_pos=POLAR, _r=35.0,_hs=1.8,_l l=200,_diff=20,_vf=P} {
40                   %linePair{_q= 35.0,      _angle=_q}
41                   %linePair{_q=-35.0,      _angle=_q}
42                   %linePair{_q= 65.0,      _angle=_q}
43                   %linePair{_q=-65.0,      _angle=_q}
44                   %linePair{_q= 90.0,      _angle=_q}
45
46                   %line    {_q= 165.0,     _angle=_q}
47                   %line    {_q=-165.0,     _angle=_q}
48                   %line    {_q= 180.0,     _angle=_q}
49           }
50       }
51       %inspect{
52           %common{_hs=1.8,_l l=300} {
53                   %line{_x=29.0,   _y=15.0,        _angle=0}
54                   %line{_x=29.0,   _y=14.0,        _angle=0}
55                   %line{_x=29.0,   _y=13.0,        _angle=0}
                              ⋮         ⋮              ⋮
             }
         }
     }
```

| P1 | P2 | P3 | P4 | P5 | P6 | P7 | P8 | P9 | P10 | P11 | P12 | P13 | P14 | P15 |
|---|---|---|---|---|---|---|---|---|---|---|---|---|---|---|
| 63 | 65 | 68 | 73 | 80 | 89 | 100 | 112 | 124 | 136 | 145 | 153 | 158 | 161 | 164 |

FIG. 30

| − | + |
|---|---|

FIG. 31

| − | − | − | − | + | + | + | + |
|---|---|---|---|---|---|---|---|

|      | UPPER | LOWER |       | LEFT | RIGHT |
|------|-------|-------|-------|------|-------|
| 0°   | −     | +     | 90°   | −    | +     |
| 180° | +     | −     | −90°  | +    | −     |

IMAGE PROCESSING APPARATUS

BACKGROUND OF THE INVENTION

1. Field of the Invention

The present invention relates to an image processing apparatus or an object inspecting apparatus which obtains information relating to an object by processing image data representing an image of the object taken by an image taking device, and to a recording medium on which an image-processing or object-inspecting control program is recorded.

2. Related Art Statement

An example of the above-indicated image processing apparatus is disclosed in U.S. Pat. No. 5,754,677. The prior image processing apparatus measures, by using a seek template and a measure template, a position, a rotation angle, and at-least one dimension of an object. The position of the object being image-processed is expressed in terms of the coordinates of a specific point of the object, such as the center point of the object, or an arbitrarily designated point of the object. The rotation angle of the object is expressed in terms of the angle of rotation of the object from its reference rotation position. The seek template includes a plurality of pairs of points. It is a general rule that when one of the two points of each pair out of the pairs is located inside an outline of the object and the other point of the each pair is located outside the outline, the processing apparatus judges that the object being image-processed is an object being sought by the seek template. To this end, the pairs of points defining the seek template are determined based on the shape of the outline of the object. However, in the case where it is known in advance that the position and/or rotation angle of the object may greatly vary, the processing apparatus repeatedly judges whether the object is an object being sought, while changing the position and/or rotation angle of the seek template. In this case, the processing apparatus produces a master seek template based on the outline of a reference object which has one or more reference dimensions and which takes reference position and rotation angle. Then, the processing apparatus produces various individual seek templates by changing the position and/or rotation angle of the master seek template, and virtually superposes each of the individual seek templates on a screen on which the image of the object is present. If any one of the individual seek templates satisfies the above-indicated rule, the processing apparatus judges that the object being image-processed is an object being sought. The object being image-processed or the object being sought may be a single, independent article as a whole, a portion of an article, or a projection, a hole, or a character present on an outer surface of an article. In the case where an object being sought has a simple shape, such as a quadrangle or a circle, a seek template including a small number of pairs of points is used. On the other hand, in the case where an object having a complex shape is sought, it is needed to use a seek template including a great number of pairs of points.

If the object being image-processed is judged as an object being sought, then the image processing apparatus measures, by using a measure template, the position, rotation angle, and/or dimensions of the object. In this connection, the object being image-processed that is judged as an object being sought is deemed as an object being measured. The image processing apparatus automatically produces the measure template based on the seek template with which the object being image-processed is judged as an object being sought. The simplest measure template is defined by a plurality of straight segments each of which connects between the two points of a corresponding one pair out of the pairs of points defining the seek template. As far as the present application is concerned, those straight segments are referred to as the "search lines". The processing apparatus determines respective points at which the search lines intersect the outline of the object being measured. In the case where an optical characteristic (e.g., degree of lightness) of an image of the object differs from that of an image of the background of the object, the luminance of the two images significantly changes at the positions of the outline of the object. The positions where the luminance significantly changes will be referred as the "edge" of the object, and respective points where the search lines intersect the edge will be referred to as the "edge points". That the luminance significantly changes at the edge of an object being measured means that the rate of change of the luminance is greater than a predetermined value at the edge. In many cases, the outline of an object being measured is determined as the edge of the object. In those cases, the image processing apparatus can measure the position, rotation angle, and/or dimensions of the object, by using the measure template, i.e., by obtaining the set of the edge points present on the outline of the object. In the case where an object being measured has a simple shape, such as a quadrangle or a circle, a measure template including a small number of search lines is used. On the other hand, in the case where an object having a complex shape is measured, it is needed to use a measure template including a great number of search lines. In addition, in many cases, the number of search lines included in a measure template is greater than the number of pairs of points included in a seek template.

However, an image of an object may have an edge at positions where an optical characteristic (e.g., color) of the image other than degree of lightness significantly changes. In the above description, it is assumed for easier understanding purposes only that the two points of each pair out of the pairs of points of a seek template are located inside and outside the outline of the object, respectively, and the search lines of a measure template intersect the outline of the object. In fact, the search lines have only to intersect the edge of the object, and the two points of each pair have only to be located on both sides of the edge, respectively. In the above description, it is also assumed for easier understanding purposes only that the image processing apparatus performs, one time, a measurement using a measure template. However, in many cases, the processing apparatus performs two or more measurements using respective measure templates. In those cases, after the processing apparatus performs one measurement using one measure template, the apparatus additionally produces a new measure template including a greater number of search lines, or a new measure template having a smaller positional error with respect to the object being measured, and performs a more accurate measurement using the new measure template.

As is apparent from the foregoing description, the image processing apparatus can quickly seek, using a seek template, an object and quickly measure, using a measure template, a position, a rotation angle, and/or one or more dimensions of the object, even if the position and/or rotation angle of the object may be greatly deviated from its expected position and rotation angle.

SUMMARY OF THE INVENTION

It is an object of the present invention to provide an image processing apparatus or an object inspecting apparatus which further improves the above-described image processing apparatus.

It is another object of the present invention to provide a recording medium on which an image-processing control program or an object-inspecting control program is recorded.

The present invention provides an image processing apparatus, an object inspecting apparatus, and a recording medium which have one or more of the technical features that are described below in respective parenthesized sequential numbers (1) to (19). Any technical feature which includes another technical feature shall do so by referring, at the beginning, to the parenthesized sequential number given to that technical feature. Thus, two or more of the following features may be combined, if appropriate. Each technical feature may be accompanied by a supplemental explanation, as needed. However, the following technical features and the combinations thereof are just examples to which the present invention is by no means limited.

(1) According to a first feature of the present invention, there is provided an image processing apparatus, comprising an image taking device which takes an image of an object; an image-data memory in which image data representing the taken image of the object is stored; negative-search-line producing means for producing at least one negative search line which is expected not to intersect an edge of the image of the object represented by the image data, an optical characteristic of the image significantly changing at the edge; and judging means for judging whether the at least one negative search line intersects the edge of the image of the object. That the optical characteristic of the image significantly changes at the edge means, for example, that the rate of change of the optical characteristic of the image is greater than a reference value at the edge. The previously-described prior image processing apparatus uses a measure template including "positive" search lines which are expected to intersect an edge of an image. Since the present image processing apparatus uses one or more "negative" search lines which are expected not to intersect any edges of an image, it can do what could not have been done by the prior apparatus. The negative search lines may be used for inspecting a component or a part for finding one or more possible defects such as a scar occurring to its outer surface, or dirt adhered to the outer surface. For example, in the case where a component is inspected for finding a scar possibly occurring to its horizontal, rectangular outer surface, a number of negative search lines are superposed on an area inside the outline of image of the outer surface and it is judged whether at least one of the search lines intersects at least one edge of the image. For example, if a dark image of a scar or dirt is present in a light image of the outer surface, the outline of the scar or the dirt provides an edge of the images. Since the negative search lines are located inside the outline of image of the outer surface, they are expected not to intersect any edges of the image. However, if there is a scar or dirt on the outer surface, the negative search lines may intersect the image of the scar or the dirt and accordingly may intersect the edge of the image. Therefore, it is possible to judge whether there is a scar or dirt on an outer surface being inspected, by judging whether there is, on each of the negative search lines, an edge point where, e.g., luminance significantly changes. In order to distinguish search lines used for inspecting an object for finding one or more possible defects, from those used for measuring a position, a rotation position, and/or at least one dimension of an object, the former lines will be referred to as inspecting search lines and the latter lines will be referred to as measuring search lines. Negative search lines can be used as not only inspecting search lines but also seeking search lines for seeking an object as will be explained in detailed description of preferred embodiments. In addition, positive search lines can be used as not only measuring search lines but also seeking search lines for seeking an object and inspecting search lines for finding a defect of an object. In the last case, the judging means may judge whether one or more positive search lines intersect an edge of an image of an object and, based on the positive or negative judgment, judge whether an object being image-processed is an object being sought, and/or judge whether an object being image-processed has a defect.

(2) According to a second feature of the present invention that includes the first feature (1), the image processing apparatus further comprises a measuring device which measures at least one of a position, a rotation angle, and a dimension of the object, and the negative-search-line producing means produces the at least one negative search line based on the measured one of the position, the rotation angle, and the dimension of the object. As described above, the negative search lines are expected not to intersect the edge of the image. Accordingly, in the case where the negative search lines are used for inspecting an object for finding its scar or dirt, it is usually needed to know a position, a rotation angle, and/or at least one dimension of the object. In a particular case where an object being inspected has accurate known dimensions and is accurately positioned at known position and rotation angle, the measuring device may be omitted. However, in the case where an object (being image-processed before being judged as an object being sought) has inaccurate dimensions or is not accurately positioned at known position and rotation angle, it is needed to measure an inaccurate one or ones of the dimensions, position, and rotation angle of the object, before the negative search lines are produced. Thus, the image processing apparatus including the measuring device can inspect an object for finding its possible defect, even if the object may not have accurate dimensions or may not be accurately positioned at known position and rotation angle.

(3) According to a third feature of the present invention that includes the first or second feature (1) or (2), the image processing apparatus further comprises positive-search-line producing means for producing at least one positive search line which is expected to intersect the edge of the image of the object represented by the image data. Since the present image processing apparatus can use both the negative and positive search lines, the apparatus can seek or inspect an object with improved degree of freedom, reliability, and/or efficiency, as compared with the case where either the negative or positive search lines are used.

(4) According to a fourth feature of the present invention that includes the third feature (3), the judging means judges, when the at least one negative search line does not intersect the edge of the image of the object and simultaneously when the at least one positive search line intersects the edge of the image of the object, that the object is an expected object. The present image processing apparatus can seek an object with still improved reliability and efficiency. For example, in the case where a plurality of identical objects are arranged in an array, the present apparatus can quickly seek a particular one of the identical objects. Providing that three identical circular objects are arranged in a horizontal array at a regular interval, the present apparatus can easily seek, for example, the right-hand-side end one of the three circular objects, by first producing a vertical positive search line and a vertical negative search line distant rightward from the positive search line by the same distance as the regular interval, then moving the two search lines relative to the three circular objects, and finally identifying, as the right-hand-side end circular object being sought, one of the three circular objects whose edge is intersected by the positive search line and is not intersected by the negative search line.

(5) According to a fifth feature of the present invention, there is provided a recording medium on which an image-processing control program is recorded which is readable by a computer and is usable by the computer to process image data representing an image of an object taken by an image taking device, the image data being stored in an image-data memory, the program comprising the steps of producing at least one negative search line which is expected not to intersect an edge of the image of the object represented by the image data, an optical characteristic of the image significantly changing at the edge, and judging whether the at least one negative search line intersects the edge of the image of the object. The image processing apparatus according to the first feature (1) may be provided by the combination of the present recording medium and a computer.

(6) According to a sixth feature of the present invention, there is provided an object inspecting apparatus, comprising an image taking device which takes an image of an object; an image-data memory in which image data representing the taken image of the object is stored; search-line producing means for producing at least one of (a) at least one negative search line which is expected not to intersect an edge of the image of the object represented by the image data, an optical characteristic of the image significantly changing at the edge, and (b) at least one positive search line which is expected to intersect the edge of the image; and inspection judging means for judging that the object passes the inspection, when a condition is satisfied that when the at least one negative search line is produced, the at least one negative search line does not intersect the edge of the image of the object and/or, when the at least one positive search line is produced, the at least one positive search line intersects the edge of the image of the object, and judging that the object does not pass the inspection, when the condition is not satisfied. The previously-described prior image processing apparatus uses search lines exclusively for measuring an object being image-processed. In contrast, the present object inspecting apparatus uses search lines for inspecting an object being image-processed. Thus, the claimed invention widens the width or range of use of the search lines.

(7) According to a seventh feature of the present invention that includes the sixth feature (6), the object inspecting apparatus further comprises a measuring device which measures at least one of a position, a rotation angle, and a dimension of the object, and the search-line producing means produces the at least one of (a) the at least one negative search line and (b) the at least one positive search line, based on the measured one of the position, the rotation angle, and the dimension of the object. The present object inspecting apparatus can inspect, without any problems, an object which may not have a constant dimensions or may not be positioned at constant position and rotation angle.

(8) According to an eighth feature of the present invention that includes the sixth or seventh feature (6) or (7), the at least one of (a) the at least one negative search line and (b) the at least one positive search line comprises at least one finite line having opposite ends. In a particular case, a negative or positive search line may be provided by a line having at least one infinite end (in fact, the infinite end is limited or cut by the boundaries or outer frame of the image-process area). However, in many cases, the negative and positive search lines are provided by finite lines each having opposite ends. Each of the eighth to fifteenth features may be combined with each of the image processing apparatus according to the first feature (1), the object inspecting apparatus according to the seventeenth feature (17), the recording medium according to the fifth feature (5), and the recording medium according to the sixteenth feature (16).

(9) According to a ninth feature of the present invention that includes the eighth feature (8), the at least one finite line comprises at least one straight segment. Negative and/or positive search lines provided by straight segments are the simplest and are very useful.

(10) According to a tenth feature of the present invention that includes any one of the sixth to ninth features (6) to (9), the at least one of (a) the at least one negative search line and (b) the at least one positive search line comprises at least one closed line. In the case where the present apparatus inspects an object whose image is taken as having a circular outline, it is preferable to employ circular negative or positive search lines.

(11) According to an eleventh feature of the present invention that includes any one of the sixth to tenth features (6) to (10), the image taking device comprises a plurality of image-take elements each of which produces an electric signal representing an optical characteristic value of a corresponding one of a plurality of picture elements of the image of the object, the image-data memory stores, as the image data, the respective optical characteristic values represented by the respective electric signals produced by the image-take elements, such that each of the respective optical characteristic values is associated with a position of a corresponding one of the picture elements in the image of the object, and the apparatus further comprises a virtual-point designator which designates an arbitrary virtual point on a virtual screen corresponding to a physical screen defined by the image data stored in the image-data memory; and virtual-point-data calculating means for calculating an optical characteristic value of the designated virtual point based on the respective optical characteristic values of at least two picture elements of the image that correspond to the designated virtual point, and the search-line producing means produces, on the virtual screen, the at least one of (a) the at least one negative search line and (b) the at least one positive search line. In the case where the image taking device of the object inspecting apparatus that includes any one of the sixth to tenth features (6) to (10) takes an image of an object, an image-take surface of the image taking device may be divided into many picture elements, and many sets of picture-element data corresponding to the picture elements may be produced as the image data and stored in the image-data memory. However, the phrase "the image of, the object represented by the image data" used in the first feature (1) just means the image of the object obtained based on the image data. Accordingly, the image may be either a "discrete-type" image which is defined by a matrix of picture elements having respective optical characteristic values, or a "continuous-type" image which is not defined by any picture elements but whose arbitrary point has an optical characteristic value. The "discrete-type" image may be an image taken by the image taking device which includes a matrix of image-take elements each of which produces an electric signal representing an optical characteristic value of a corresponding one of a matrix of picture elements of the image. The discrete-type image can be said as a physical image because it is physically formed on the image-take surface defined by the matrix of image-take elements. The screen on which the physical image is present is referred to as the "physical" screen. The physical screen coincides with the image-take surface. Image data representing the physical image may be stored in the image-data memory, such that each of the respective optical characteristic values represented by the respective electric signals produced by the image-take elements is associated with a position of a corresponding one of the picture elements in the physical image. The image data stored in the image-data memory are used to reproduce the physical image. In addition, the image data representing the physical image are actually present and accordingly the physical image can be said as an actual image in contrast to a virtual image described later. The screen on which the actual image is present can be said as the "actual" screen. Image data representing the actual image may be analog or digital data that represent respective magnitudes of electric signals produced by the image-take elements, for example, sets of multiple-level digital data (i.e., sets of half-tone data) each set of which can take one of 256 discrete values, or sets of binary data each set of which indicates whether the magnitude of a corresponding electric signal is greater than a threshold value. In the case where the image of the object represented by the image data is a discrete-type image defined by a matrix of picture elements having respective optical characteristic values, each pair of points or each search line are defined on a picture-element basis. Thus, the discrete-type image is suitable for those cases where the size of each picture element is sufficiently small or the degree of accuracy required is considerably low. Meanwhile, the "continuous-type" image whose arbitrary point has an optical characteristic value may be an image which is defined, providing that the respective electric signals produced by the image-take elements of the image-take surface (i.e., the physical screen) represent respective optical characteristic values of respective center points of the image-take elements, by a continuous curved surface which consists of a set of continuous optical characteristic values and which contains the respective optical characteristic values of the respective center points of the image-take elements. Data representing a mathematic formula defining the curved surface may be stored as the image data in the image-data memory. Thus, the continuous-type image is a sort of actual image. In contrast, without producing in advance the data representing the entire curved surface, it is possible to calculate, each time an arbitrary point is designated on a screen, an optical characteristic value corresponding to the designated point only. In the last case, no actual image is present but an image is just presumed to be present. Thus, this image is referred to as a "virtual" image, and the screen on which the virtual image is present is referred to as a "virtual" screen. Since the present object inspecting apparatus employs the virtual image and the virtual screen, it can quickly and accurately measure the object and inspect the same for finding one or more possible defects.

(12) According to a twelfth feature of the present invention that includes any one of the seventh to eleventh features (7) to (11), the measuring device comprises a seek-template data memory in which seek-template data representing a seek template is stored, the seek template comprising a plurality of pairs of points, the two points of each pair out of the pairs being distant from each other; object judging means for making, when the seek template represented by the seek-template data is superposed on a screen on which the image represented by the image data is present and respective optical characteristic values corresponding to the two points of the each pair satisfy a predetermined condition relating to an amount of difference between respective optical characteristic values inside and outside the edge of the image, an individual positive judgment that one of the two points of the each pair is located inside the edge of the image and the other point of the each pair is located outside the edge of the image, and further making, when the individual positive judgment is made with respect to the two points of each pair out of not less than a predetermined amount of the pairs, a total positive judgment that the object is an object being sought by the seek template; a measure-template data memory in which measure-template data representing a measure template is stored, the measure template comprising a plurality of measuring search lines; and edge-point-position determining means for superposing the measure template represented by the measure-template data, on the screen on which the image represented by the image data is present, and determining respective positions of respective edge points at which the measuring search lines intersect the edge of the image. The measuring device of the present object inspecting apparatus can quickly measure the position, rotation angle, and/or dimensions of an object. In addition, the present apparatus can produce inspecting search lines similar to the measuring search lines of the measure template, and use the inspecting search lines for inspecting the object. That is, the present apparatus can easily measure the position, rotation angle, and/or dimensions of an object which may not take constant position or rotation angle, and can subsequently inspect the object for finding its defect or defects. Hereinafter, a set of inspecting search lines will be referred as an inspect template.

(13) According to a thirteenth feature of the present invention that includes the twelfth feature (12), the object inspecting apparatus further comprises seek-template producing means for automatically producing the seek-template data based on reference-object defining data defining a reference object. In the case where the object takes substantially constant position and rotation angle, the present object inspecting apparatus may have only to produce a single batch of seek-template data (or a single seek template) based on the reference-object defining data. On the other hand, in the case where an object takes an inconstant position and/or an inconstant rotation angle, the present apparatus may need to first produce a master seek template corresponding to the reference object which takes a reference position and/or a reference rotation angle, and then produce at least one individual seek template by modifying the reference position and/or rotation angle of the reference object. Since the present apparatus can automatically produce the seek template, the operator is free from this task. Thus, the present object inspecting apparatus can be used easily and efficiently.

(14) According to a fourteenth feature of the present invention that includes the twelfth or thirteenth feature (12) or (13), the object inspecting apparatus further comprises measure-template producing means for automatically producing the measure-template data based on the seek-template data representing the seek template. In the case where an object takes substantially constant position and rotation angle, the present objecting inspecting apparatus can easily determine a single seek template suitable for seeking the object and accordingly can easily determine a single measure template suitable for measuring the object. On the other hand, in the case where an object takes an inconstant position and/or an inconstant rotation angle, the present apparatus needs to produce a plurality of seek templates and use each seek template for judging whether the object being image-processed is an object being sought. Thus, in the latter case, the present apparatus produces a measure template based on one seek template with which the object being image-processed is judged as an object being sought. Since the present apparatus can easily obtain an effective measure template, it can quickly measure the position, rotation angle, and/or dimensions of the object and can quickly inspect the same for finding one or more possible defects.

(15) According to a fifteenth feature of the present invention that includes the fourteenth feature (14), the object inspecting apparatus further comprises re-measure-template producing means for automatically producing a re-measure template as a new measure template for re-measurement of the object, based on at least one of a position, a rotation angle, and a dimension of the object measured using the measure template. The present object inspecting apparatus automatically produces a re-measure template based on the position, rotation angle, and/or dimension or dimensions of an object measured using one measure template. Therefore, the present apparatus can produce the re-measure template which has smaller errors with respect to the object than the one measure template. Thus, the present apparatus can more accurately measure the object with the re-measure template having the smaller errors.

(16) According to a sixteenth feature of the present invention, there is provided a recording medium on which an object-inspecting control program is recorded which is readable by a computer and is usable by the computer to inspect an object based on image data representing an image of the object taken by an image taking device, the image data being stored in an image-data memory, the program comprising the steps of producing at least one of (a) at least one negative search line which is expected not to intersect an edge of the image of the object represented by the image data, an optical characteristic of the image significantly changing at the edge, and (b) at least one positive search line which is expected to intersect the edge of the image, and judging that the object passes the inspection, when a condition is satisfied that when the at least one negative search line is produced, the at least one negative search line does not intersect the edge of the image of the object and/or, when the at least one positive search line is produced, the at least one positive search line intersects the edge of the image of the object, and judging that the object does not pass the inspection, when the condition is not satisfied.

(17) According to a seventeenth feature of the present invention, there is provided an object inspecting apparatus, comprising an image taking device which takes an image of an object; an image-data memory in which image data representing the taken image of the object is stored; a measuring device which measures, based on the image data stored in the image-data memory, at least one of a position, a rotation angle, and a dimension of the object; and judging means for judging whether the object has an unexpected edge while taking into account the measured one of the position, the rotation angle, and the dimension of the object, and thereby judging whether the object has a defect. The present object inspecting apparatus can inspect, with no problem, an object which may not take constant position, rotation angle, and/or dimension or dimensions. To this end, the present apparatus may employ either the above-described seek template, measure template, and inspect template, or other appropriate means.

(18) According to an eighteenth feature of the present invention that includes the seventeenth feature (17), the image taking device comprises a telecentric optical system.

(19) According to a nineteenth feature of the present invention that includes the eighteenth feature (18), the telecentric optical system comprises a reflecting plane surface which reflects light beams; a first lens system whose optical axis is perpendicular to the reflecting plane surface and which converges the light beams reflected by the plane surface, to a focal point of the first lens system; an object supporting device which supports the object at a position intermediate between the reflecting plane surface and the first lens system; a beam splitter which has a reflecting surface and which is provided on one of opposite sides of the first lens system that is more distant from the reflecting plane surface than the other side; an orifice which is provided at a position which is plane-symmetric with the focal point of the first lens system with respect to the reflecting surface of the beam splitter; a light source which is provided on one of opposite sides of the orifice that is more distant from the beam splitter than the other side; and a second lens system which has a focal point at the focal point of the first lens system and which converts the light beams which have been converged by the first lens system and have passed through the beam splitter, into parallel light beams, and the image taking device comprises an image-take sensor which is provided at a position where the image-take sensor takes an image formed by the parallel light beams provided by the second lens system.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 14 is a view representing a preliminary processing program which is stored in a dynamic random access memory ("DRAM") of the image processing device;

FIG. 15 is a view representing an image processing program which is stored in the DRAM of the image processing device;

FIG. 16 is a view representing a pattern matching program which is stored in the DRAM of the image processing device;

FIG. 17 is a view showing pre-stored data which are used to carry out the pattern matching program on a square image of an object;

FIG. 21 is a view showing pre-stored data which are used to carry out the pattern matching program on an image of a partly cut disc as an object;

FIG. 29 is a table showing respective calculated luminance values corresponding to the division points shown in FIG. 28;

FIG. 30 is a view of a differential filter which is used to differentiate the calculated luminance values shown in FIG. 29;

FIG. 31 is a view of another differential filter which is used to differentiate the calculated luminance values shown in FIG. 29;

DETAILED DESCRIPTION OF THE PREFERRED EMBODIMENTS

Hereinafter, there will be described a measuring and inspecting apparatus 8 to which the present invention is applied. The present measuring and inspecting apparatus 8 measures a position, a rotation angle, and/or one or more dimensions of a cubic object, and inspects the object for finding one or more possible defects.

Figure 1:
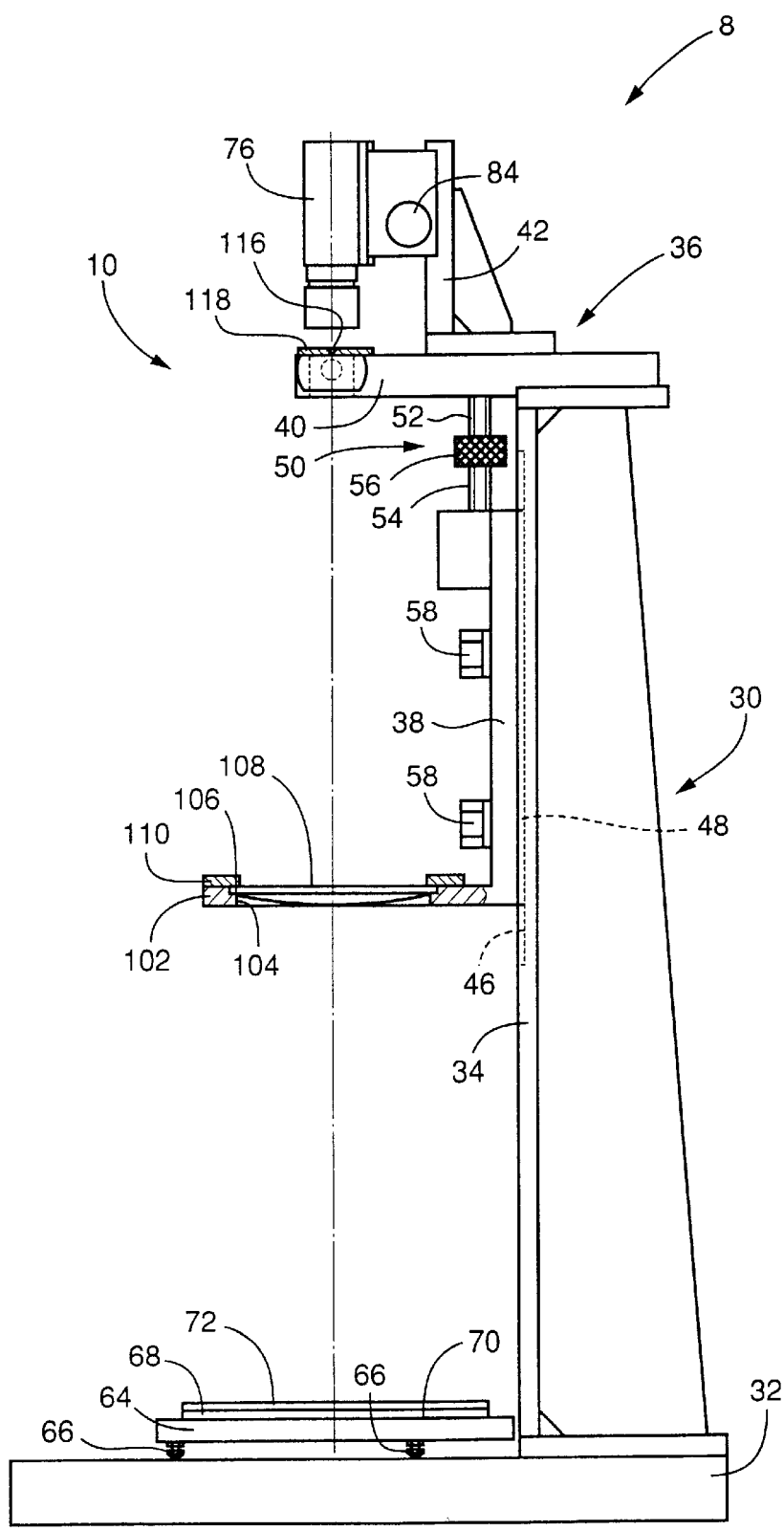
FIG. 1 is a partly cross-sectioned, side elevation view of an image taking device of a measuring and inspecting apparatus to which the present invention is applied.
Figure 2:
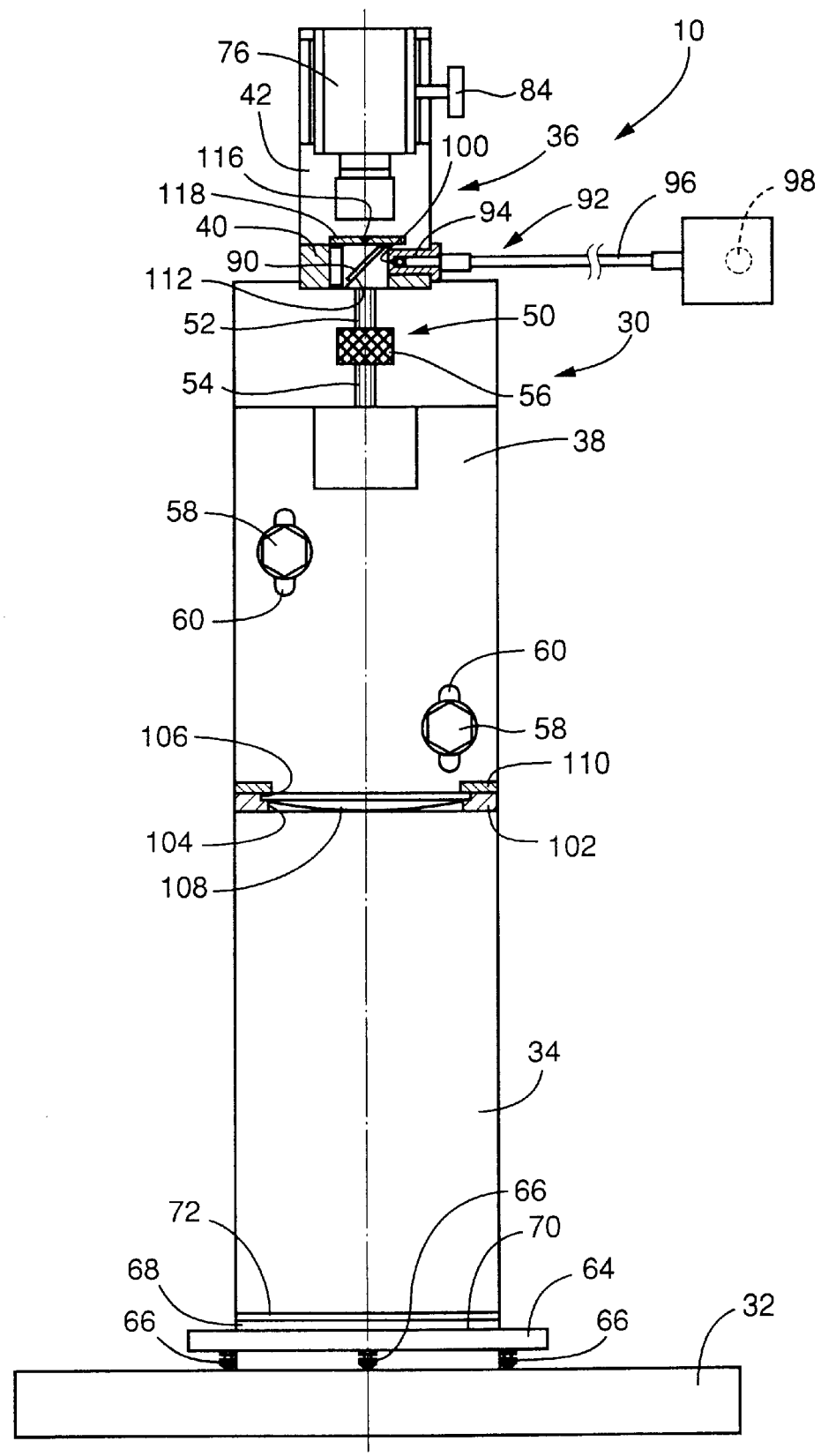
FIG. 2 is a partly cross-sectioned, front elevation view of the image taking device.
Figure 3:
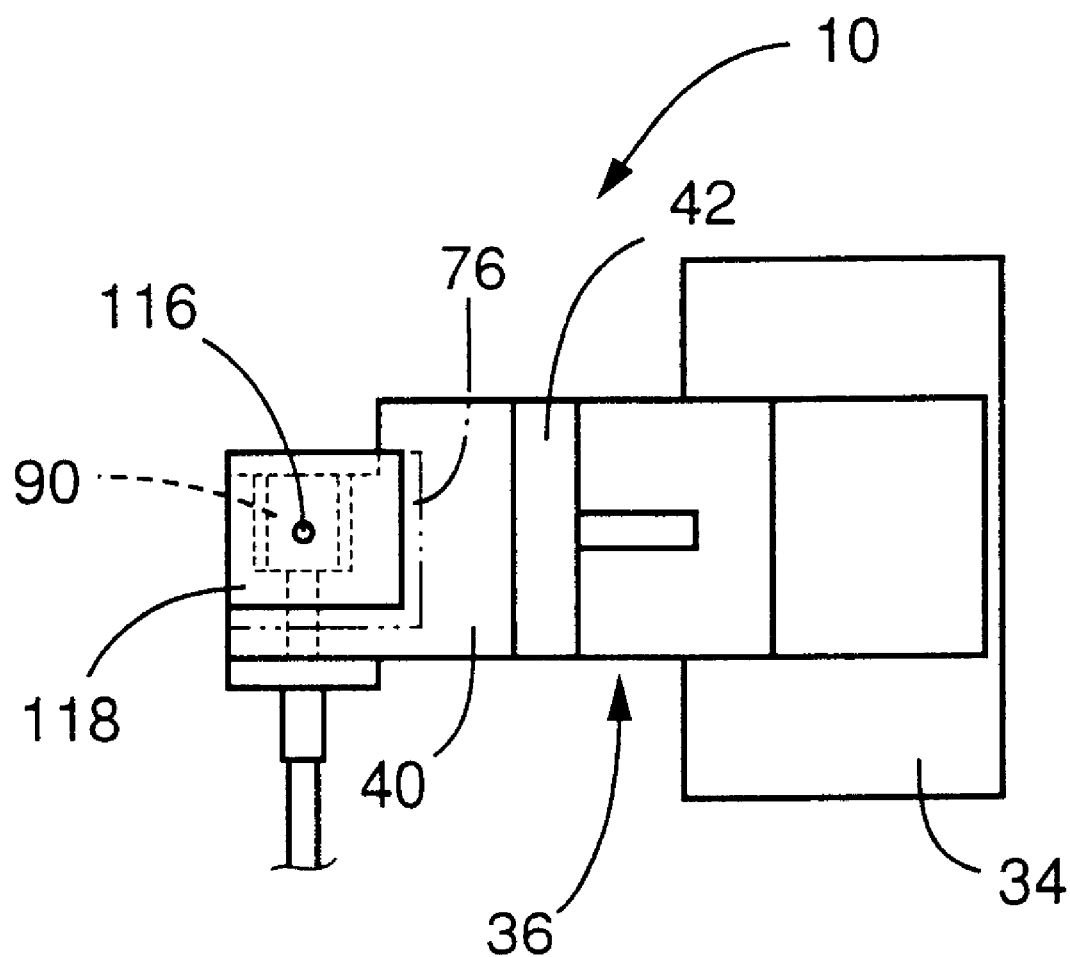
FIG. 3 is a plan view of a relevant portion of the image taking device, with a CCD (charge coupled device) camera thereof and a CCD-camera elevating and lowering device thereof being omitted.
Figure 4:
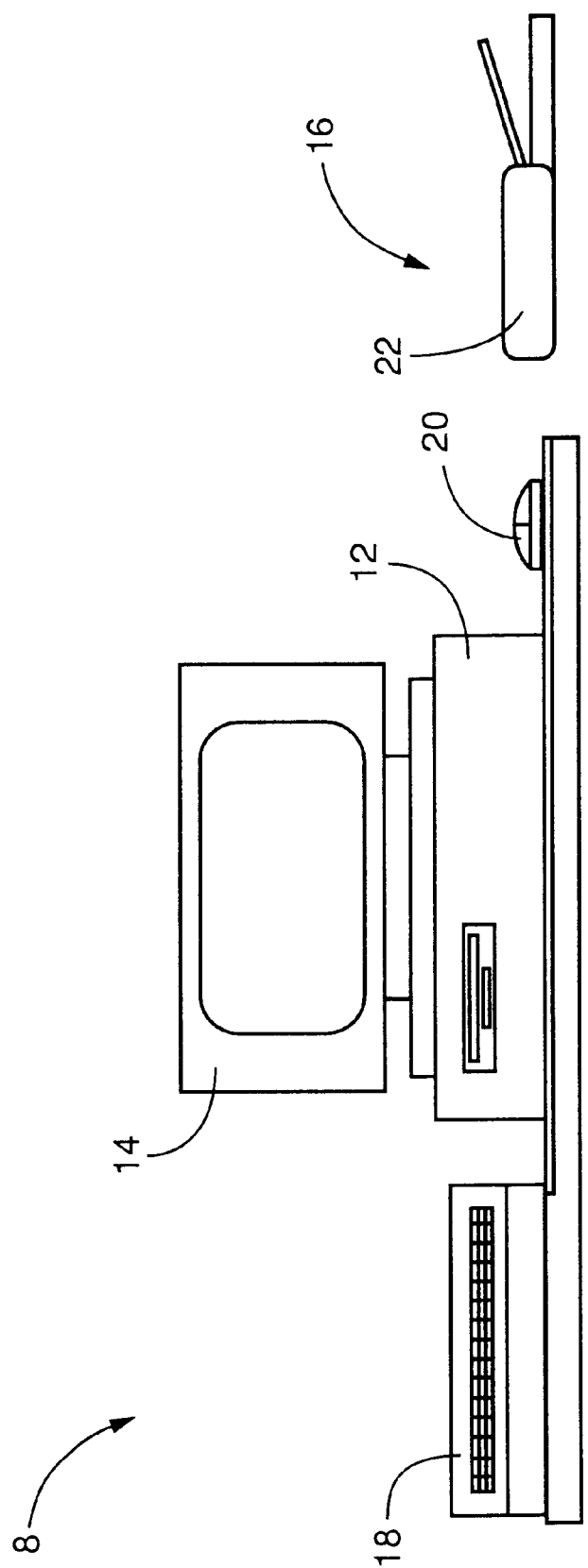
FIG. 4 is a front view of an image processing device, a CRT (cathode ray tube) monitor device, and an input device of the measuring and inspecting apparatus.

The present apparatus 8 includes an image taking device 10 which is shown in FIGS. 1, 2, and 3, and an image processing device 12, a CRT (cathode ray tube) monitor device 14, and an input device 16 which are shown in FIG. 4. The input device 16 includes a keyboard 18, a mouse 20, and a foot switch 22. The image processing device 12 operates in response to information and commands input through the input device 16. More specifically described, the processing device 12 processes image data representing an image taken by the image taking device 10, measures one or more dimensions of the cubic object, compares the measured dimensions with reference dimensions, and judges whether the object passes the inspection. In addition, the processing device 12 inspects the cubic object for finding one or more possible defects, such as a scar occurring to its outer surface, dirt adhered to the outer surface, or a chip occurring to its outer peripheral portion. The CRT monitor device 14 as a display device displays the image taken by the image taking device 10, the measured dimensions of the cubic object, the positive or negative judgment made by the processing device 12, and the presence or absence of one or more defects with the object. The image processing device 12 may be connected to a printer (not shown) which records the screen image displayed on the monitor device 14, on a recording sheet as a sort of recording medium.

The information needed to operate the image processing device 12 is input through the keyboard 18 and the mouse 20. However, simple commands, such as an operation-start command, can be input through each of the keyboard 18, the mouse 20, and the foot switch 22. In a particular case where a great number of cubic objects are successively measured and inspected by the present apparatus 8, it is preferred that the operation-start command be input through the foot switch 22, because an operator can use both hands in a different operation, such as an object replacing operation in which the current object is replaced with a new one. In addition, if the image processing device 12 makes a negative judgement that the object does not pass the inspection, a buzzer (not shown) which is incorporated in the device 12 generates an alarm sound. Thus, the operator does not have to keep watching the monitor device 14. In this respect, too, the present apparatus 8 enjoys high versatility.

Next, the image taking device 10 will be described in detail by reference to FIGS. 1 to 3. Reference numeral 30 designates a main frame of the device 10, and the main frame 30 includes a base 32, a column 34, and a head 36. The column 34 extends upward from the base 32, supports, at an upper end portion thereof, the head 36, and supports, at an intermediate portion thereof, a lens bracket 38. The head 36 includes an arm 40 which extends horizontally from the upper end portion of the column 34, and a camera bracket 42 fixed to the arm 40. The front surface of the column 34 is provided with a guiding portion which guides a guided portion of the lens bracket 38 such that the lens bracket 38 is movable upward and downward. More specifically described, the guiding portion is defined by a guide groove 46 which has a rectangular transverse cross section and which extends vertically. The guided portion is defined by a projecting portion 48 which projects from the rear surface of the lens bracket 38 and which fits in the guide groove 46 such that the projecting portion or the lens bracket 38 is slideable in the guide groove 46. The arm 40 and the lens bracket 38 are connected to each other by an adjusting screw 50 which includes a first threaded portion 52, a second threaded portion 54, and an operable portion 56. The first and second threaded portions 52, 54 are threadedly engaged with respective threaded holes of the arm 40 and the lens bracket 38. Since the respective directions, and/or respective pitches, of threading of the two threaded portions 52, 54 differ from each other, the operator can move the lens bracket 38 upward and downward by rotating, with his or her fingers, the operable portion 56, and thereby adjust the position of the lens bracket 38 relative to the arm 40 and the camera bracket 42. After this adjustment, the operator can fix the lens bracket 38 to the column 34 by fastening two bolts 58 as a fastening device through respective vertically elongate holes 60 formed in the lens bracket 38. In the state in which the bolts 58 are somewhat unfastened, the operator can move the lens bracket 38 upward and downward.

A mirror-support plate 64 is provided on the base 32 such that the plate 64 extends horizontally. The mirror-support plate 64 is a generally rectangular plate member, and is supported by the base 32 via three adjusting screws 66 which are located on a circle whose center coincides with the center of the plate 64 and which are equiangularly spaced from one another about those centers. The angle of inclination of the plate 64 relative to the base 32 can be adjusted by screwing or unscrewing one or more of the adjusting screws 66. A flat mirror 68 is fixed to the upper surface of the mirror-support plate 64, and an object-support plate 72 formed of a flat glass plate is placed on a reflection surface 70 of the mirror 68. The reflection surface 70 has a high degree of flatness, and provides a total-reflection surface that substantially entirely (i.e., approximately 100%) reflects a light incident thereto.

The camera bracket 42 supports a CCD (charge coupled device) camera 76 including a number of small CCDs (charge coupled devices) 80 each as a solid-state image sensor, and an image forming lens 82 (FIG. 5), such that a position of the CCD camera 76 is adjustable in a vertical direction. More specifically described, the CCD camera 76 can be moved upward and downward by rotating a knob 84 and thereby driving a CCD-camera elevating and lowering mechanism (not shown). The CCDs 80 are arranged in a two-dimensional matrix, and each of the CCDs 80 generates an electric signal representing a light incident thereto.

As shown in FIG. 2, the arm 40 incorporates a beam splitter 90 which is inclined by 45 degrees with respect to an optical axis of the CCD camera 76. A lighting device 92 is opposed to the beam splitter 90 in a horizontal direction. The lighting device 92 includes an orifice member 94, an optical fiber 96, and a halogen lamp 98 as a light source. The light emitted from the halogen lamp 98 is introduced through the optical fiber 96 into the orifice member 94 fixed to the arm 40. The orifice member 94 has a small aperture 100 at one end thereof, and the light introduced into the orifice member 94 is radiated from the aperture 100 toward the beam splitter 90. For the purpose of converging the light conducted through the optical fiber 96, to the aperture 100, it is desirable that a lens be provided between the fiber 96 and the aperture 100.

The lens bracket 38 includes a lens-support portion 102 which extends horizontally from the lower end portion of the bracket 38. The lens-support portion 102 has a circular opening 104 formed through the thickness thereof, and the circular opening 104 has a counterbore 106 at the upper end portion thereof. An object lens 108 fits in the counterbore 106, and is prevented by a lens cover 110 from coming off the counterbore 106.

Figure 5:
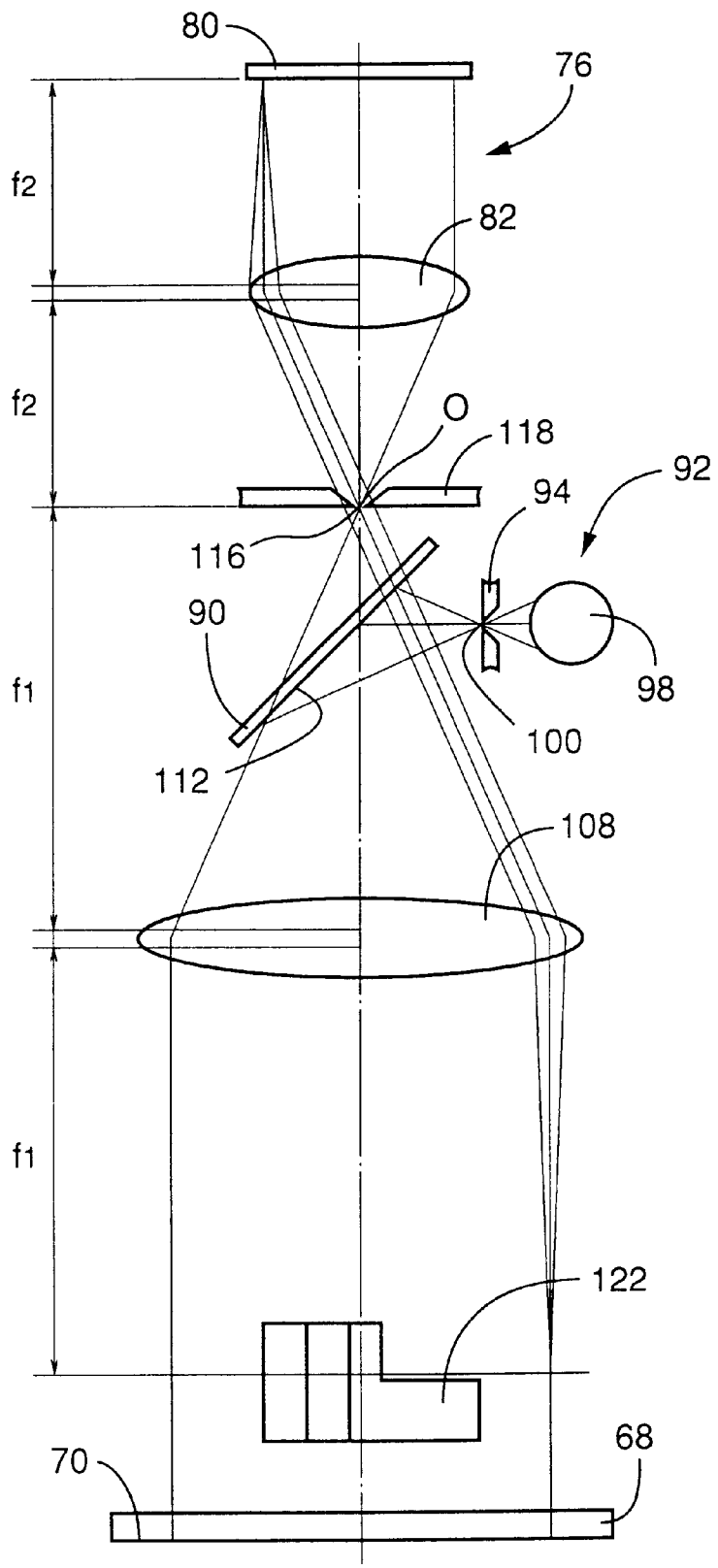
FIG. 5 is a schematic view of optical systems of the image taking device.

The above-described CCD camera 76 (i.e., the CCDs 80), the image forming lens 82, the beam splitter 90, the object lens 108, and the mirror 68 are coaxial with one another, as shown in FIG. 5. Respective focal points, O, of the object lens 108 and the image forming lens 82 coincide with each other. Respective positions of the image forming lens 82, the beam splitter 90, and the object lens 108 are predetermined such that the position of the focal points O and the position of the aperture 100 of the orifice member 94 are plane-symmetric with each other with respect to a reflection surface 112 of the beam splitter 90. The reflection surface 70 of the mirror 68 is provided at a position distant from the object lens 108 by a focal distance, $f_1$, of the same 108, such that the surface 70 extends perpendicularly to the optical axis of the same 108. The image-take surface of the CCD camera 76 is provided at a position distant from the image forming lens 82 by a focal distance, $f_2$, of the same 82, such that the image-take surface extends perpendicularly to the optical axis of the same 82. An orifice member 118 which has an aperture 116 at the focal points O permits only the parallel light beams reflected by the reflection surface 70 and subsequently converged by the object lens 108, to be incident to the image forming lens 82. However, in a particular case where it is sufficiently dark around the image taking device 10, the orifice member 118 may be omitted. FIG. 5 shows for easier understanding purposes only that the diameter of the light passing through the aperture 116 is greater than that of the aperture 116. In fact, however, only the light whose diameter is substantially equal to that of the aperture 116 can pass through the same 116.

When the image taking device 10 constructed as described above is used to measure and inspect a cubic object 122, first, an operator places the object 122 on the object-support plate 72, so that the object 122 is lighted by the lighting device 92. A portion of the light radiated from the aperture 100 as a point light source passes through the beam splitter 90, but the remaining portion of the light is reflected by the reflection surface 112 toward the object lens 108. Since the aperture 100 is plane-symmetric with the focal points O with respect to the reflection surface 112, the light output from the aperture 100 is incident to the object lens 108 as if the light had been output from the focal points O. The object lens 108 converts the incident light into parallel light beams parallel to the optical axis of the lens 108, and directs the parallel light beams toward the object 122 and the reflection surface 70. The light beams incident to the outer surface of the object 122 are reflected by that outer surface, and a portion of the reflected light beams that is parallel to the optical axis of the object lens 108 is converged by the object lens 108 to the focal points O. The light beams which have passed through around the object 122 are reflected by the reflection surface 70. Since the reflection surface 70 is perpendicular to the optical axis of the object lens 108, the light beams reflected from the reflection surface 70 return along the same route as that along which the light beams have been incident to the surface 70, that is, pass through around the object 122, parallel to the optical axis of the lens 108, and are converged to the focal points O by the lens 108. A portion of the thus converged light beams is returned by the reflection surface 112 of the beam splitter 90 toward the lighting device 92, but the remaining portion of the light beams is incident to the image forming lens 82 through the beam splitter 90 and the focal points O (or the aperture 116 of the orifice member 118). The image forming lens 82 converts the incident light beams into parallel light beams parallel to the optical axis of the lens 82. The parallel light beams are incident to the image-take surface of the CCD camera 76, so that a picture image including respective images of the object 122 and the reflection surface 70 are formed on the image-take surface.

Figure 67:
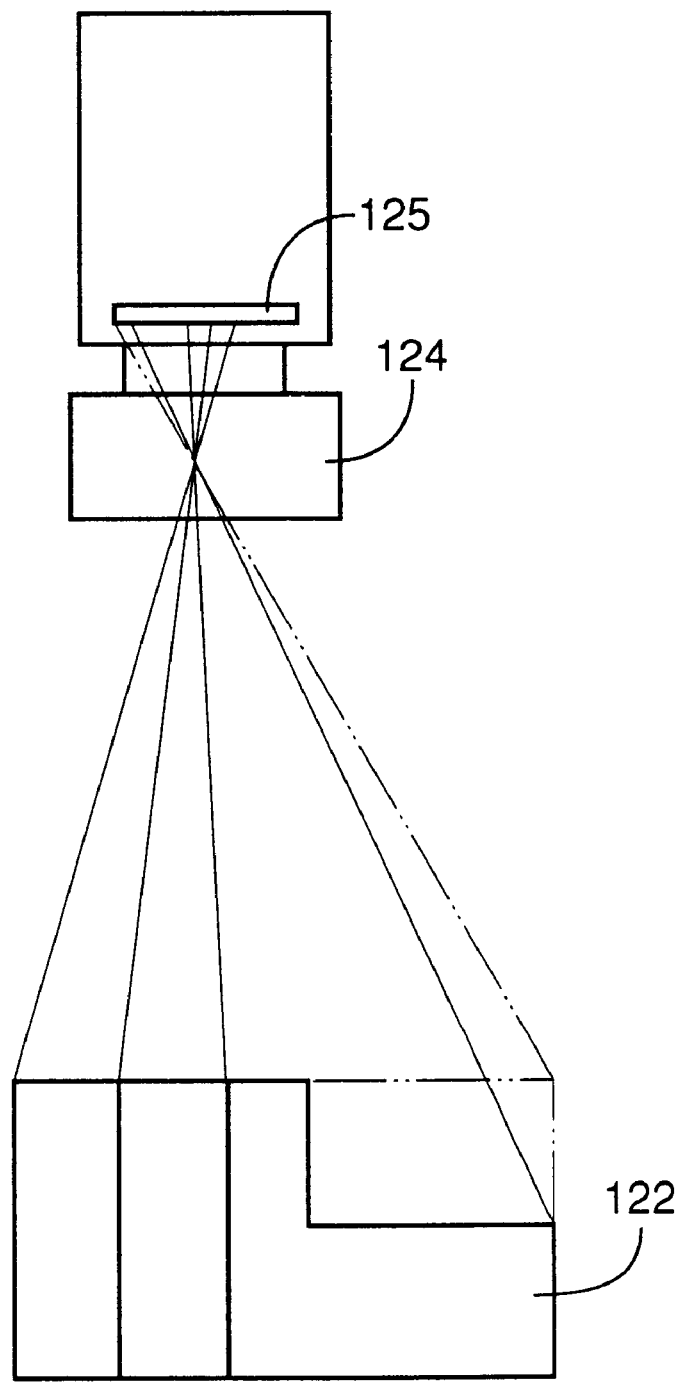
FIG. 67 is a schematic view of a prior image taking device including a conventional optical system.

Since the picture image is formed by the light beams reflected from both the outer surface of the object 122 and the reflection surface 70, parallel to the optical axis of the object lens 108, the image is formed as if it were drawn by projection, or perspective projection. FIG. 67 shows a common optical system 124 and an image-take sensor 125 which takes an image of a cubic object 122 through the optical system 124. The taken image of the object 122 has the problem that a portion of the object 122 that is distant from the optical system 124 is imaged smaller than the remaining portion of the object 122 that is near to the optical system 124. More specifically described, if the distant portion of the object 122 were located, as indicated at two-dot chain line, at the same distance as that at which the remaining portion of the object 122 is located, the distant portion would be imaged in the same size as that in which the remaining portion is imaged. In fact, however, the distant portion is imaged smaller than the remaining portion. This problem will occur so long as an entire outer surface of the object 122 that is opposed to the optical system 124 is not provided by a single surface which is perpendicular to the optical axis of the system 124 and whose position is fixed relative to the system 124. Therefore, the problem makes it impossible to accurately measure the dimensions of the cubic object 122. In contrast, the image taking device 10 is free from this problem, and an image of a cubic object 122 is taken by the device 10 as if it were drawn by projection or perspective projection. Accordingly, the dimensions of the cubic object 122 can be accurately measured on the taken image, as if they were measured on a projected or perspective-projected drawing.

The reflection surface 70 is a total-reflection surface having a reflection coefficient of about 100%, whereas the outer surface of the cubic object 122 is rough, needless to say, if the outer surface is a cut surface, or even if the outer surface may be a ground surface. Therefore, the light beams which are reflected from the outer surface of the object 122, parallel to the optical axis of the object lens 108, are less than those reflected from the reflection surface 70, and accordingly the image of the outer surface of the object 122 is darker than that of the reflection surface 70. Heretofore it has been assumed that the outer surface of the object 122 is perpendicular to the optical axis of the object lens 108. In the case where the outer surface of the object 122 is inclined relative to the optical axis of the object lens 108, the light beams reflected from the outer surface, parallel to the optical axis of the object lens 108, further decrease and accordingly the outer surface of the object 122 may be imaged as a silhouette. Even in the case where the outer surface of the object 122 is perpendicular to the optical axis of the object lens 108, the outer peripheral portion of the object 122 may have been intentionally chamfered or rounded, or may have naturally rounded. Therefore, the image of the object 122 may be dark along an outer outline thereof, and may have a degree of lightness significantly different from that of the image of the reflection surface 70. Thus, the outer outline of the object 122 can be easily identified by the image processing device 12. If the outer peripheral portion of the object 122 has a defect such as a chip, the light beams reflected from the reflection surface 70 pass through the chip of the object 122. Thus, the image of the chip is significantly lighter than that of the remaining portion of the object 122, and can be easily identified by being compared with the dark image of the remaining portion.

While the foregoing description relates to the outer outline of the object 122, the image processing device 12 can easily identify, if the object 122 has a through-hole formed therethrough, an inner outline of the object 122, for the same reasons as those described above. In the case where the outer surface of the object 122 is perpendicular to the optical axis of the object lens 108, if the outer surface bears a printed character (e.g., a letter or a symbol) or a drawn figure, has a recess or a scar, or has dirt adhered thereto, the degree of lightness of the image of each of them differs from that of the image of the remaining outer surface of the object 122 (in many cases, the former image is darker than the latter image). Thus, the outline of each of them can be easily identified.

The image processing device 12 processes image data representing the picture image taken by the CCD camera 76 in the above-described manner, identifies the outer and/or inner outlines of the object 122, and determines, based on the identified outlines, the dimensions, X-direction and Y-direction positions, and rotation angle of the object 122. The rotation angle of the object 122 is defined as the angle of rotation of the object 122 from its reference rotation position about an axis line parallel to a Z direction perpendicular to both the X and Y directions perpendicular to each other and parallel to the reflection surface 70. In addition, the image processing device 12 identifies the outline of the printed character, drawn figure, recess, scar, or dirt present on the outer surface of the object 122, recognizes the character, figure, or recess, and finds the scar or dirt as a defect. The method of processing the picture image is complex and accordingly will be described in detail later.

The image processing device 12 compares the thus obtained data, such as the dimensions, X-direction and Y-direction positions, and rotation angle of the object 122, with reference data, and judges whether the object 122 passes the inspection. The positive or negative judgment is displayed, on the CRT monitor device 14, together with the measured dimensions, X-direction and Y-direction positions, and rotation angle of the object 122. In addition, the character, figure, or recess recognized on the outer surface of the object 122, and the defect or defects (e.g., scar or dirt) found on the outer surface are also displayed on the monitor device 14.

Experiments have shown that the combination of the image taking device 10 and the image processing device 12 assures that the dimensions of the cubic object 122 can be measured with minor errors of not greater than one percent. To improve the accuracy of measurement, it is needed to improve the accuracy of positioning of the focal point O of the object lens 108 and the aperture 100 of the orifice member 94 relative to each other in a direction parallel to the optical axis of the lens 108, and improve the degree of perpendicularity of the reflection surface 70 of the mirror 68 with respect to the optical axis of the object lens 108.

Figure 6:
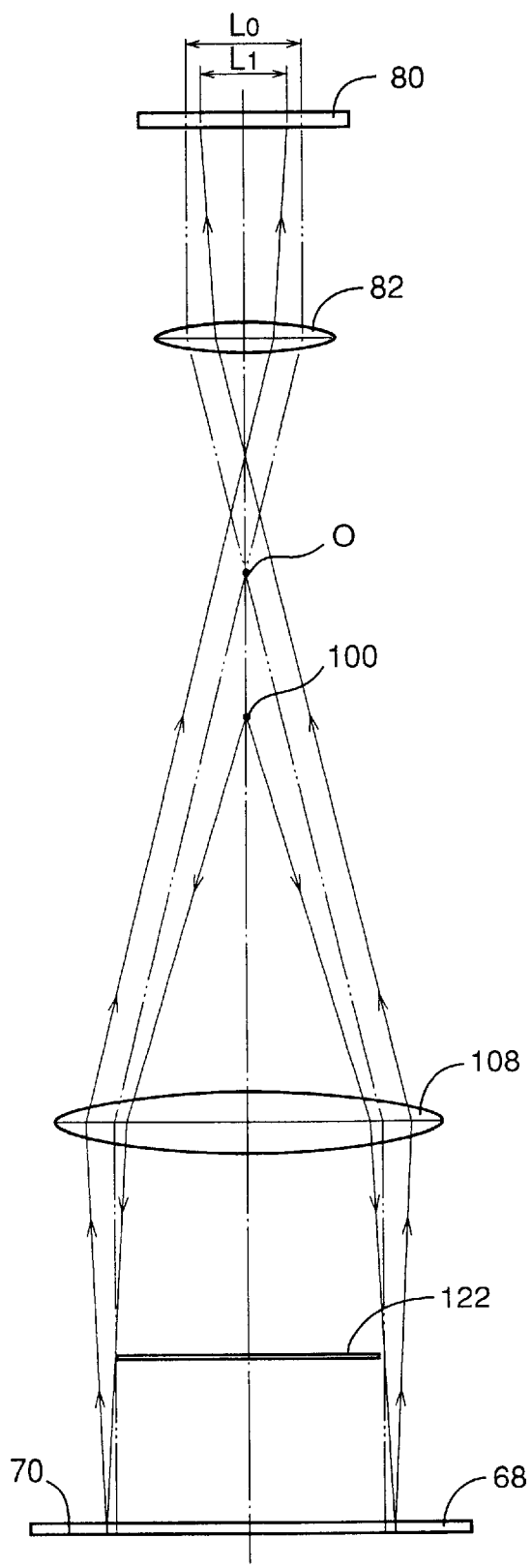
FIG. 6 is a view for explaining why an error is produced when a dimension of a cubic object is measured using the optical systems.

First, there will be described the method of accurately positioning the focal point O of the object lens 108 and the aperture 100 of the orifice member 94 relative to each other. FIG. 6 shows a first case where the aperture 100 of the orifice member 94 is positioned nearer to the object lens 108 than the focal point O of the lens 108. For easier understanding purposes only, the beam splitter 90 is omitted, and the aperture 100 is illustrated as if it were located on the optical axis of the object lens 108. In addition, the error of positioning of the aperture 100 is exaggerated. In FIG. 6, a correct route which passes through the focal point O and along which light beams are incident to the CCDs 80 (or the CCD camera 76) to form an image having a length, $L_O$, is indicated at two-dot chain line. The aperture 100 should be positioned correctly at the focal point O. In the first case, shown in FIG. 6, where the aperture 100 is too near to the object lens 108, light beams are incident to the CCDs 80 along a route, indicated at thin solid line (the direction of passing of light beams is indicated at arrows), to form an image having a length, $L_1$, shorter than the length $L_0$.

Figure 7:
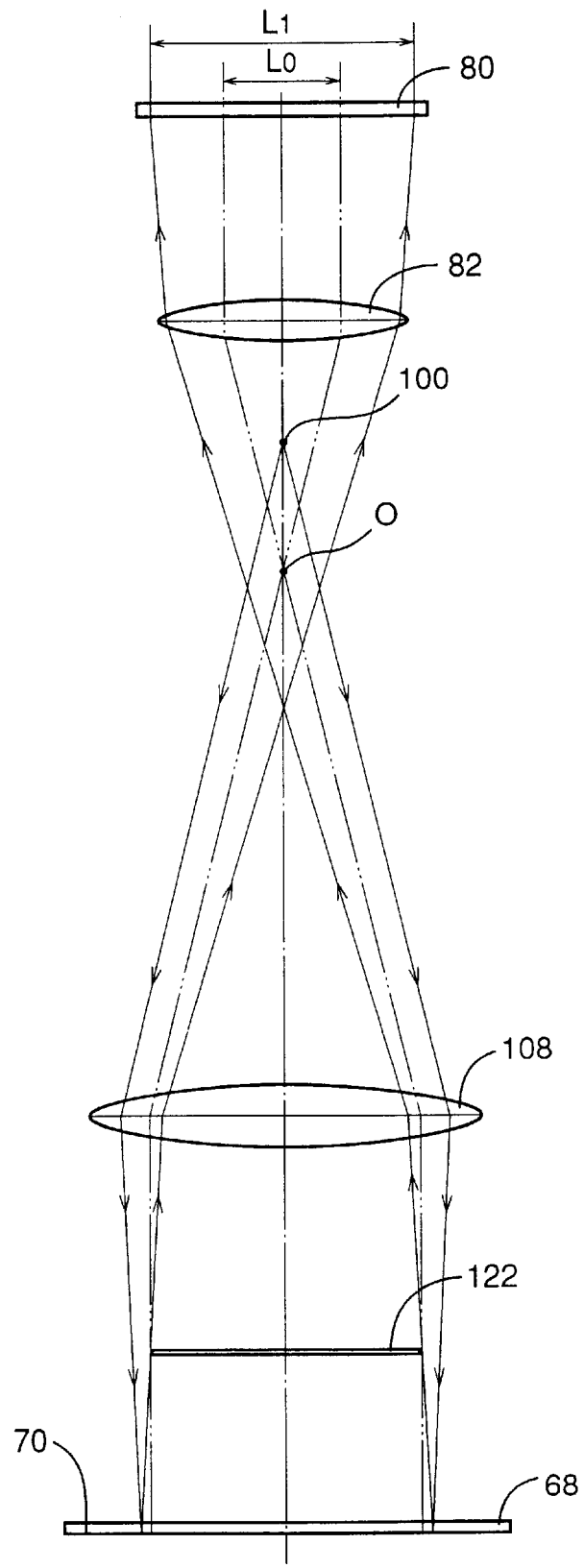
FIG. 7 is another view for explaining why the error is produced.

FIG. 7 shows a second case where the aperture 100 is positioned more distant from the object lens 108 than the focal point O of the lens 108. In this case, the light beams from the aperture 100 are incident to the CCDs 80 along a route, indicated at thin solid line, to form an image having a length, $L_1$, greater than the length $L_0$.

If the positioning of the orifice member 94 and the object lens 108 relative to each other in the direction parallel to the optical axis of the lens 108 is not accurate, that is, if the aperture 100 of the orifice member 94 is not accurately located at the focal point O of the object lens 108, the image of the cubic object 122 taken by the CCD camera 76 is enlarged or reduced. If the thus taken image of the object 122 is used to measure the dimensions of the same 122, the measured dimensions would include more or less errors. Those dimensional errors increase as the distance between the reflection surface 70 and the outer (i.e., upper) surface of the object 122 increases. To remove the errors, it is needed to adjust the relative position of the aperture 100 of the orifice member 94 and the focal point O of the object lens 108 in the direction parallel to the optical axis of the lens 108. This adjustment may be achieved by changing the position of the orifice member 94 in the optical-axis direction. However, in the present embodiment, the adjustment is done by changing the position of the object lens 108 relative to the beam splitter 90, or the aperture 100, in the optical-axis direction.

Figure 8:
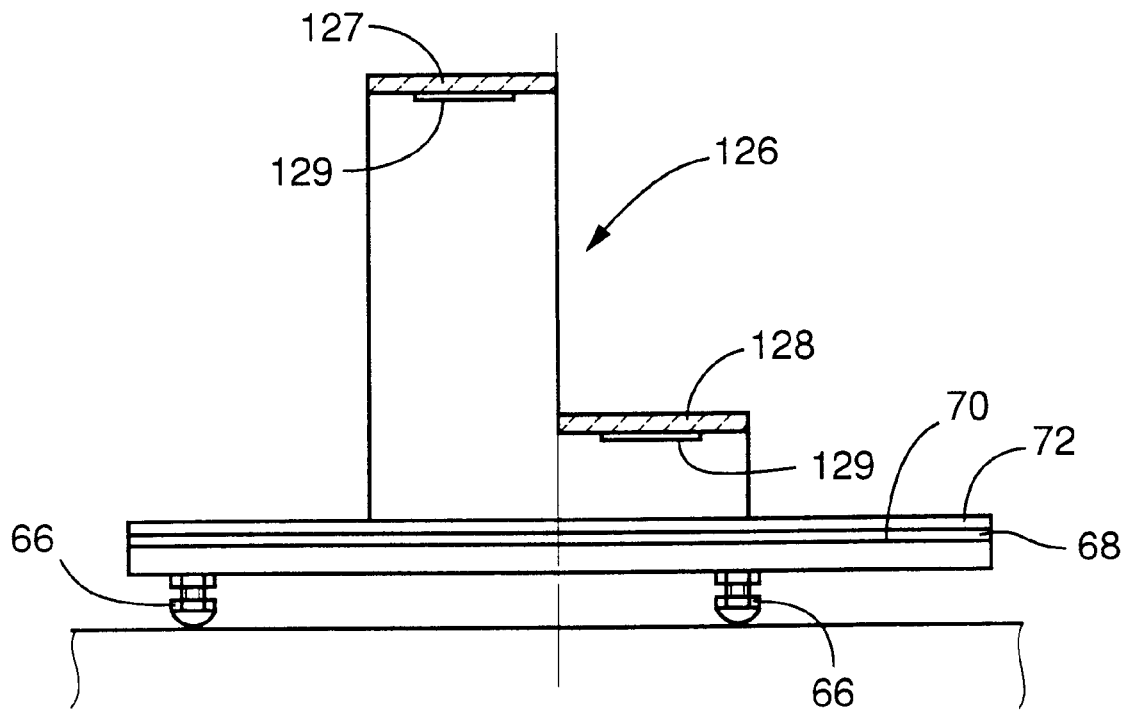
FIG. 8 is a cross-sectioned, front elevation view of a calibrating gauge which is used for calibrating the image taking device.
Figure 9:
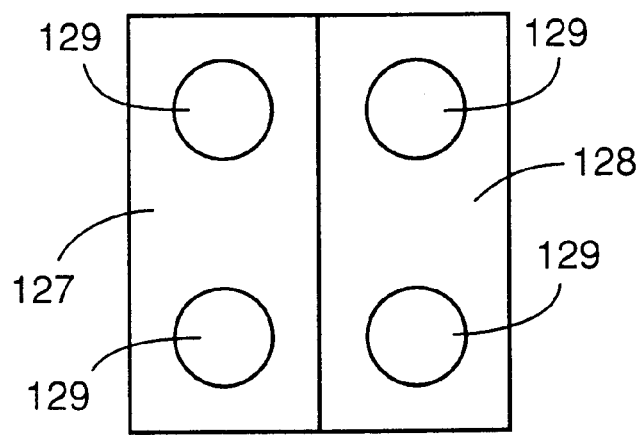
FIG. 9 is a plan view of the calibrating gauge.

More specifically described, first, the operator places a calibrating gauge 126 on the object-support plate 72, as shown in FIG. 8. Then, the operator operates the adjusting screw 50 to adjust the height position of the object lens 108, while dimensions of each of a first reference portion 127 and a second reference portion 128 of the gauge 126 are repeatedly measured. When the measured dimensions of the first reference portion 127 substantially coincide with those of the second reference portion 128, the lens bracket 38 is fixed to the column 34. Each of the first and second reference portions 127, 128 is provided by a glass plate having two identical reference marks 129, as shown in FIG. 9. The distance between respective centers of the two marks 129 on the first portion 127 is equal to that between respective centers of the two marks 129 on the second portion 127. In the state in which the gauge 126 is placed on the object-support plate 72, the respective positions of the first and second reference portions 127, 128 in the optical-axis direction differ from each other. As described previously, the dimensional errors of the object 122 may increase as the distance between the reflection surface 70 and the object 122 increases. However, though the respective positions of the first and second reference portions 127, 128 in the optical-axis direction differ from each other, the operator can judge that the light beams directed by the object lens 108 toward the gauge 126 have already been adjusted to be parallel to the optical axis of the lens 108, when the difference between the measured distance between the respective centers of the two marks 129 of the first portion 127 and the measured distance between the respective centers of the two marks 129 of the second portion 128 no longer change. That is, the operator can judge that the focal point O of the object lens 108 and the aperture 100 of the orifice member 94 have been appropriately positioned relative to each other in the optical-axis direction.

The light beams reflected from the reflection surface 70 are interrupted by each of the four reference marks 129 of the calibrating gauge 126. Each reference mark 129 is formed of a material having a low reflection coefficient. However, it is possible to employ a calibrating gauge or jig which includes a first and a second reference portion each of which has two reference marks each having a high reflection coefficient, and additionally includes a support member having two stepped portions having different height positions and supporting the two reference portions, respectively. In the latter case, it is preferred that the two stepped portions of the support member be formed of a material having the lowest possible reflection coefficient. In the latter case, the parallel light beams output from the object lens 108 do not reach the reflection surface 70, and the parallel light beams reflected by the reference marks each having the high reflection coefficient are used to measure the dimensions of each of the reference marks. If the degree of pallarelism of the parallel light beams is low, the measured dimensions of each reference mark include errors which change depending upon the distance between the object lens 108 and each reference mark. Therefore, in the latter case, too, whether the degree of pallarelism of the parallel light beams is sufficiently high, that is, whether the relative position between the focal point O of the object lens 108 and the aperture 100 of the orifice member 94 is appropriate can be judged.

Figure 10:
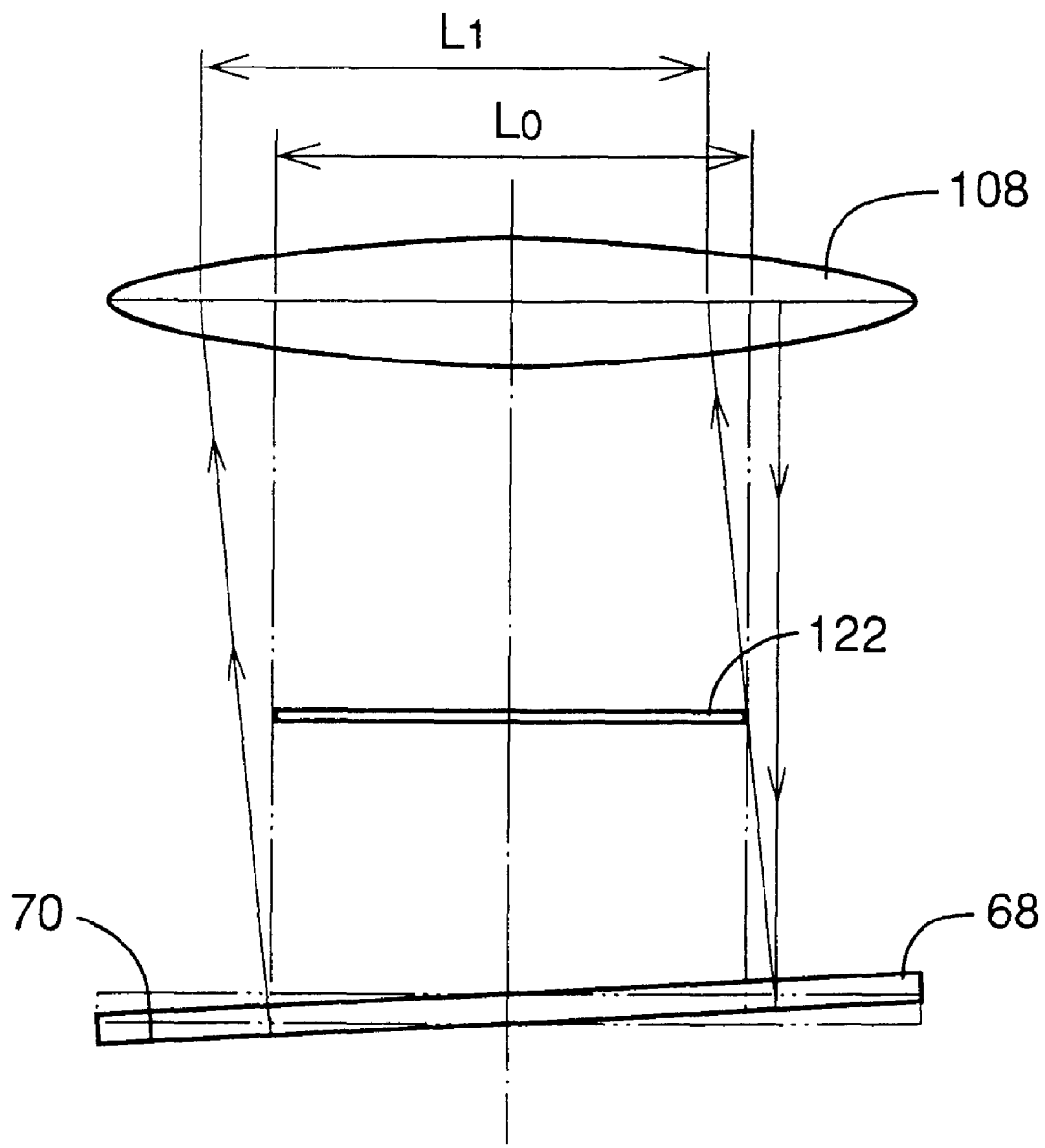
FIG. 10 is a schematic view for explaining why an error is produced when a dimension of a cubic object is measured using the optical systems.

Next, there will be described the method of improving the degree of perpendicularity of the reflection surface 70 of the mirror 68 with respect to the optical axis of the object lens 108. FIG. 10 shows that if the reflection surface 70 is accurately perpendicular to the optical axis of the object lens 108, the parallel light beams output from the object lens 108 pass along a route, indicated at two-dot chain line, to form an image having a length, $L_0$. On the other hand, if the reflection surface 70 is more or less inclined relative to the optical axis of the object lens 108, the parallel light beams pass along a route, indicated at thin solid line (the direction of passing of light beams is indicated at arrows), to form an image having a length, $L_1$. That is, as the degree of perpendicularity of the reflection surface 70 of the mirror 68 with respect to the optical axis of the object lens 108 decreases, the measured outer dimensions of the object 122 adversely increase. To remove those dimensional errors, the angle of inclination of the reflection surface 70 relative to the base 32 is adjusted by changing the amount of projection of one or more of the three adjusting screws 66 from the mirror-support plate 64, while the outer dimensions of the object 122 on the object-support plate 72 are repeatedly measured. The operator can obtain a sufficiently high degree of perpendicularity of the reflection surface 70 with respect to the optical axis of the object lens 108, by fixing the adjusting screws 66 with respective lock nuts, in the state in which the measured outer dimensions of the object 122 take the minimum values. In the present embodiment, the adjusting screws 66 are threadedly engaged with the mirror-support plate 64, and the respective lower ends of the screws 66 are held in contact with the base 32. However, it is possible that the adjusting screws 66 be replaced with a different sort of screws each similar to the adjusting screw 50 and each of the latter screws be threadedly engaged with both the mirror-support plate 64 and the base 32.

Figure 11:
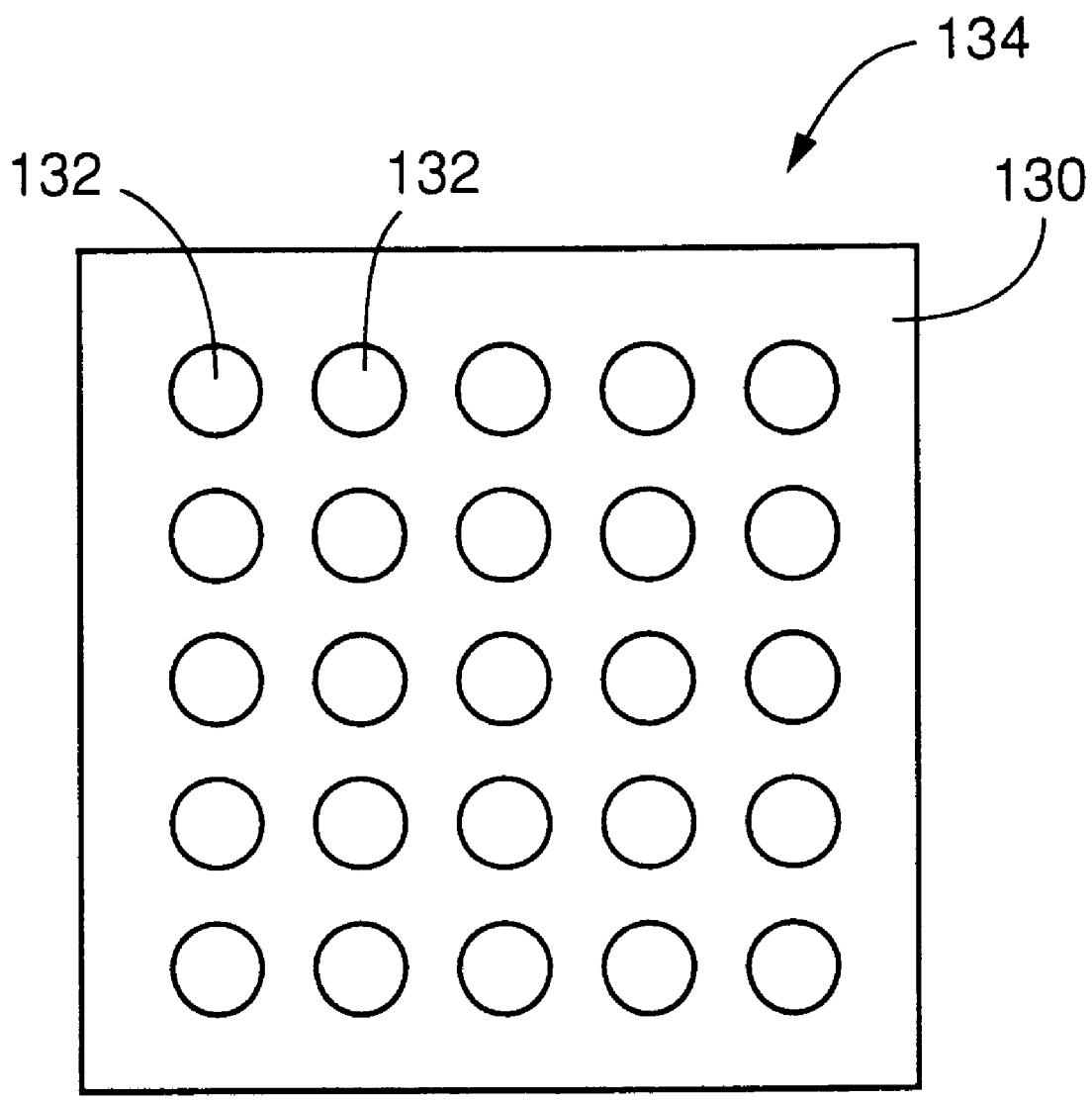
FIG. 11 is a plan view of another calibrating gauge which is used for calibrating the image taking device.

In a particular case where a higher accuracy of measurement of dimensions is needed, it is preferred to remove errors of measurement of dimensions that result from a local distortion of the reflection surface 70, the image forming lens 82, and/or the object lens 108. For example, it is possible to use a calibrating gauge 134, shown in FIG. 11, which is provided by a glass plate 130 having identical reference marks 132 arranged at the same pitch in lines and rows. First, the gauge 134 is placed on the object-support plate 72 and then the distance between each pair of adjacent reference marks 132 is measured along each of the lines and rows. The differences among the thus measured distances are stored, in the image processing device 12, as distortion data indicating one or more possible local distortions of the reflection surface 70, the image forming lens 82, and/or the object lens 108. The thus stored distortion data are used for correcting the measured dimensions of the object 122. Though the number of the reference marks 132 shown in FIG. 11 is small, it is preferred that a greater number of reference marks 132 be provided at a smaller pitch on the glass plate 130. The reference marks 132 may be either ones which interrupt light beams or ones which transmit the same. In the former case, the glass plate 130 should be one which transmits light beams; and in the latter case, the glass plate 130 should be one which interrupts the same.

Next, there will be described the image processing device 12. The image processing device 12 is one which has been developed for use in an electric-component ("EC") mounting system including an EC supplying device and an EC holding head (e.g., an EC suction head) which receives an EC from the EC supplying device, holds the EC, conveys the EC, and mounts the EC on a circuit substrate ("CS") (e.g., a printed circuit board) supported by a CS supporting device. The EC mounting system measures the X-direction, Y-direction, and rotation position of the EC held by the EC holding head, and also measures those of the CS supported by the CS supporting device. The rotation position of each of the EC and the CS is defined as the angle of rotation of each of the EC and the CS from a corresponding reference rotation position. Hereinafter, the rotation position is referred to as the "rotation angle". After the EC mounting system corrects errors of the position and rotation angle of each of the EC and the CS, the EC mounting head mounts the EC on the CS. To this end, the EC mounting system employs an image-take sensor which takes an image of the EC and respective images of reference marks of the CS. The image processing device 12 has been developed as one which processes each image taken by the image-take sensor. Therefore, the image processing device 12 may be connected to, in place of the CCD camera 76 of the image taking device 10, a CCD camera employed in an image taking device of the EC mounting system. In the latter case, the image processing device 12 measures the position and rotation angle of each of the EC and the reference marks of the CS, based on an image thereof taken by the latter CCD camera. Alternatively, the above-described image taking device 10 may be employed in the EC mounting system. In the last case, the image processing device 12 measures the position and rotation angle of each of the EC and the reference marks of the CS, based on an image thereof taken by the CCD camera 76.

Figure 12:
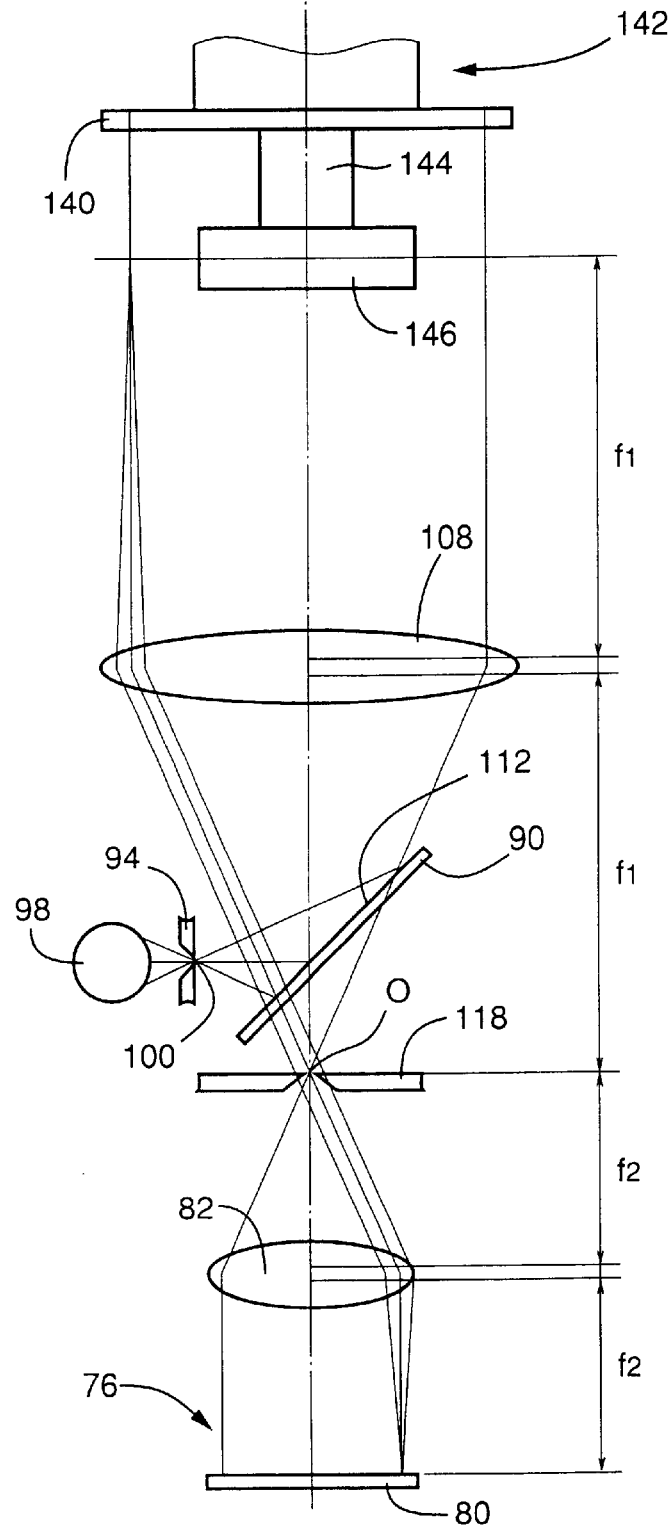
FIG. 12 is a schematic view of an image taking device of an electric-component mounting system that may be connected, in place of the image taking device of FIG. 1, to the image processing device of FIG. 4.

For example, in FIG. 12, reference numeral 142 designates an EC suction head to which a mirror 140 corresponding to the mirror 68 is attached. In this case, an image taking device which includes the same optical system as that of the image taking device 10 takes, according to the same principle as that described above, an image of an EC 146 held by an EC suction pipe 144 of the head 142. Though the present image taking device employs, for supporting the elements of the optical system thereof, different elements than those employed in the image taking device 10, the description of those different elements is omitted because they are not relevant to the present invention.

Figure 13:
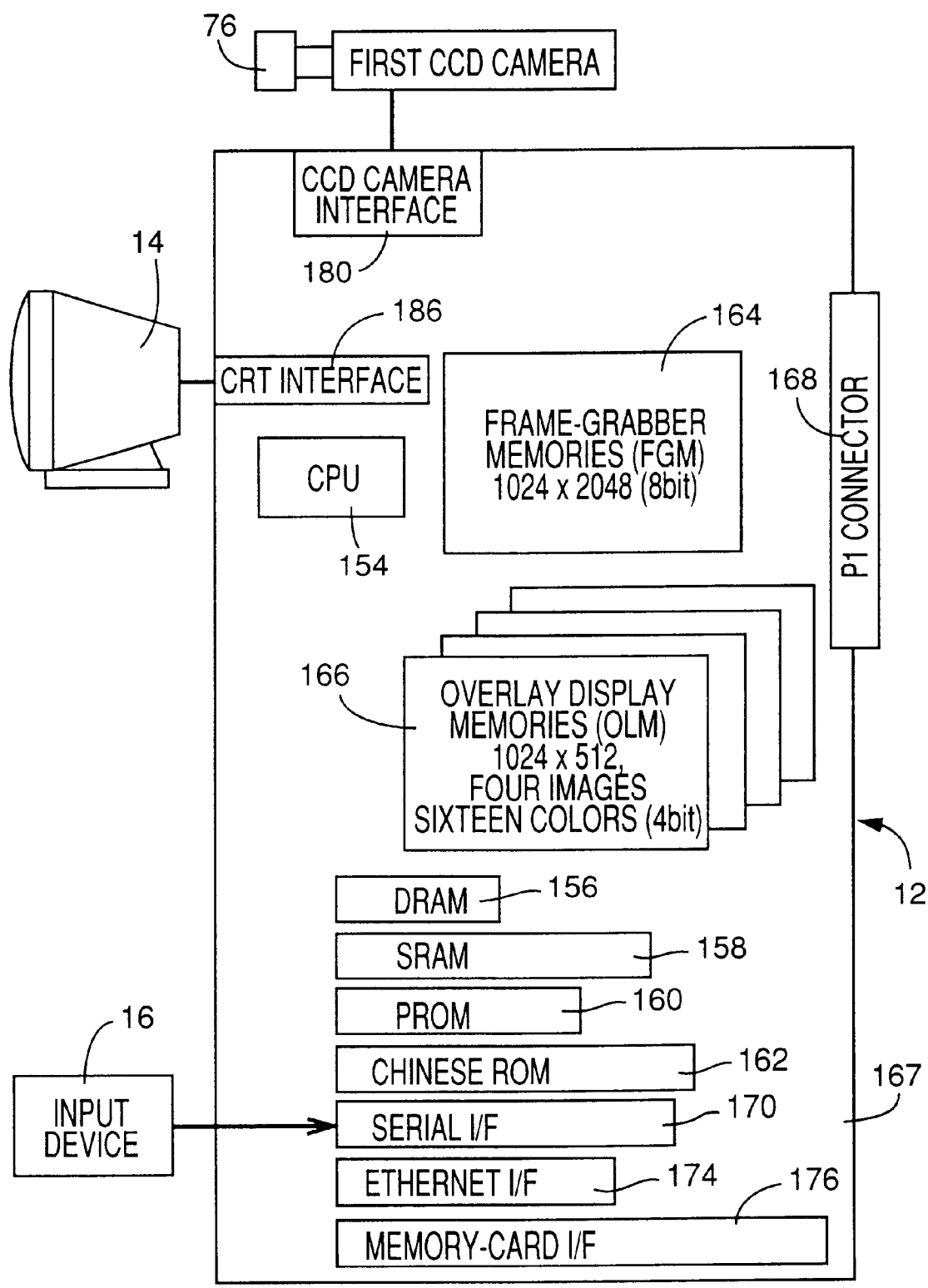
FIG. 13 is a diagrammatic view of the image processing device of FIG. 4.

Thus, the image processing device 12 processes image data representing an image of a cubic object 122, an EC 146, or each reference mark of a CS that is taken by the CCD camera 76, measures the dimensions of the cubic object 122, inspects the object 122 for finding one or more possible defects, and measures the position and rotation angle of the EC 146 or the CS. The image processing device 12 is essentially provided by a computer which includes, as shown in FIG. 13, a central processing unit ("CPU") 154, a dynamic random access memory ("DRAM") 156, a static random access memory ("SRAM") 158, a programmable read only memory (PROM) 160, a Chinese-letter read only memory 162 (hereinafter, referred to as the "Chinese ROM" 162), four frame-grabber memories ("FGMs") 164, and four overlay display memories ("OLMs") 166, all of which are connected to one another via an internal bus (not shown) which is provided on a common circuit substrate 167.

A two-channel serial interface 170 is also connected to the above-indicated internal bus, and the input device 16 is connected to the serial interface 170. The input device 16 includes the keyboard 18 having alphanumeric keys, and is used to input, into the computer, the information and commands needed to operate the measuring and inspecting apparatus 8 as a whole, and the information needed to process respective images of objects 122, e.g., the sort, and/or total number, of the objects 122 to be image-processed (what is image-processed may be either an entire object 122, or a particular portion of an object 122). An Ethernet interface 174 and a memory-card interface 176 are also connected to the internal bus.

The Ethernet interface 174 is for communicating with another computer which controls an apparatus, such as the above-described EC mounting system, other than the image processing device 12. The image processing device 12 may be connected to an optional control device, and the Ethernet interface 174 is used for exchanging data with the control device via a P1 connector 168. For example, in the case where the measuring and inspecting apparatus 8 is used with the above-mentioned EC mounting system, various sorts of drive devices of the mounting system are controlled by a second computer independent of the first computer of the image processing device 12, and the second computer is connected to the P1 connector 168 via an external bus (not shown). However, since the second computer is not relevant to the present invention, the description and illustration thereof is omitted.

When a memory card in which the control programs prepared in advance to control the image processing operation are pre-stored is inserted in the image processing device 12, the CPU 154 utilizes the PROM 160 to read, from the memory card inserted, the control programs and the data needed to carry out the programs, via the memory-card interface 176, and stores the thus read programs and data in the DRAM 156.

A CCD-camera interface 180 is also connected to the internal bus. The CCD camera 76 of the measuring and inspecting apparatus 8 (or the CCD camera of the EC mounting system) is connected to the CCD-camera interface 180. A batch of image data representing an image taken by the CCD camera 76 is stored in one of the FGMs 164 via the CCD-camera interface 180. As described above, the image processing device 12 includes the four FGMs 164, and four bathes of image data successively obtained from four objects 122 are sequentially stored in the four FGMs 164, respectively.

A CRT interface 186 is also connected to the internal bus of the image processing device 12, and the CRT monitor device 14 is connected to the CRT interface 14. The monitor device 14 can display both a full-color image and a monochromatic image. Four batches of image data obtained by taking respective monochromatic images of four objects 122 are stored in the four FGMs 164, respectively, and the four OLMs 166 store four batches of image data representing four sixteen-color images, respectively. The monitor device 14 displays a selected one of the four monochromatic images, superposes one of the four sixteen-color images that corresponds to the selected monochromatic image, and thereby displays the current state, or results, of the image processing operation.

The CRT monitor device 14 also displays color images corresponding to the data input through the input device 16, while utilizing the Chinese ROM 162 of the image processing device 12.

Hereinafter, there will be described the operation of the image processing device 12 for processing a batch of image data representing an image taken by the CCD camera 76.

As described above, the control programs and data needed to process images are stored in the memory card and, when the memory card is set in a card reader (not shown) of the image processing device 12, the programs and data are read from the memory card and are stored in the DRAM 156. The control programs read from the memory card are shown in FIGS. 14, 15, and 16. According to those programs, the image processing device 12 measures the dimensions, position, and/or rotation angle of an object 122, inspects the dimensions of the object 122, and judges whether the object 122 has any defects.

FIG. 14 shows a preliminary processing program, which is carried out when an object inspecting program is started, i.e., immediately after the preliminary processing program is stored in the DRAM 156. First, it is judged whether a pattern matching is to be performed with respect to one of all objects 122 that are needed to carry out the object inspecting program. If a positive judgment is made with respect to the one object 122, individual seek templates are produced based on a master seek template, and are stored in the DRAM 156. A similar operation is sequentially performed with respect to each of the other objects 122 to be image-processed.

The above-mentioned master seek template is defined by a plurality of pairs of points which are located on an X-Y coordinate system or plane (hereinafter, referred to as the "master-seek-template coordinate plane"). The master-seek-template coordinate plane coincides with a reference coordinate plane of the image processing device 12. That is, the origin and X and Y axes of the master-seek-template coordinate plane coincide with those of the reference coordinate plane, i.e., the center of the field of view of the CCD camera 76 and the two orthogonal coordinate axes of the field of view. A batch of seek-template data representing a master seek template is prepared in advance based on the shape and dimensions of an object 122, and is stored in the memory card. When the preliminary processing program is read, the batch of seek-template data is read from the memory card and is stored with the preliminary processing program in the DRAM 156.

Figure 18:
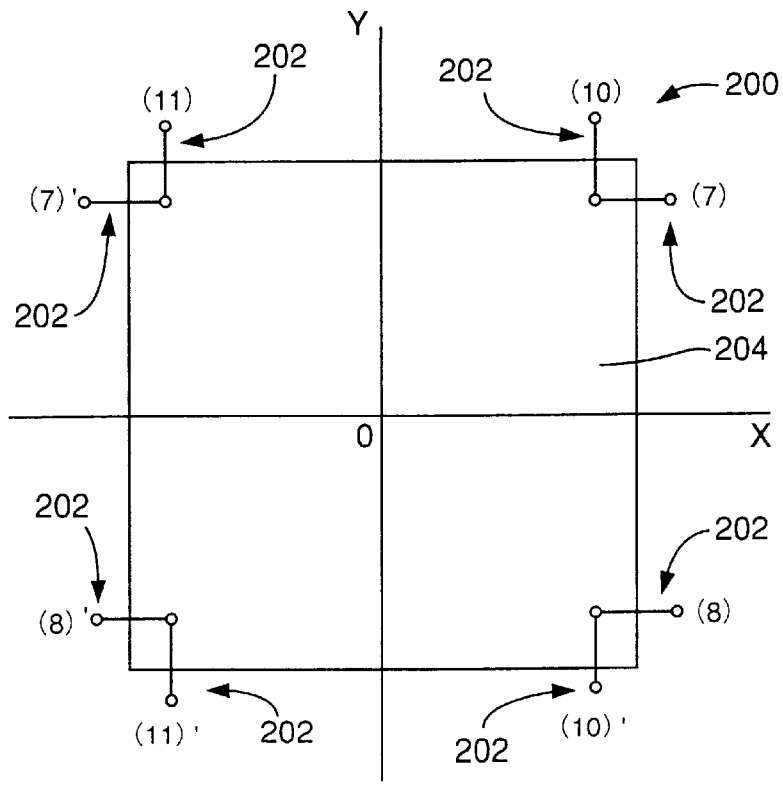
FIG. 18 is a view showing a master seek template defined by the pre-stored data shown in FIG. 17, together with the square image.

FIG. 17 shows an example of a batch of seek-template data which represents a master seek template 200, shown in FIG. 18, which is prepared to seek a square image 204 of an object 122. In FIG. 17, the batch of seek-template data are provided by Lines 7, 8, 10, and 11, and "hs=5.5" of Line 5. The term "hs" (half span) means half the distance between each pair of points 202. The term "Pair" indicates that another pair of points 202 are located on a straight line extended from a straight segment connecting between a related pair of points 202, such that the another pair of points 202 are symmetric with the related pair of points 202 with respect to an appropriate one of the X axis, the Y axis, and the origin of the master-seek-template coordinate plane. For example, FIG. 18, shows four original pairs of points 202 {(7), (8), (10), (11)} corresponding to Lines 7, 8, 10, and 11 shown in FIG. 17, and four symmetric pairs of points 202 {(7)', (8)', (10)', (11)'}. Respective parenthesized numbers assigned to the pairs of points 202, shown in FIG. 18, correspond to the respective numbers assigned to the lines, shown in FIG. 17, that define those pairs of points.

A master template is formed or produced, as shown in FIG. 18, such that one of each pair of points 202 is located inside an edge (or outline) of a reference object which has no dimension errors, no position error, or no rotation-angle error, the other point is located outside the edge of the reference object, and the middle point of each pair of points 202 is located just on the edge of the reference object.

However, generally, it is not essentially required that the middle point of each pair of points 202 of a master seek template 200 be located on an edge of a reference object, so long as the two points 202 of each pair are located inside and outside the edge of the reference object, respectively.

In the example shown in FIG. 18, each pair of points 202 include one point common to another pair of points 202. However, this is not an essential feature, either.

In FIG. 18, the two points 202 of each pair are connected by a straight segment, for easier understanding purposes only, and no data corresponding to those segments are included in the batch of seek-template data shown in FIG. 17.

Figure 22:
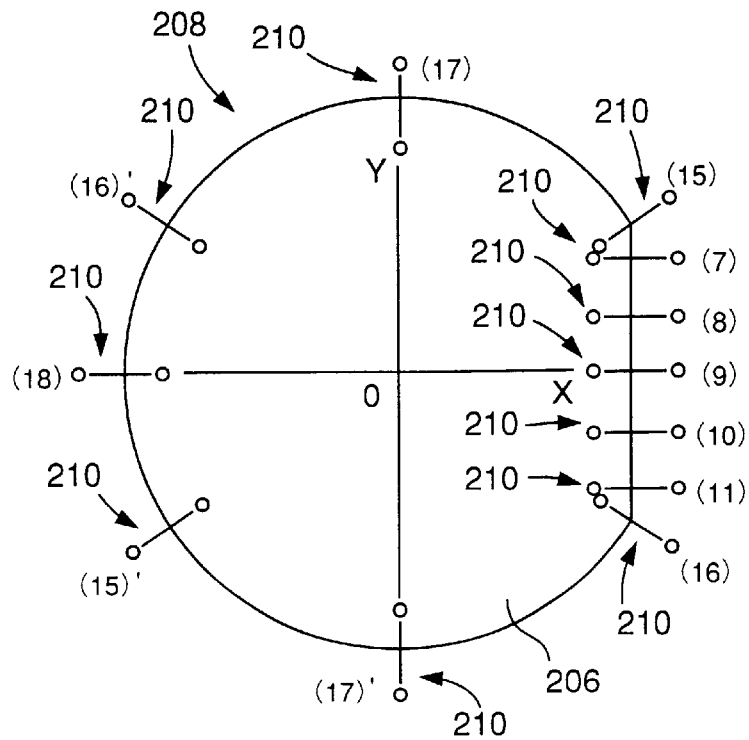
FIG. 22 is a view showing a master seek template defined by the pre-stored data shown in FIG. 21, together with the image of the disc.

FIG. 21 shows a batch of seek-template data defining a master seek template 208, shown in FIG. 22, which is prepared in advance to seek an image 206 of a partly cut disc as an object 122. In FIG. 21, the batch of seek-template data are provided by Lines 7 to 11 and Lines 15 to 18. FIG. 22 shows three original pairs of points 210 {(15), (16), (17)} that are related to a circular edge of the image 206 of the disc and defined by Lines 15 to 17 shown in FIG. 21, and three pairs of points 210 {(15)', (16)', (17)'} that are symmetric with the original pairs of points 210 {(15), (16), (17)}. However, the master seek template 208 does not include any pairs of points symmetric with the other original pairs of points 210 {(7), (8), (9), (10), (11), (18)}.

Figure 20:
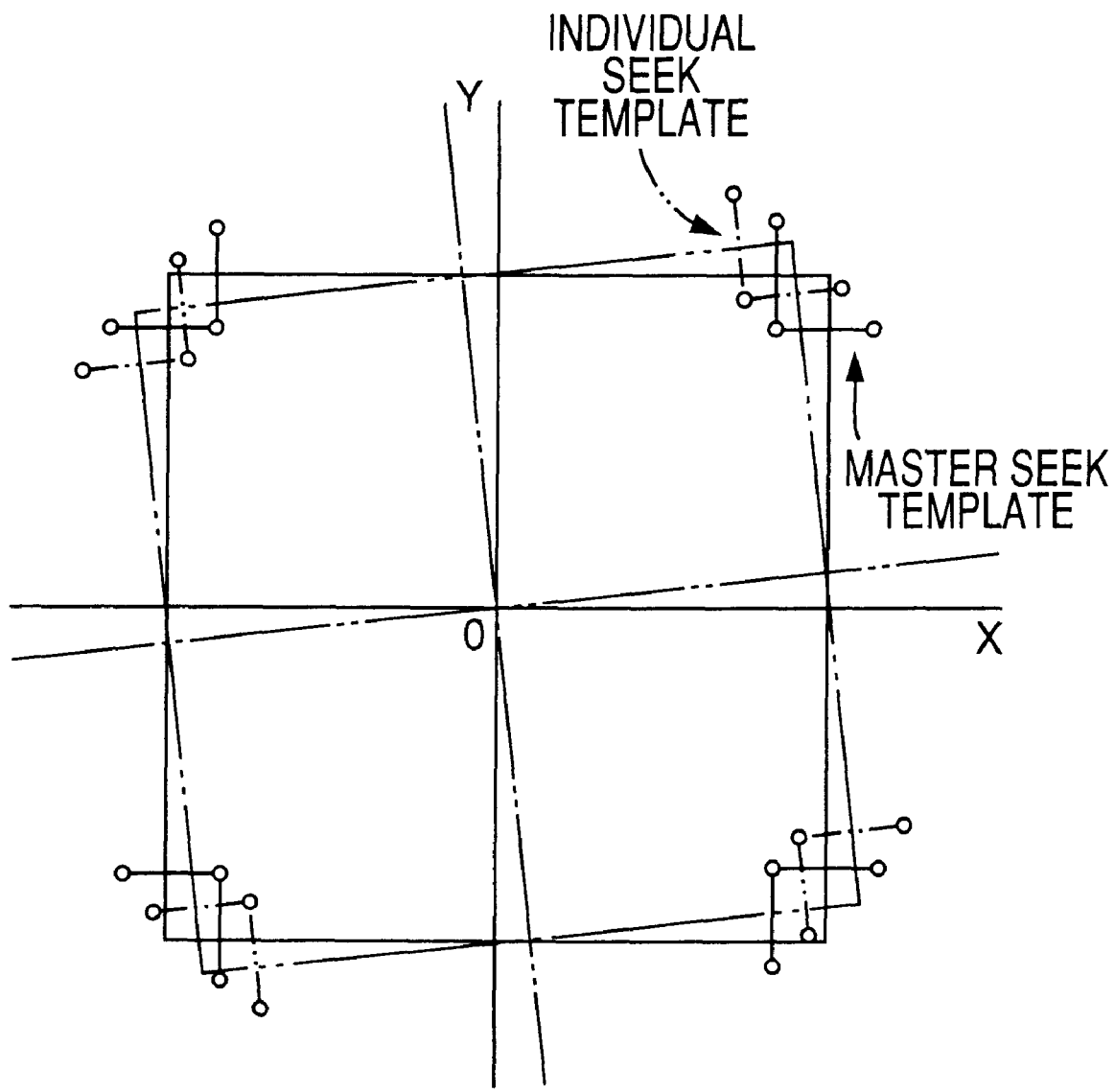
FIG. 20 is a view for explaining a manner in which an individual seek template is produced based on the master seek template.

In the present embodiment, what is to be image-processed may be the entirety of an image of an object 122 to be measured or inspected, and a plurality of batches of seek-template data may be prepared in advance, and stored in the memory card, for the purpose of seeking a plurality of sorts of objects 122, respectively. When an image processing operation is performed, all the batches of seek-template data are read from the memory card and are stored in the DRAM 156. Accordingly, when a certain sort of object 122 is sought, a batch of seek-template data corresponding to that sort of the object 122 is read from the DRAM 156, and a plurality of individual seek templates are produced based on the thus obtained seek-template data. A master seek template corresponds to one of the individual seek templates that is produced based on a corresponding batch of seek-template data such that the one individual seek template is not rotated by any angles. The other individual seek templates are obtained by rotating the master seek template by respective angles equal to respective products of a predetermined rotation pitch and respective integral numbers, within a predetermined angular range, as indicated at two-dot chain line in FIG. 20. The thus obtained individual seek templates are stored in the DRAM 156.

As shown in FIG. 17, data indicating the above-mentioned predetermined rotation pitch and angular range are stored with each batch of seek-template data in the DRAM 156. The term "pitchA=4.5" on Line 15 defines the predetermined rotation pitch (i.e., 4.5 degrees), the term "start=-45" on Line 16 defines a start angle of the predetermined angular range (i.e., -45 degrees), and the term "end=45" on Line 17 defines an end angle of the angular range (i.e., 45 degrees). Data indicating a rotation pitch and an angular range based on which individual seek templates are produced are prepared in advance for each sort of object 122. For example, in the case where it is expected that a certain sort of object 122 may be placed on the object-support plate 72 with a great rotation-angle error, a wide angular range is predetermined for that sort of object 122. In the example shown in FIG. 14, the preliminary processing program defines a predetermined seek-template-production angular range of -45 to +45 degrees and a predetermined rotation pitch of 5 degrees.

If the production of all individual seek templates for the first object 122 ends, the control in accordance with the control program shown in FIG. 14 returns to the start. Then, for the next, second object 122, it is judged whether a pattern matching is to be performed and, if a positive judgment is made, a plurality of individual seek templates are produced for the sort of object 122. On the other hand, if a negative judgment is made, the control returns to the start and, for the further, third object 122, it is judged whether a pattern matching is to be performed. If this judgment is done for all objects 122 to be measured or inspected and the production of individual seek templates ends for each of the objects 122 for which a positive judgment is made, the control quits the control program of FIG. 14.

Next, there will be described the control in accordance with an image processing program shown in FIG. 15. This program is carried out after an image of an object 122 is taken by the CCD camera 76 and a batch of image data representing the taken image is stored in an appropriate one of the four FGMs 164. First, if the image of object 122 is a simple one which can be image-processed by a single pattern matching only, for example, if the image of object 122 is square, the image is processed according to a pattern matching program shown in FIG. 16.

Next, it is judged whether the image of object 122 needs to be processed by a pattern matching manager wherein pattern matchings are combined. The method of combining pattern matchings will be described later. For example, a positive judgment is made at this step, if an object 122 is an EC having a number of lead wires and accordingly having a complicated shape, such as QFP (quad flat package), PLCC (plastic leaded chip carrier), or SOP (small out line package); one including a number of portions whose images are to be processed, such as BGA (ball grid array) including a number of solder bumps; one having a complicated shape whose image is to be processed, such as a grid pattern of a solar cell; or a part or component of a machine that has a complicated shape.

If a negative judgment is made at the above step, that is, if no operation of the pattern matching manager is needed, then it is judged at the next step whether the image of object 122 needs to be processed on a virtual screen. If a negative judgment is made, then it is judged whether the image of object 122 needs to be processed on a physical screen. The physical screen is defined as one on which a batch of image data actually exists which includes a number of sets of picture-element data each of which represents an optical characteristic value of a corresponding one of a number of picture elements of the physical image of the object 122. The virtual screen is defined as one on which a plurality of sets of virtual-point data assumedly exist which are obtained, as needed, by calculation based on the batch of image data and each set of which represents an optical characteristic value of a corresponding one of a plurality of virtual points designated independent of the picture elements of the physical image represented by the batch of image data. The pattern matching program of FIG. 16 and the pattern matching manager are carried out or operated on the virtual screen as will be described later. However, the image processing device 12 can perform an image processing operation on each of the virtual screen and the physical screen, without using the pattern matching program of FIG. 16 or the pattern matching manager. Judging whether the image of object 122 needs to be processed on the virtual screen, and whether the image of object 122 needs to be processed on the physical screen means judging whether the object inspecting program includes a command that the image of object 122 be processed by the pattern matching program of FIG. 16 or the pattern matching manager.

There will be described the pattern matching program of FIG. 16.

First, a search window is produced which defines or limits a seek area within which an object to be image-processed is sought. The production of the search window is achieved by designating the coordinate values of each of a plurality of points defining a certain portion, or the entirety, of the image-take surface (i.e., the field of view) of the CCD camera 76. Of what sort the object is known from the data included in the object inspecting program. Therefore, the image processing device 12 can approximately estimate a position of an image of the object formed on the image-take surface of the CCD camera 76. Thus, the search window can be produced to fully encompass or cover the image of the object, even if the object may have more or less position and/or rotation-angle errors. In this way, the search window is moved in a narrow seek area, and accordingly only a short time is needed to seek out the object.

A complete pattern matching includes five steps, i.e., a seek step, a re-seek step, a measure step, a re-measure step, and an inspect step. The seek step is for seeking an object to be image-processed; the re-seek step is for seeking edge points corresponding to an edge of the object; the measure step is for calculating the coordinate values of each of the edge points; and the re-measure step is for repeating the measure step one or more times. Usually the pattern matching ends when all the five steps end. However, if an abnormality occurs to any one of those steps, that one step is immediately terminated, and the following step is not started. That is, the pattern matching is immediately terminated.

First of all, the seek step will be described.

Figure 24:
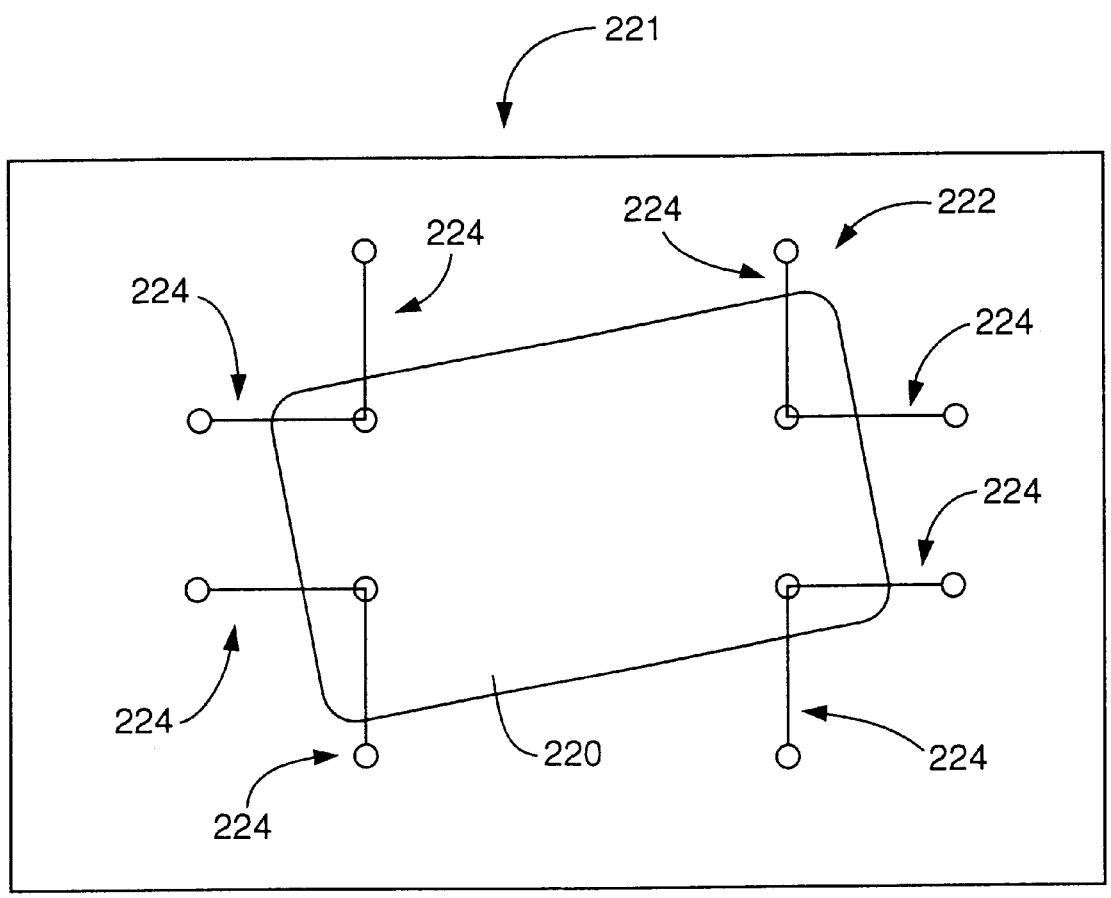
FIG. 24 is a view showing an individual seek template which is placed on a virtual screen in a seek step of the pattern matching program.

In the seek step, individual seek templates are sequentially read, one by one, from the DRAM 156. As shown in FIG. 24, each individual seek template 222 is placed, on a virtual screen 221, on a physical image which, in fact, is not present on the virtual screen 221 but is present on the physical screen, i.e., the image-take surface of the CCD camera 76 and which includes a taken image 220 of an object to be processed and an image of the background of the object. The background image means the image other than the image of the object to be processed. For example, in the case where the object to be image-processed is a groove formed in an outer surface of a part or a component, the background image is the image of the outer surface other than the image of the groove. Then, the computer of the image processing device 12 calculates an optical characteristic value of the physical image that corresponds to each point of a plurality of pairs of points 224 defining an individual seek template 222. In the present embodiment, the optical characteristic value is a luminance value. More specifically described, the computer calculates, by interpolation, a luminance value corresponding to each of the points 224 on the virtual screen 221, based on the respective luminance values of the picture elements of the taken image 220 and the background image on the physical screen. Regarding the example shown in FIG. 17, an individual seek template which has a rotation angle of −45 degrees is first read from the DRAM 156. FIG. 24 visualizes the points 224 which define the individual seek template 222, exist on the virtual screen 221, and correspond to the thus calculated luminance values, respectively. This means that a seek template is placed or superposed on a screen on which an image represented by a batch of image data is present. Thus, the respective luminance values corresponding to the template-defining points 224 are calculated based on the respective luminance values of the picture elements of the physical image that correspond to the defining points 224. Regarding the virtual screen 221 shown in FIG. 24, the taken image 220 or the batch of image data representing the image 220 is just assumed to exist on the virtual screen 221 and, in fact, does not exist. This also applies to the examples shown in the other figures.

Figure 25:
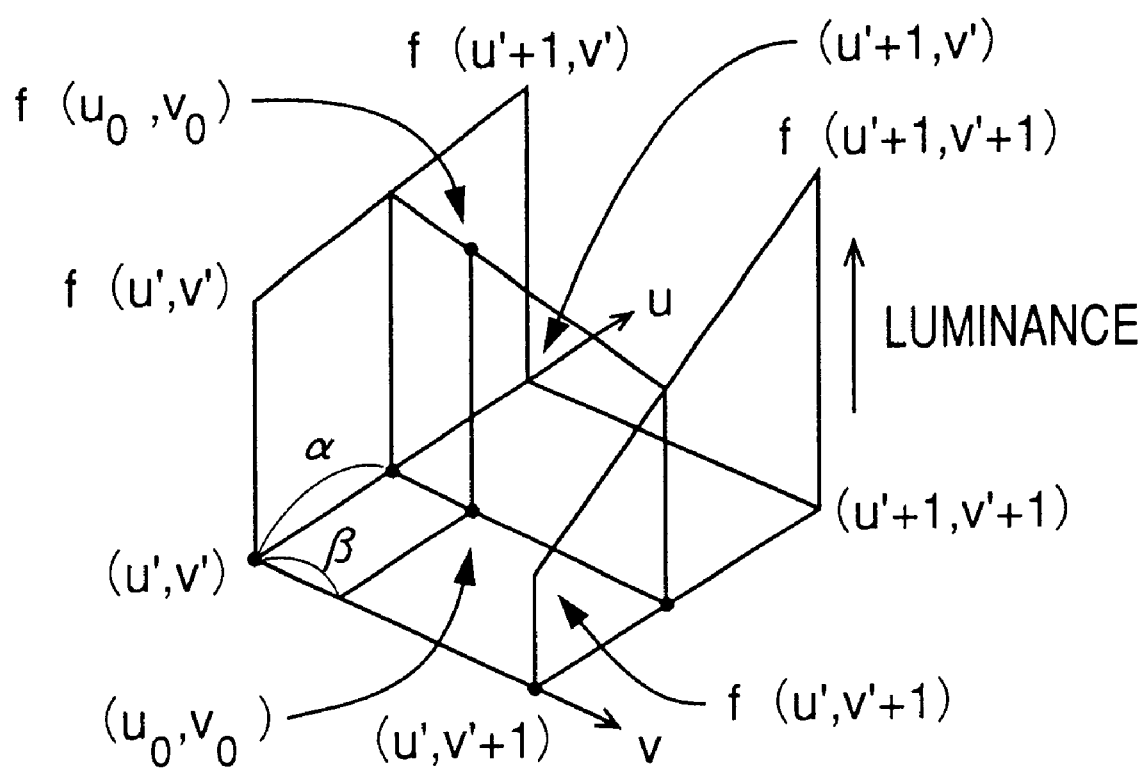
FIG. 25 is a view for explaining a manner in which a luminance value corresponding to a virtual point designated on the virtual screen is calculated by linear interpolation.

The interpolation of respective luminance values of the picture elements of the taken image 220 and the background image that correspond to each one of the template-defining points 224 may be carried out using a continuous curved surface, for example, a bicubic spline surface defined by 4×4 (=16) control points provided by 4×4 picture elements which correspond to the each one defining point 224. However, in the present embodiment, four picture elements of the physical image that are adjacent to each defining point 224 on the virtual screen 221 are used to calculate, by the simplest linear interpolation, a luminance value corresponding to the each defining point 224. In FIG. 25, $(u_0, v_0)$ represents a position of a template-defining point 224; $f(u_0, v_0)$ represents a luminance value of the defining point $(u_0, v_0)$; $(u', v')$, $(u'+1, v')$, $(u', v'+1)$, and $(u'+1, v'+1)$ represent respective positions of respective centers of four picture elements adjacent to the defining point $(u_0, v_0)$; and $f(u', v')$, $f(u'+1, v')$, $f(u', v'+1)$, and $f(u'+1, v'+1)$ represent respective luminance values of the four adjacent picture elements. The luminance value, f, of the defining point 224 is calculated according to the following expression (1):

$$f = (u_0, v_0) \quad (1)$$
$$= f(u', v')(1-\alpha)(1-\beta) + f(u'+1, v')\alpha(1-\beta) +$$
$$f(u', v'+1)(1-\alpha)\beta + f(u'+1, v'+1)\alpha\beta$$

Figure 26:
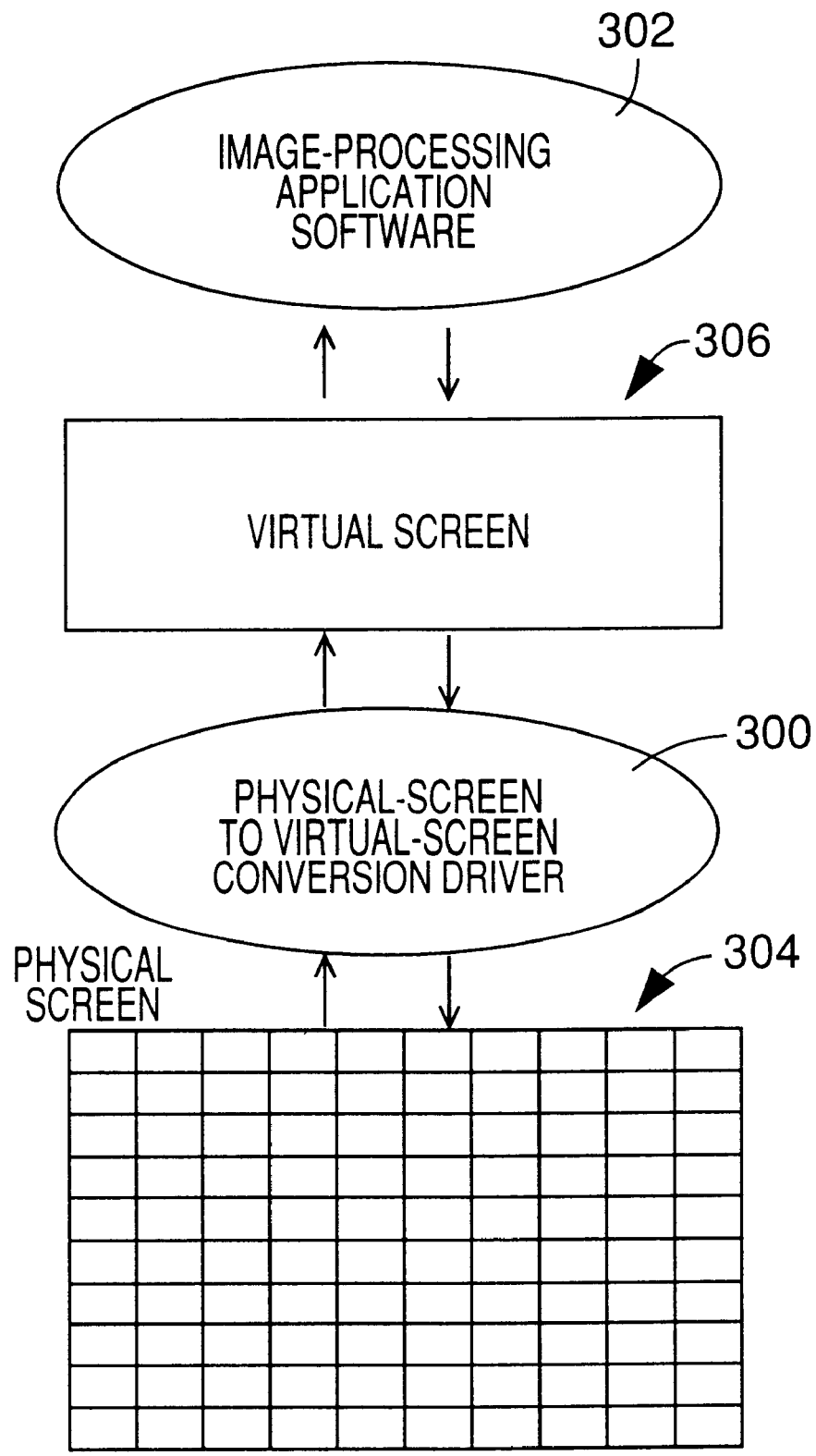
FIG. 26 is a schematic view of a physical-screen to virtual-screen conversion driver which is employed in the image processing device to convert image data representing a physical image on a physical screen, into image data representing a virtual image on the virtual screen.

The above-indicated calculation of luminance value f is carried out by a physical-screen to virtual-screen ("PS/VS") conversion driver 300 shown in FIG. 26. The PS/VS conversion driver 300 is independent of a common image-processing application software 302 employed in the image processing device 12. Each time the PS/VS conversion driver 300 is needed to produce image data defining a virtual point or points on a virtual screen 306, based on image data present on a physical screen 304, the computer uses the PS/VS conversion driver 300 to produce the image data defining the virtual point or points on the virtual screen 306.

Each time the respective luminance values corresponding to the two template-defining points 224 of each pair are calculated, those two luminance values are compared with each other. When the CCD camera 76 takes an image of an object 122 to be measured or inspected as an object to be image-processed, the object 122 reflects less amount of light toward the CCD camera 76, than the reflection surface 70 as the background of the object 122. Thus, there occurs a difference between the respective amounts of electric charges produced in a portion of the solid-state image-take elements of the CCD camera 76 that corresponds to the object to be image-processed (i.e., the object 122 to be measured or inspected) and the remaining portion of the image-take elements of the same 76 that corresponds to the background of the object (i.e., the reflection surface 70). That is, the taken image of the object to be image-processed is darker than the image of the background. Therefore, if the absolute value of difference of the respective luminance values corresponding to the two defining points 224 of each pair is not smaller than a reference luminance-difference value, it can be concluded that one of the two points 224 is located inside an edge of the object and the other point 224 is located outside the edge, i.e., in the background of the object.

Data indicating the above-mentioned reference luminance-difference value are pre-stored with the seek-template data in the memory card, and are stored in advance in the DRAM 156. In the example shown in FIG. 17, Line 5 defines a reference luminance-difference value, "diff=20". In the present embodiment, the difference of the respective luminance values corresponding to the two defining points 224 of each pair is obtained by subtracting the luminance value of a virtual point corresponding to one of the two points 224 that is estimated to be located inside the edge of the object, from that corresponding to the other point 224 which is estimated to be located outside the edge. If the thus obtained luminance difference is not smaller than 20 (degrees), it is judged that one point 224 which is estimated to be located inside the edge is actually located inside the edge and the other point 224 which is estimated to be located outside the edge is actually located outside the edge. In the present embodiment, each set of picture-element data can indicate one of natural numbers from 1 to 256 as a luminance value of a corresponding picture element.

However, it is possible to determine a luminance difference by subtracting the luminance value corresponding to one of the two defining points 224 that is estimated to be located outside the edge of the object, from that corresponding to the other defining point 224 that is estimated to be located inside the edge. In the latter case, Line 5 shown in FIG. 17 is modified to define a reference luminance-difference value, "diff=−20".

In either case, the pair of defining points 224 in question satisfies a predetermined condition that the absolute value of the luminance difference is not smaller than a reference luminance-difference value (hereinafter, referred to as the "luminance-difference condition"), and it is therefore concluded that one of the two points 224 is located inside the edge of the object and the other point 224 is located outside the edge.

However, one or more pairs of defining points 224 may fail to satisfy the above-defined luminance-difference condition, (a) because the object being image-processed is not identical with the reference object corresponding to the master seek template, (b) because no object 122 has been placed on the object-support plate 72 due to an object-supply failure, or (c) because some solid-state image-take elements (i.e., some CCDs 80) of the CCD camera 76 fail to take respective picture-element images due to dust adhered thereto. Hereinafter, this will be referred to as the "point-pair failure or failures". If the computer finds greater than a predetermined number of permissible point-pair failures (e.g., one, two, etc.), the computer judges that the object being image-processed is not identical with the reference object corresponding to the master seek template represented by the seek-template data stored in the DRAM 156. For example, in the example shown in FIG. 17, Line 3 defines a predetermined number of permissible point-pair failures, "failCount=0". Therefore, if at least one pair of points 224 fails to satisfy the luminance-difference condition, it is not judged that the object being image-processed is identical with the reference object corresponding to the master seek template.

In the case where the predetermined number of permissible point-pair failures (i.e., "failCount") is one or a greater number, the computer judges, if greater than the predetermined number of pairs of points fail to satisfy the luminance-difference condition, that the object being image-processed is not identical with the reference object corresponding to the master seek template. If the computer makes a positive judgment that the object being image-processed is identical with the reference object, as a result of use of the first individual seek template having the rotation angle of −45 degree, the seek step is terminated, and the re-seek step is commenced. On the other hand, if a negative judgment is made, another individual seek template having a different rotation angle is read from the DRAM 156 to seek the object in question.

So long as negative judgments are made, individual seek templates having respective rotation angles are sequentially read from the DRAM 156 to seek the object in question. Unless a positive judgment is obtained even after all the individual seek templates are used, then the seek step is continued by changing the current position of the individual seek templates to a new one. More specifically described, the individual seek templates are moved in the X and/or Y directions at respective pitches to a new position where the individual seek templates are used to seek out the actual object identical with the reference object.

Data indicating the above-mentioned X-direction and Y-direction movement pitches are prepared in advance and pre-stored with the seek-template data in the memory card. Regarding the example of FIG. 17, Lines 13 and 14 define predetermined X-direction and Y-direction movement pitches, "pitchX=2.2" and "pitchY=2.2", respectively. First, the individual seek templates are moved to a new position in the Y direction by the predetermined Y-direction movement pitch, "pitchY=2.2". More specifically described, the coordinate values of each of all the template-defining points 224 are moved by the predetermined pitch in a positive direction of the Y direction. At the new position, the individual seek templates 222 are used to judge whether the object being image-processed is identical with the reference object. Unless a positive judgment is made even if all the individual seek templates 222 having the different rotation angles are moved to the new position and applied to the taken image 220 on the virtual screen 221, then the individual seek templates 222 are moved to another new position in a positive direction of the X direction by the X-direction pitch, "pitchX=2.2". Unless a positive judgment is made at this new position, then the individual seek templates 222 are moved in a negative direction of the Y direction by the Y-direction pitch. Unless a positive judgment is made at this new position, then the individual seek templates 222 are moved once more in the negative direction of the Y direction by the Y-direction pitch. Unless a positive judgment is made at this new position, then the individual seek templates 222 are moved in a negative direction of the X direction by the X-direction pitch. In this way, the individual seek templates 222 are moved in the search window while drawing a "rectangular" spiral locus of movement.

If no positive judgment has been made and one or more pairs of points 224 have gone out of the search window as a result of the spiral movement of the individual seek templates 222, the CPU 154 judges that the individual seek templates 222 can no longer be moved in the search window and makes a final conclusion that the object being image-processed is not identical with the reference object, that is, that there is no actual object possibly identical with the reference object, in the search window. Thus, the CPU 154 recognizes an abnormality, terminates the seek step, commands the CRT monitor device 14 to display that the abnormality has occurred, and stores data indicating the occurrence of the abnormality in the DRAM 156. In the case where the object being image-processed is an object 122 to be measured or inspected, the operator checks the position where the object 122 is placed on the object-support plate 72 and, if the operator recognizes that the object 122 has been placed largely out of position, he or she corrects the position. On the other hand, if the object 122 has been placed in position, the operator can conclude that the object 122 is not an expected one, e.g., not one which is prescribed by the object inspecting program. In the last case, the operator can discard the object 122.

Figure 27:
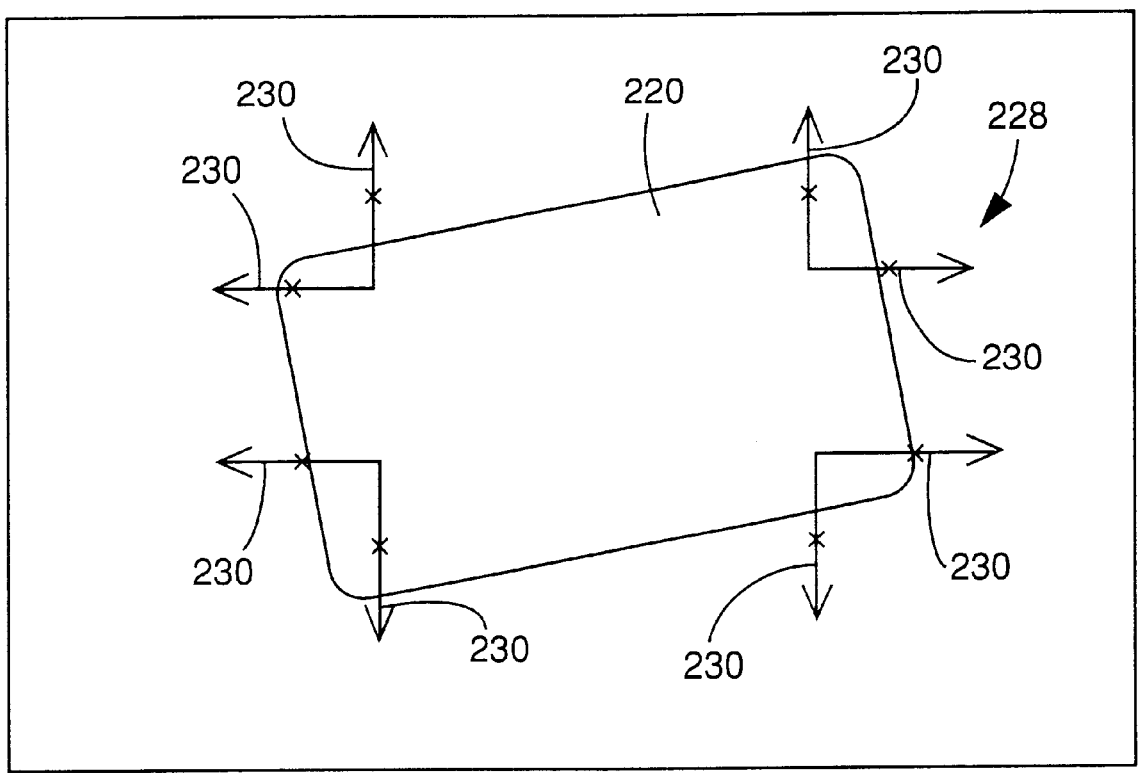
FIG. 27 is a view showing a re-seek template which is placed on the virtual screen in a re-seek step of the pattern matching program.

Regarding the taken image 220 shown in FIG. 24, all the pairs of points 224 of the individual seek template 222 satisfies the luminance-difference condition, and the two points 224 of each pair are located inside and outside the edge of the image 220, respectively. In this case, a positive judgment is made that the object whose image 220 is being processed is identical with the reference object corresponding to the master seek template, and data indicating the position and rotation angle of the individual seek template 222 are stored in the DRAM 156. Then, the seek step is followed by the re-seek step in which a re-seek template 228 is used to seek edge points of the taken image 220, as shown in FIG. 27. The re-seek template 228 includes a plurality of search lines 230 which are produced based on the individual seek template 222 with which the object whose image 220 is being processed is judged, in the seek step, as being identical with the reference object, on a re-seek-template coordinate plane, i.e., the coordinate plane of that individual seek template. Each search line 230 is defined as a straight segment connecting between the two points 224 of a corresponding pair. Thus, the search lines 230 of the re-seek template 228 exist on the virtual screen 221.

Figure 28:
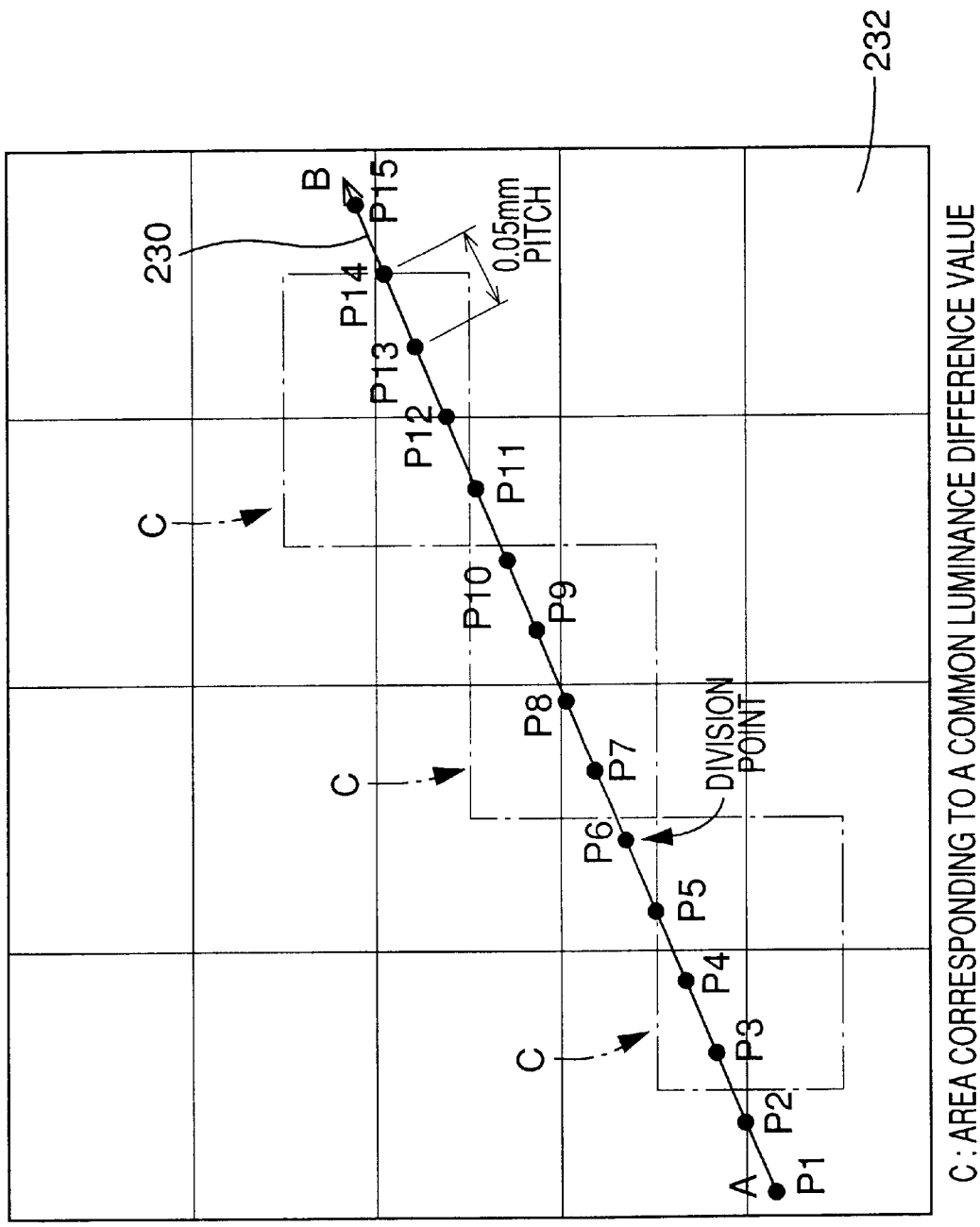
FIG. 28 is a view showing a relationship between division points determined on a seek line of the re-seek template, and solid-state image-take elements defining an image-take surface of the CCD camera of the image taking device.

Each of the search lines 230 is used to seek an edge point where the each search line 230 intersects the edge of the taken image 220. In this sense, the re-seek template 228 can be deemed as a sort of measure template which will be described in detail later. As shown in FIG. 28, each search line 230 is divided at a predetermined dividing pitch (e.g., 0.05 mm) to provide a plurality of division points, $P_1$ to $P_{15}$. The CPU 154 calculates, by linear interpolation, a luminance value corresponding to each division point $P_1$–$P_{15}$, in the same manner as that employed in the seek step. The above-indicated search-line dividing pitch is predetermined at a length shorter than the length of diagonal lines of each solid-state image-take element 232 (i.e., each CCD 80) of the CCD camera 76. For example, three or four division points P are provided corresponding to each image-take element 232. The thus obtained division points P ($P_1$–$P_{15}$) are virtual points present on the virtual screen 221.

FIG. 29 shows a table which contains the respective luminance values of the fifteen division points $P_1$–$P_{15}$ obtained by the linear interpolation. Those luminance values are expressed in terms of such positive values which increase as the lightness of the taken image 220 increases. In the present embodiment, the image taking device 10 emits parallel light beams toward the outer surface of an object 122 to be measured or inspected as an object to be image-processed, and toward the reflection surface 70 as the background of the object 122, and takes respective images of the object 122 and the reflection surface 70 based on the light beams reflected therefrom. The following description is made on the assumption that an object being image-processed is darker than the background thereof and that picture elements of a taken image of the object have smaller luminance values than those of picture elements of a taken image of the background.

Figure 32:
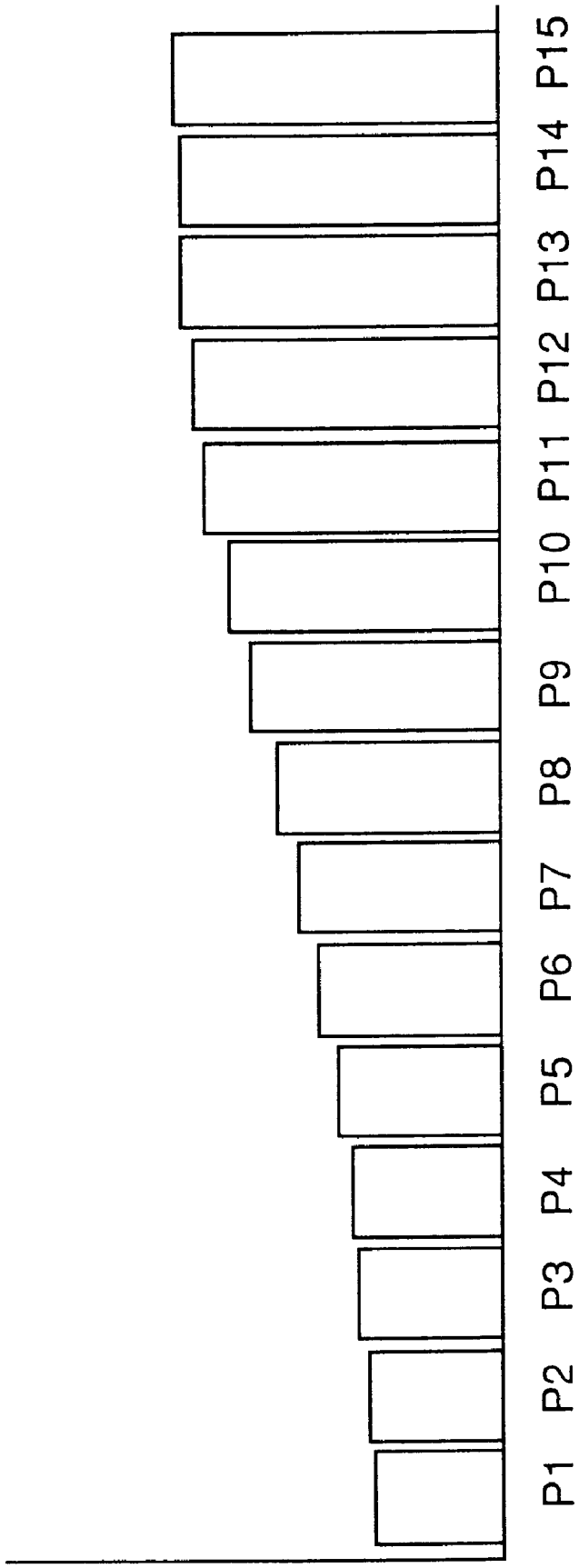
FIG. 32 is a graph showing the calculated luminance values shown in FIG. 29.
Figure 33:
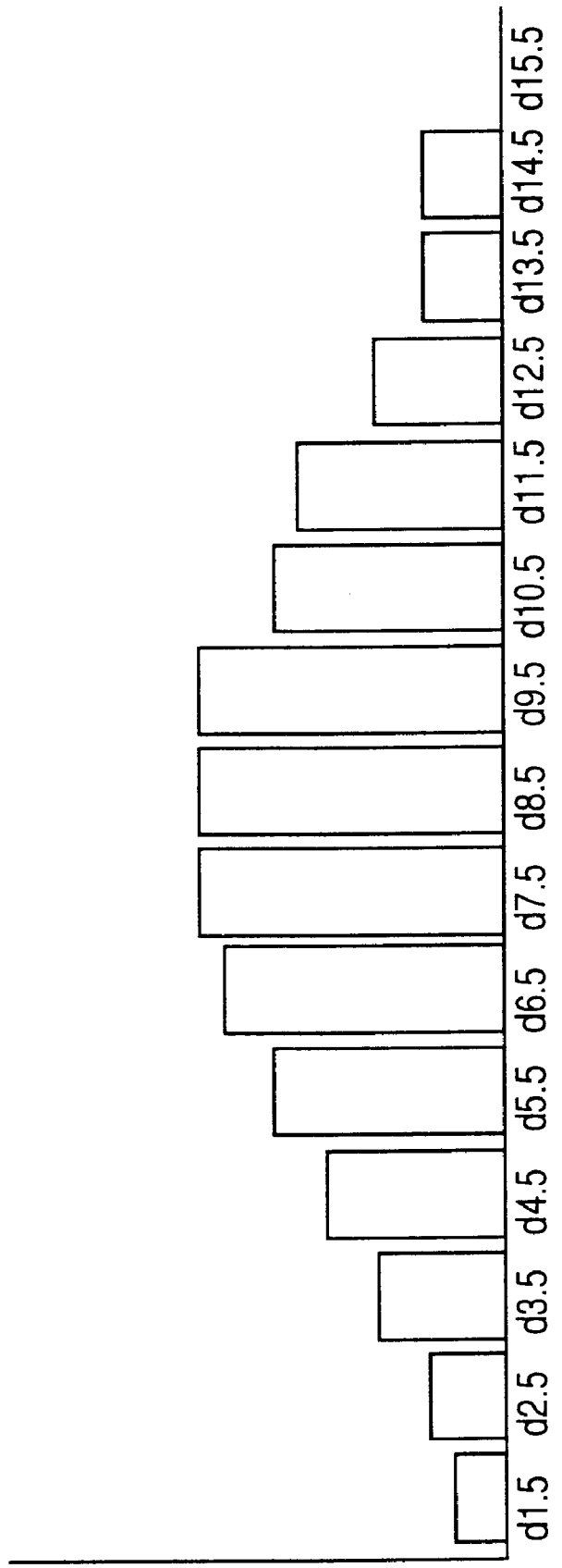
FIG. 33 is a graph showing differential values obtained by using the differential filter of FIG. 30.

FIG. 32 shows a bar graph representing the respective luminance values of the division points $P_1$–$P_{15}$ shown in FIG. 29. However, the position where the luminance values of the division points $P_1$–$P_{15}$ most greatly change is not readily apparent from the bar graph of FIG. 32. Hence, a finite-difference filter is used to obtain differential values from the luminance values of the division points $P_1$–$P_{15}$ and determine an edge point on each search line 230 that corresponds to the greatest one of the thus obtained differential values. FIG. 33 shows differential values obtained by applying a finite-difference filter, shown in FIG. 30, to the luminance values of the division points $P_1$–$P_{15}$ shown in FIG. 29. The finite-difference filter of FIG. 30 is used, in a direction from one, A, of two opposite end points, A and B, of the search line 230 (FIG. 28) toward the other end point B to subtract a luminance value of each point $P_1$–$P_{14}$ from that of its adjacent point $P_2$–$P_{15}$. As shown in FIG. 33, each of the thus obtained differential values is associated with the middle point (indicated by "0.5" of d1.5 to d15.5 shown in FIG. 33) of a corresponding pair of adjacent points P. However, from the differential values shown in FIG. 33, the position is not yet apparent where the luminance values of the division points $P_1$–$P_{15}$ most greatly change.

The positive (+) or negative (−) signs of the differential values obtained from the luminance values of the division points $P_1$–$P_{15}$ are inverted depending upon the direction in which the finite-difference filter is applied to those luminance values. In the case where the filter is applied in the direction from inside the edge of the taken image 220 toward outside the edge, the obtained differential values have the positive sign (+). On the other hand, in the case where the filter is applied in the opposite direction from outside the edge of the image 220 toward inside the edge, the obtained differential values have the negative sign (−). In the former case, the greatest one of respective absolute values of the differential values (i.e., the rates of change) corresponds to the greatest one of the differential values and, in the latter case, the greatest one of respective absolute values of the differential values corresponds to the smallest one of the differential values. Hereinafter, the greatest differential value obtained in the former case will be referred to as the "maximum differential value", and the smallest differential value obtained in the latter case will be referred to as the "minimum differential value". Each of FIGS. 33 and 34 shows the differential values obtained in the manner employed in the former case.

Figure 34:
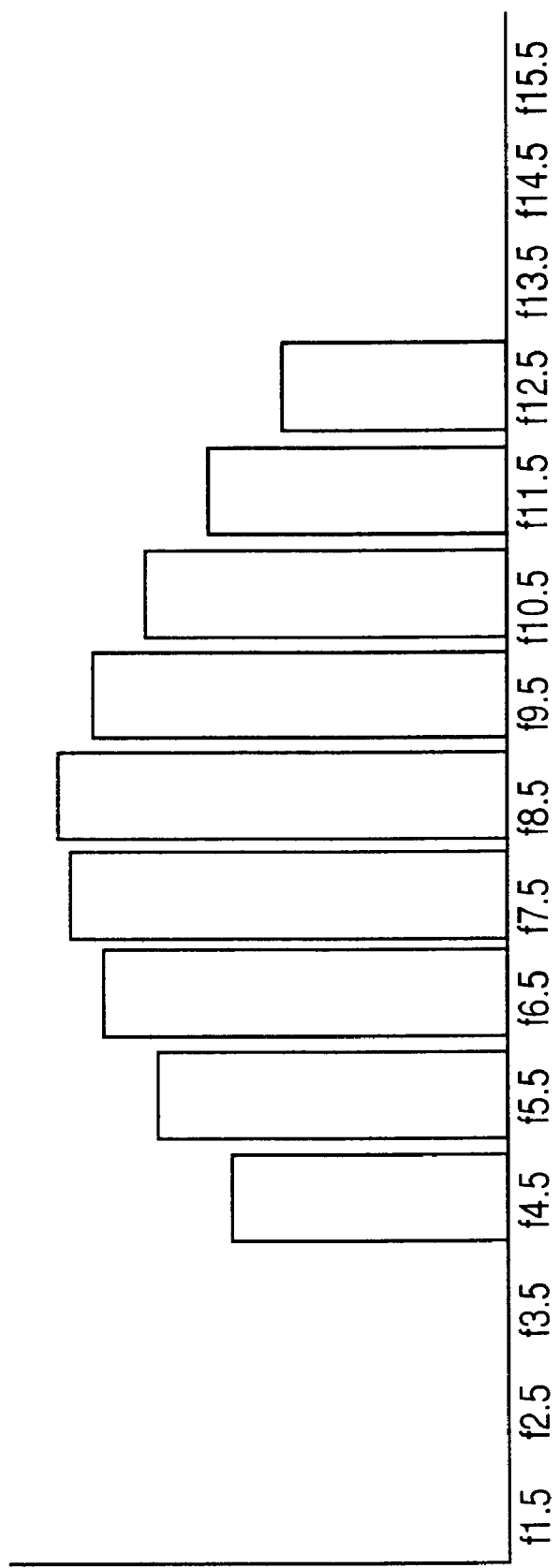
FIG. 34 is a graph showing differential values obtained by using the differential filter of FIG. 31.

FIG. 34 shows differential values obtained by applying another finite-difference filter shown in FIG. 31, to the luminance values of the division points $P_1$–$P_{15}$ shown in FIG. 29, in the same direction as that in which the filter of FIG. 30 is applied. From the differential values of FIG. 34, it is apparent that the luminance values of the division points $P_1$–$P_{15}$ have the maximum differential value of 177 at the position of f8.5 on the search line 230. Thus, the CPU 154 concludes that the luminance values of the taken image 220 and the background image most significantly change at the position of f8.5 on the search line 230. The finite-difference filter of FIG. 31 is used to subtract the sum of the respective luminance values of each group of four successive division points out of the division points $P_1$–$P_{12}$, from the sum of the respective luminance values of its adjacent group of four successive division points out of the division points $P_5$–$P_{15}$.

If dust or the like adheres to a portion of the solid-state image-take elements of the CCD camera 76 that corresponds to the edge of the taken image 220, and adversely influences the amounts of electric charges produced in that portion of the CCD camera 76, a maximum (or minimum) differential value may be determined at a position different from that of an edge point. However, the absolute value of that maximum (or minimum) differential value is considerably small. In contrast, the absolute value of a maximum (or minimum) differential value obtained with a sufficient proximity to an edge point is considerably great because of a significantly great difference between respective lightness of the object image 220 and the background image. Hence, a threshold or reference value may be employed to judge whether the absolute value of an obtained maximum (or minimum) differential value is greater than the reference value and, if a negative judgment is made, discard that maximum (or minimum) differential value. More specifically described, in the above-described former or first case, a positive reference value is employed to judge whether a maximum differential value is greater than the positive reference value and, if a positive judgment is made, adopt the maximum differential value as a value properly corresponding to an edge point of the object image 220. Thus, the maximum differential value is used to determine the position of the edge point in a manner described later. In the above-described latter or second case, a negative reference value is employed to judge whether a minimum differential value is smaller than the negative reference value and, if a positive judgment is made, adopt the minimum differential value as a value properly corresponding to an edge point of the object image 220. Similarly, the minimum differential value is used to determine the position of the edge point. On the other hand, if a negative judgment is made in the first or second case, the CPU 154 concludes that the maximum (or minimum) differential value does not correspond to an edge point, and counts it as a failure of the search line 230 in the re-seek step.

Regarding the example shown in FIG. 17, a finite-difference filter is used to obtain differential values in a direction from inside an edge of a taken image toward outside the edge. This direction is the same as that in which an finite-difference filter is used to obtain the differential values shown in FIG. 33 or 34. Thus, a maximum differential value of all the differential values obtained from the example of FIG. 17 is compared with a positive reference value, "11=200", defined by Line 5 of FIG. 17. If the maximum differential value is not greater than the reference value, the CPU 154 concludes that the maximum differential value does not correspond to an edge point of the object image 220. Thus, no edge point is determined on the search line 230.

Respective edge points are determined on the search lines 230 by using a prescribed sort of finite-difference filter. A number, N, designating a finite-difference filter of a sort suitable for the predetermined dividing pitch at which the search line 230 is divided into the division points $P_1$–$P_{15}$, is determined according to the following expression (2):

$$N = g\text{Unit}/(\text{dividing pitch}) \quad (2)$$

where gUnit is the length of diagonal lines of the image-take elements of the CCD camera 76.

The filter shown in FIG. 30 has the number N=2, and the filter shown in FIG. 31 has the number N=4.

The position of each edge point is specified according to the following expressions (3), (4), (5), and (6), in the case where the number N is four (N=4) and accordingly the filter of FIG. 31 is used:

$$dl = f_{max} \times 4 - (f_{(max-1)} + f_{(max-2)} + f_{(max-3)} + f_{(max-4)}) \quad (3)$$

$$dr = f_{max} \times 4 - (f_{(max+1)} + f_{(max+2)} + f_{(max+3)} + f_{(max+4)}) \quad (4)$$

$$\text{edgePitch} = (dl \times N)/(dl + dr) - N/2 \quad (5)$$

(edge-point position)=(number of pitches from position of start division point to position of point corresponding to maximum (or minimum) differential value+edgepitch)×(dividing pitch) (6)

In the above expressions (3), (4), the terms, $f_{(max \pm n)}$, indicate differential values obtained from luminance values by using the N=4 filter. In particular, the term, $f_{max}$, means the maximum (or minimum) differential value. The symbol "f" of the terms, $f_{(max \pm n)}$, indicates a differential value corresponding to a position designated by the number, max±n. Regarding the example of FIG. 34, $f_{max}$ is the maximum differential value obtained at position f8.5; $f_{(max-1)}$, $f_{(max-2)}$, $f_{(max-3)}$, and $f_{(max-4)}$ are differential values obtained at positions f7.5, f6.5, f5.5, and f4.5, respectively; and $f_{(max+1)}$, $f_{(max+2)}$, $f_{(max+3)}$, and $f_{(max+4)}$ are differential values obtained at positions f9.5, f10.5, f11.5, and f12.5, respectively.

The above-indicated expressions (3), (4) used for the case where the N=4 filter is used are generalized such that the value "dl" is obtained by subtracting, from the product of the maximum (or minimum) differential value and the number N, the sum of the same number (N) of differential values located upstream of the maximum (or minimum) differential value in the direction in which the filter is used and such that the value "dr" is obtained by subtracting, from the same product, the sum of the same number (N) of differential values located downstream of the maximum (or minimum) differential value in the same direction. In the particular case where the filter of FIG. 31 is applied to the luminance values of FIG. 29, the number of pitches from the position of start division point A to the position of the point corresponding to the maximum differential value, occurring in the expression (6), is 8.5 (i.e., f8.5 shown in FIG. 34).

In short, the position of each edge point is determined by, first, calculating respective luminance values of the division points $P_1$–$P_{15}$ by linear interpolation, subsequently approximately differentiating those luminance values by using a finite-difference filter having a number N, then performing the calculations according to the expressions (3) to (6), and finally determining a point corresponding to the maximum (or minimum) differential value as an edge point at which the luminance values most greatly change on a search line. Regarding the search line 230 shown in FIG. 28, the expression (6) provides 0.403 mm as the position of the edge point, which means that the edge point is distant by 0.403 mm from the start division point A ($P_1$).

In this way, the position of an edge point is determined on each of the search lines 230 shown in FIG. 27. If the number of failures of the search lines 230 is not greater than a reference number, the CPU 154 judges that the re-seek step has ended normally, and proceeds with the following, measure step. On the other hand, if the failure number is greater than the reference number, the CPU 154 recognizes an abnormality and operates in the same manner as described above in relation with the seek step. However, in the case where the CPU 154 is programmed to recognize an object being image-processed as being identical with a reference object when the number of failures of the pairs of points 202 of the individual seek template 200 is not greater than a reference number, the CPU 154 recognizes an abnormality based on the sum of the number of the point-pair failures and the number of the search-line failures. In the example of FIG. 17, Line 3 defines a reference number, "failCount=0". In this case, therefore, when even a single search-line failure is recognized, the re-seek step is immediately ended abnormally.

If the re-seek step ends normally, then the control of the CPU 154 proceeds with the measure step. As described above, a re-seek template is produced based on an individual seek template with which an object being image-processed is identical with a reference object in the seek step. Accordingly, in the re-seek step, an edge point can be found on each search line 230. However, usually there occurs some position error between the edge point and the middle point (hereinafter, referred to as the "ideal point") of the each search line 230. In FIG. 27, each ideal point is indicated at symbol, "x". If the object being image-processed has no dimension, position, or rotation-angle errors, all the edge points should coincide with the corresponding ideal points. In fact, however, the object being image-processed may have dimension, position, and/or rotation-angle errors and accordingly the determined edge points may not coincide with the corresponding ideal points on the search lines 230.

Figure 35:
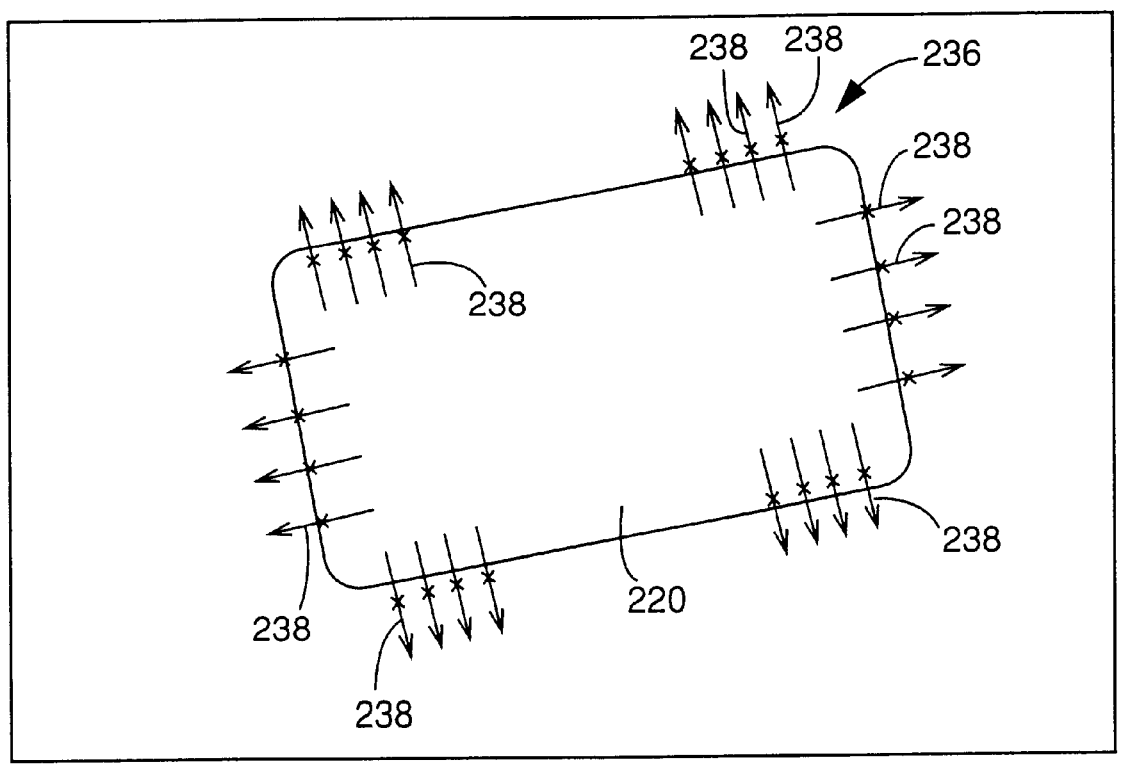
FIG. 35 is a view showing an individual measure template which is placed on the virtual screen in a measure step of the pattern matching program.

When the re-seek step ends normally and the control of the CPU 154 proceeds with the measure step, the position of each edge point is determined in the measure step. First, the CPU 154 automatically produces a measure template 236 as shown in FIG. 35. The measure template 236 includes a plurality of measuring search lines 238, and is produced based on a pre-stored batch of measure template data, data indicating the position and rotation angle of the re-seek-template coordinate plane used in the re-seek step relative to the reference coordinate plane of the CCD camera 76, and the respective positions of the edge points determined on the re-seek-template coordinate plane.

Figure 19:
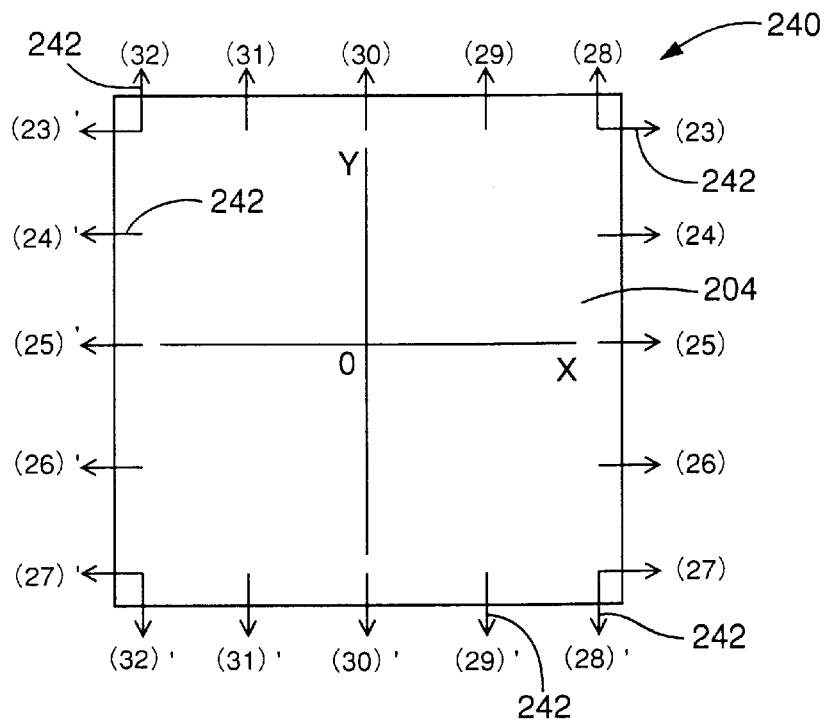
FIG. 19 is a view showing a master measure template defined by the pre-stored data shown in FIG. 17, together with the square image.

As shown in FIG. 17, the measure-template data are stored with the seek-template data. Lines 20 to 33 of FIG. 17 define various data needed to perform the measure step. More specifically described, "hs=3.5" of Line 21, Lines 23–27, and Lines 29–33 define the measure-template data. FIG. 19 shows a master measure template 240 represented by the measure-template data. Reference numeral 242 designates measuring search lines of the master measure template 240. In the present embodiment, a master measure template 240 used for a particular sort of object 122 includes a greater number of search lines than the number of the pairs of points 202 of the master seek template 200 used for the same sort of object 122.

Figure 23:
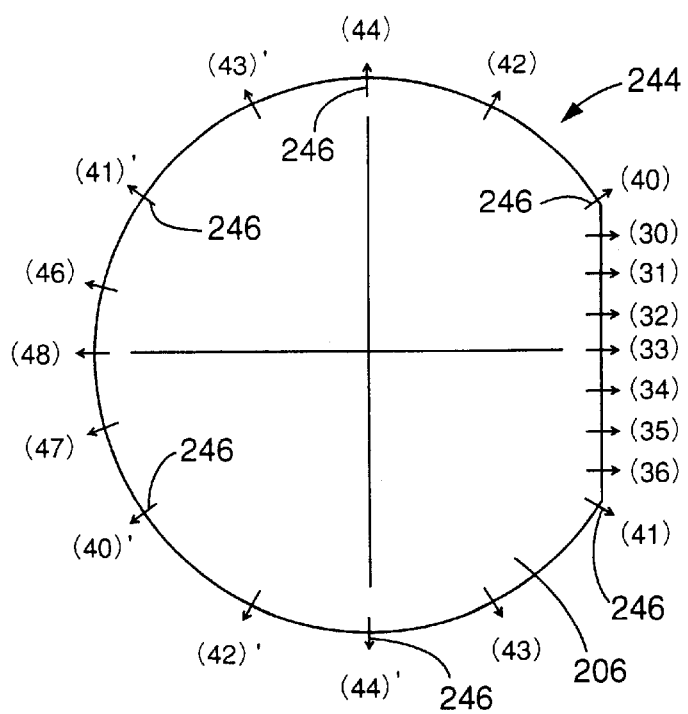
FIG. 23 is a view showing a master measure template defined by the pre-stored data shown in FIG. 17, together with the image of the disc.

FIG. 23 shows a master measure template 244 including a plurality of measuring search lines 246, which is used for the partly cut disc 206 as an object being image-processed.

Some or all of the measuring search lines of each master measure template are paired. The two measuring search lines of each pair are symmetrical with each other with respect to an appropriate one of the X axis, Y axis, and origin of the reference coordinate plane. Hereinafter, the two measuring search lines of each pair is referred to as the "set of paired lines", if appropriate.

An individual measure template is produced by coordinate transformation of a master measure template which is represented by a batch of measure template data on a master-measure-template coordinate plane which coincides with the reference coordinate plane of the CCD camera 76. This coordinate transformation is so carried out as to compensate for the position and rotation-angle of the re-seek-template coordinate plane (i.e., the coordinate plane of the individual seek template with which the object being image-processed has been recognized as being identical with the reference object in the seek step) relative to the reference coordinate plane, and the position and rotation-angle of the object being image-processed relative to the re-seek-template coordinate plane (those are calculated, in a manner described later, based on the coordinate values of each of the edge points determined in the re-seek step).

After the automatic production of the individual measure template has ended, the determination of an edge point on each of the measuring search lines of the individual measure template is carried out in the same manner as that used in the re-seek step. In short, each measuring search line is divided at a predetermined dividing pitch to determine division points, and a luminance value corresponding to each of the division points is calculated by linear interpolation from the respective luminance values of the four picture elements of the taken image 220 that correspond to each division point. Subsequently, a finite-difference filter is used to calculate differential values from the respective luminance values of the division points, and an edge point is determined on each measuring search line based on the thus obtained differential values. An appropriate number of permissible search-line failures is predetermined for the measure step as well. A failure of a measuring search line is recognized when no edge point can be determined on that search line, similar to a failure of a search line recognized in the re-seek step. If the CPU 154 finds only not greater than the predetermined number of permissible search-line failures, the measure step ends normally, and the control of the CPU 154 proceeds with the following, re-measure step. On the other hand, if the CPU 154 finds greater than the predetermined number of permissible search-line failures, the CPU 154 recognizes an abnormality, and operates for dealing with the abnormality in the same manner as that employed in the seek step.

In the re-measure step, a re-measure template is produced and edge points are determined again. The re-measure template is automatically produced based on the individual measure template and the edge points that have been used and determined in the measure step. More specifically described, based on the edge points obtained in the measure step, the individual measure template is moved and/or rotated by coordinate transformation into such a re-measure template which is expected such that respective ideal points of measuring search lines of the re-measure template will coincide with corresponding edge points, respectively. However, in fact, even with the re-measure template, some or all of the ideal points may not coincide with corresponding accurate edge points to be obtained in the re-measure step. In the re-measure step, too, edge points are determined on the measuring search lines of the re-measure template in the same manner as that used in the re-seek step.

The same predetermined number of permissible search-line failures as used in the measure step is used in judging whether an abnormality has occurred in the re-measure step. If the CPU 154 finds greater than the predetermined number of permissible search-line failures because no edge points cannot be determined on those search lines, the CPU 154 recognizes an abnormality, immediately terminates the re-measure step, and operates for dealing with the abnormality in the same manner as that used in the seek step. On the other hand, if the CPU 154 finds only not greater than the predetermined number of search-line failures, the CPU 154 ends the re-measure step normally, and subsequently calculates object vectors, that is, determines dimensions, position, and rotation angle of the object being image-processed. The more times the re-measure step is repeated, the less the errors between the ideal points and the edge points become. Thus, the accuracy of determination of the edge points increases. Data indicating the number of repetitions of the re-measure step is produced in advance and pre-stored in the memory card.

The re-measure step is repeated while a new re-measure template is automatically produced based on the preceding re-measure template and the edge points determined using the preceding one.

When the re-measure step ends normally, the computer calculates differences between the measured dimensions of the object being image-processed with reference dimensions, respectively, and compares the calculated dimension differences with permissible dimension differences, respectively. If the calculated differences are smaller than the permissible dimension differences, respectively, the computer judges that the object passes the dimension inspection. However, if not, the computer judges that the object does not pass the inspection. Data indicating reference dimensions and permissible dimension differences are made in advance for each sort of object to be image-processed, and pre-stored in the memory card. When the memory card is read by the image processing device 12, those data are stored in the DRAM 156, so that those data can be used in the dimension inspection.

Figure 57:
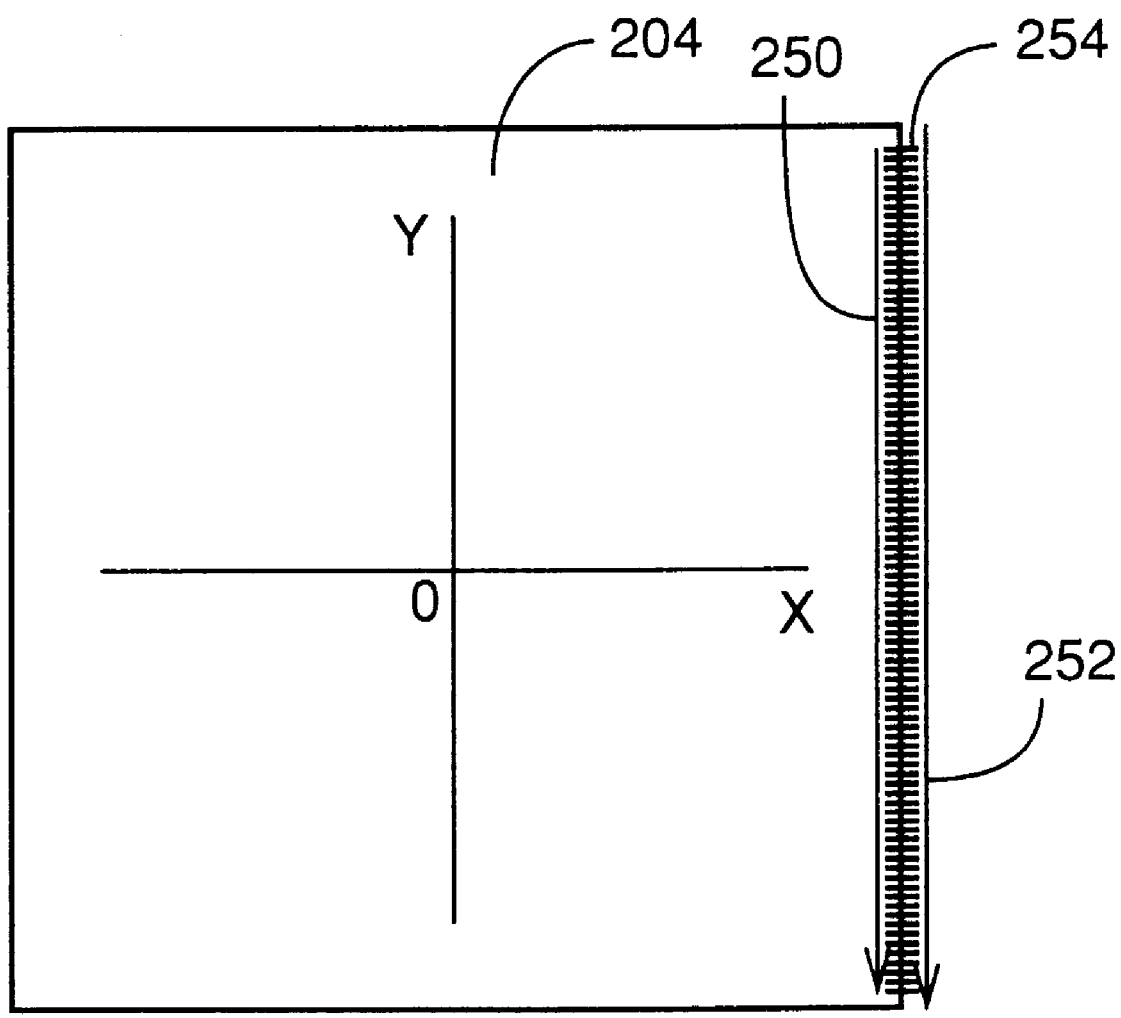
FIG. 57 is a view of an object being image-processed and a master inspect template which is produced based on the data shown in FIG. 17.

When the dimension inspection ends normally, the computer carries out the inspect step in which the computer judges whether the object being image-processed has any defects. As shown in the bottom portion of FIG. 17, a batch or batches of inspect template data have been stored, in the DRAM 156, with the batch or batches of seek template data and the batch or batches of measure template data. FIG. 57 shows a master inspect template represented by a batch of inspect template data stored in the DRAM 156. An individual inspect template is produced, in the inspect step, based on the batch of inspect template data and the data indicating the position and rotation angle of the object being image-processed that have been obtained in the re-measure step. The master inspect template shown in FIG. 57 includes includes two negative search lines 250, 252 and a number of positive search lines 254 all of which are for inspecting or checking whether a right-hand side of the square image 204 of the object being image-processed has any chips or burrs. All of the positive search lines 254 are directed in a rightward direction from inside the edge of the square image 204 toward outside the edge, and should be illustrated such that the search lines 254 have respective arrows directed in the rightward direction. However, those arrows are omitted for easier illustration purposes only, and the search lines 254 are indicated just at straight segments, respectively. The inspect step will be described in detail later.

The CRT monitor device 14 displays each of the individual steps of the image processing operation. For example, in the seek step, the monitor device 14 displays a monochromatic image including an object being image processed (i.e., an object 122 to be measured and/or inspected) and the background thereof, based on a batch of image data stored in one of the four FGMs 164 (e.g., one of four batches of image data corresponding to four objects 122). In addition, the monitor device 14 superposes, on the monochromatic image, a color image of each of individual seek templates having different rotation angles and/or positions such that the individual seek templates are sequentially displayed one after another and are moved along a "rectangular" spiral line. Thus, the operator can observe the current state of the image processing operation.

The CRT monitor device 14 is operable in one of two operation modes, i.e., an automatic selection mode and a manual selection mode. When the monitor device 14 operates in the automatic selection mode, the device 14 can selectively display the current state of the image processing device 12 and the input-related data which are related to the data input through the input device 16 or the data produced by the computer in relation to the input data, while giving priority to the input-related data. Therefore, if the operator inputs some data through the input device 16 when the monitor device 14 is in the automatic selection mode, the device 14 automatically switches itself from displaying the current state of the image processing operation to displaying the input-related data.

On the other hand, while the manual selection mode is selected on the monitor device 14, the device 14 displays only one of the above-indicated two sorts of information that is currently selected by the operator through his or her operation of the input device 16.

Next, there will be described a manner in which object vectors are calculated on the object being image-processed. The calculations which will be described below are performed according to an object-vector calculating program which is pre-stored in the memory card and is copied into the DRAM 156 when the memory card is set in the card reader of the image processing device 12.

Dimensions, a position, and/or a rotation angle of the object are/is calculated depending on a command or commands. For example, regarding the example shown in FIG. 17, symbols, "P" and "A", of data, "vf=PA", on each of Lines 5 and 21 indicate a position and a rotation angle, respectively, and command the calculations of a position and a rotation angle of an object being image-processed.

The calculations of dimensions are needed in each of the following situations: (1) that dimensions of an object being image-processed are needed for some reason; (2) that an object being image-processed should be distinguished from an object which is similar to a reference object but is not identical with the same; and (3) that one or more failures have been recognized when edge points are determined, but the accuracy of measurement of a position of an object must be maintained. An example of the second situation (2) is that objects having similar shapes and having more or less different dimensions must be identified from each other. In the third situation (3), the reason why the dimensions of the object are needed is that the position of the object can be determined by taking the failure or failures into account in a manner described later.

In the present embodiment, if none of the above three situations (1) to (3) are met, no dimension calculation is performed. However, if a dimension calculations are needed, they are performed before the calculations of a position and a rotation angle.

Next, there will be described an example wherein an object being image-processed is a rectangular object 122, the calculations of dimensions, a position, and a rotation angle of the object 122 are prescribed, and one or more search-line failures are recognized.

First, dimension calculations are described. Dimension calculations are performed by using sets of paired search lines which are prescribed to be used therefor. That is, in the case where no set of paired search lines is prescribed to be used for dimension calculations, even though there may be one or more non-paired search lines prescribed therefor, no dimension calculations occur. If a batch of measure-template data contains no command or prescription for dimension calculations, a flag, F, is pre-set to F=0; and if the measure-template data contain at least one command, the flag F is pre-set to F=1. Thus, the CPU 154 can judge based on the flag F whether dimension calculations should be performed in relation with the measure-template data or an individual measure template derived from the data. In the case where no dimension calculations are prescribed, the CPU 154 can easily know that from only the flag F, without judging whether each set of paired search lines is prescribed to be used for dimension calculations. This contributes to reducing the image processing time.

Figure 36:
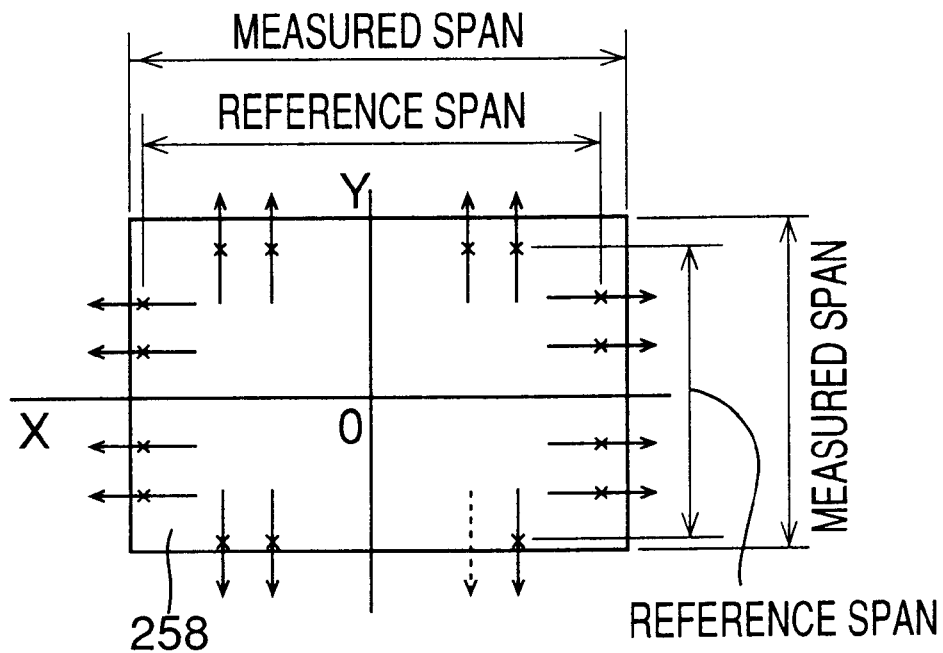
FIG. 36 is a view for explaining a manner in which dimensions of a rectangular image as an example of an image of an object are calculated after a pattern matching operation is performed according to the pattern matching program.

A first step of the dimension calculations is the calculation of X and Y size factors of an object being image-processed. As indicated with respect to a rectangular object 258 shown in FIG. 36, an X size factor is obtained by averaging respective values each of which is obtained by dividing a distance (i.e., "measured span") between the edge points of a corresponding one out of a plurality of sets of paired search lines which are prescribed to be used for dimension calculations and which are parallel to the X axis, by a distance (i.e., "reference span") between the ideal points (indicated at symbols "x") of the corresponding one set of paired search lines. A Y size factor is obtained by averaging respective values each of which is obtained by dividing a measured span of a corresponding one out of a plurality of sets of paired search lines which are prescribed to be used for dimension calculations and which are parallel to the Y axis, by a reference span of the corresponding one set of paired search lines. The X and Y axes are those of the individual-measure-template coordinate plane on which the individual measure template in use is produced or defined. In FIG. 36, a search line with which a failure is recognized (hereinafter, referred to as the "failure search line") is indicated at broken line. A set of paired search lines including the failure search line is not used for the dimension circulations. The X-direction and Y-direction dimensions of the rectangular object 258 are calculated by multiplying the X-direction and Y-direction reference spans of the object 258 by the X and Y size factors, respectively.

Figure 37:
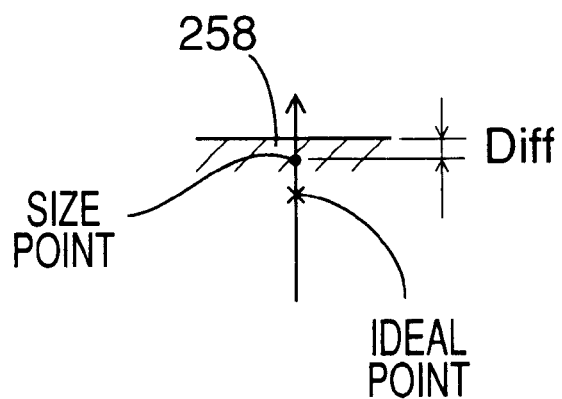
FIG. 37 is a view for explaining a manner in which the difference or distance between a size point and an edge point is calculated as a step of the calculation of a dimension.

In the case where a failure is recognized with any one of a plurality of search lines, a "size" point is determined by correcting, with the X or Y size factor, the ideal point of each of the normal search lines other than the failure search line or lines. As shown in FIG. 37, regarding a normal search line parallel to the Y axis, a Y coordinate value of a size point is determined by multiplying a Y coordinate value of an ideal point of that search line by the Y size factor. Similarly, an X coordinate value of the size point is determined by multiplying an X coordinate value of the ideal point by the X size factor, though not shown in FIG. 37.

As described above, the calculations of size factors are performed by using only sets of paired search lines which are parallel to the X or Y axis. However, the calculations of size points using the thus obtained size factors are performed on search lines including ones which are not parallel to either the X or Y axis. The calculations of size points for inclined search lines, and calculations described below, are substantially the same as those for a circular object described later.

Next, a difference or error, Diff, between an edge point and a size point on each search line is calculated. Regarding an object having dimension errors, size points would coincide with ideal points of search lines of an individual measure template which would be produced by taking those dimension errors into account. Therefore, the error "Diff" properly represents a position error of the edge point from the ideal point. The calculation of error "Diff" is performed by subtracting the coordinate values of the size point from those of the ideal point. Thus, that an x or y coordinate value of the error "Diff" is positive means that the edge point is away from the ideal point in a positive direction along the X or Y axis of the individual-measure-template coordinate plane. On the other hand, that the x or y coordinate value of the error "Diff" is negative means that the edge point is away from the ideal point in a negative direction along the X or Y axis.

Upon recognition of one or more failure search lines, size points are calculated to reduce an adverse influence of the failure line or lines to the calculation of a position of the object being image-processed, i.e., to reduce the error of calculation of the position. For example, in the case where the object being image-processed has a larger dimension than a reference dimension of the reference object but has no position error, a failure may be recognized with one of a certain set of paired search lines but may not be recognized with the other search line. In this case, if a size point would not be calculated on the failure search line but calculated on the normal (i.e., non-failure) search line, a position error between the size and ideal points of the normal search line could not be balanced and, though in fact there is no position error, the CPU 154 would have a calculation result that the object is away from a reference position of the reference object, in a direction toward the side of the normal search line. The calculations of size points are performed to avoid this problem.

Next, the calculations of a position and a rotation angle of the object are described below.

In many cases, the measuring and inspecting apparatus 8 has only to measure outer or inner dimensions of an object 122. However, in the case where an object to be image-processed is a character attached to an outer surface of the object 122, or a scar occurring to the outer surface of the object 122, or in the case where an object to be image-processed is an EC 146 being held by the EC suction head 142 of the EC mounting system, the present apparatus 8 may have to measure a position and/or a rotation angle of the character, scar, or EC 146. The rotation-angle calculation is performed by using only search lines which have respective rotation angles of 0, 90, 180, and 270 degrees and are prescribed to be used for this calculation. The calculations using the 0-degree and 180-degree search lines are simultaneously performed, and those using the 90-degree and 270-degree search lines are simultaneously done.

The position and rotation angle of an object being image-processed are calculated with respect to a rotation center, RC, which is defined by a predetermined expression (described below) used when the computer of the image pressing device 12 performs the calculations. The rotation center RC is a representative position of the object, and is utilized when position and/or rotation-angle errors of the object from a reference position and a reference rotation angle, i.e. the origin of the reference coordinate plane and the zero degree from the positive half of the X axis of the coordinate plane, are calculated in a manner described below. In the case where the object has a position error from its reference position or in the case where one or more failures are recognized with one or more search lines, an actual rotation center RC has a position error from a reference rotation center RC; and in the case where the object has a rotation-angle error from its reference rotation angle or in the case where one or more failures are recognized with one or more search lines, the object has a rotation-angle error from its reference rotation angle about the actual or reference rotation center RC. The reference rotation center RC may, or may not, coincide with a designated center, DC, which is designated as a representative position of the object by the operator. In the case where a taken image of the object 122 has a center point, the operator usually designates the center point as a designated center DC. However, in the case where the object has no center point, or even in the case where the object has its center point, the operator may designate a different point as a designated center DC. In the case where an object being image-processed is an EC 146, a reference position of the EC 146 that is prescribed according to an EC mounting program according to which the EC 146 is mounted on a CS is produced, is designated as a designated center DC of the EC 146. The respective origins of the master-seek-template coordinate plane and the master-measure-template coordinate plane (i.e., the origin of the reference coordinate plane) are aligned with the designated center DC, and respective amounts of correction of the actual position and rotation angle of the object (e.g. the EC 146) are calculated with respect to the designated center DC on the reference coordinate plane, in a manner described later.

Figure 38:
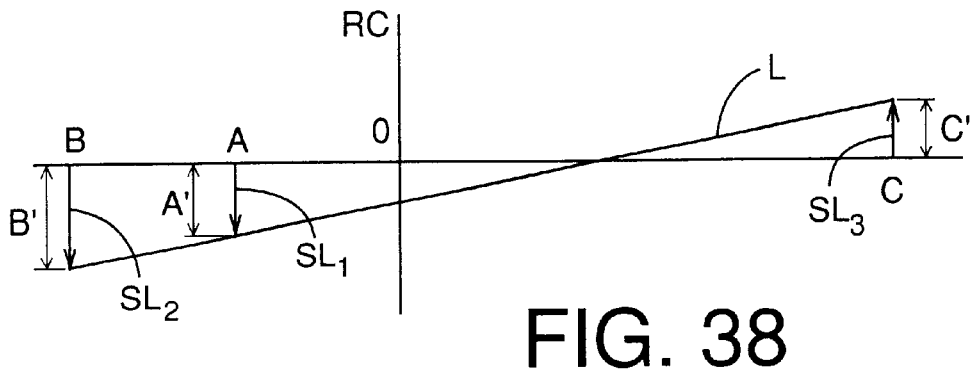
FIG. 38 is a view for explaining a manner in which a rotation center and a rotation angle of a straight segment as an example of an image of an object are calculated.

First, the manner in which the calculations of a position and a rotation-angle of an object are performed is described on a simple example, e.g., a straight segment, L, shown in FIG. 38. It is assumed that four search lines are initially provided for the straight segment L but a failure is recognized with one of the four search lines, or that three search lines are initially provided for the straight line L. In either case, the computer calculates a position error, Diff, on each of the three search lines, $SL_1$, $SL_2$, $SL_3$, and calculates a rotation center RC which is nearer to the two search lines $SL_1$, $SL_2$ on the left-hand side as seen in FIG. 38. More specifically described, the computer locates the rotation center RC at such a position which assures that the absolute value of the sum of respective position errors between each of the search lines located on one side and the rotation center RC (in the case of a single search line, the error between the single search line and the rotation center RC) is equal to the absolute value of the sum of position errors between each of the search lines located on the other side and the rotation center RC (in the case of a single search line, the error between the single search line and the rotation center RC). Assuming that a positive sign is given to the respective distances between each of the search lines located on one side and the rotation center RC and a negative sign is given to the respective distances between each of the search lines located on the other side and the rotation center RC, the computer locates the rotation center RC at such a position which assures that the sum of all the respective distances between each of all the search lines and the rotation center RC is equal to zero. In the case where one failure is recognized with one of the original four search lines, the thus determined rotation center RC is an actual rotation center RC; and in the case where no failure is recognized with any original search lines, the determined rotation center RC is a reference rotation center RC.

The rotation angle (in radians) of the object is calculated according to the following expression (7):

$$(\text{Rotation Angle}) = (AO \cdot A' + BO \cdot B' + CO \cdot C')/(AO^2 + BO^2 + CO^2) \quad (7)$$

where AO is the distance between the rotation center RC and the search line $SL_1$;
  BO is the distance between the rotation center RC and the search line $SL_2$;
  CO is the distance between the rotation center RC and the search line $SL_3$;
  A' is the position error Diff calculated on the search line $SL_1$;
  B' is the position error Diff calculated on the search line $SL_2$; and
  C' is the position error Diff calculated on the search line $SL_3$.

The position of the rotation center RC is calculated according to the following expression (8):

$$(\text{Rotation Center}) = (A' + B' + C')/3 \quad (8)$$

The rotation angle of the object may be obtained in a different manner in which a rotation angle of each search line is calculated based on the position error Diff thereof and the distance of the edge point thereof from the rotation center RC, and the rotation angle of the object is determined by averaging the thus obtained respective rotation angles of the search lines. In this case, however, the rotation angle of the object as a finally obtained value may have been adversely influenced, for example, if the edge of the object has an even portion and a rotation angle of that portion is largely deviated from that of the other portions. In contrast, the rotation angle obtained according to the expression (7) is less influenced by the error or errors of a particular edge point or points. Thus, the accuracy of calculation of the rotation angle of the object is improved.

Figure 39:
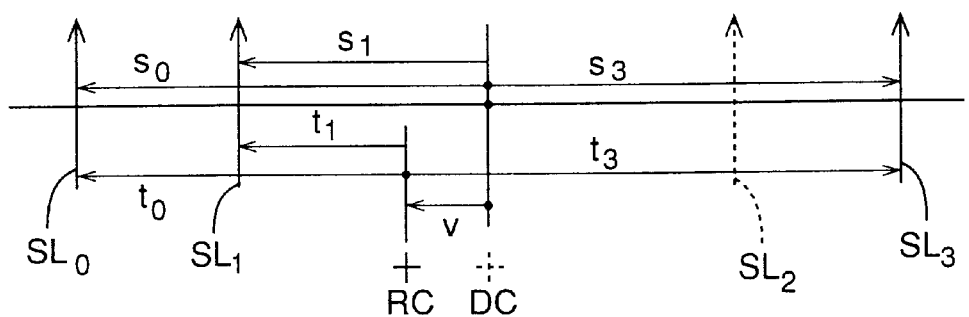
FIG. 39 is a view for explaining a manner in which a position error of an actual rotation center of an object from a designated center thereof is calculated in the case where a failure is recognized with a search line.

FIG. 39 shows an error, v, of an actual rotation center RC from a designated center RC that is produced in the case where a failure is recognized with one (e.g., search line $SL_2$) or more of a plurality of search lines, $SL_0$ to $SL_3$, that is, no edge point can be determined on one or more search lines. Generally, a designated center DC is placed at the center of an object to be image processed, and search lines are provided symmetrically with each other with respect to the designated center DC such that a reference rotation center RC coincides with the designated center DC. Therefore, if a failure occurs to one or more search lines and an actual rotation center RC is determined based on the search lines except the failure search line or lines, there occurs a position error between the designated center DC and the actual rotation center RC.

As described above, assuming that a positive sign is given to the respective distances between each of the respective edge points of the search lines located on one side and the actual rotation center RC and a negative sign is given to the respective distances between each of the respective edge points of the search lines located on the other side and the actual rotation center RC, the computer determines the actual rotation center RC at such a position which assures that the sum of all the respective distances between each of the respective edge points of all the search lines and the actual rotation center RC is equal to zero. Therefore, the following expression (9) is obtained, and the following expression (10) is obtained from the expression (9) to calculate the position error, v, of the actual rotation center RC from the designated center DC:

$$t_0 + t_1 + t_3 = 0 \quad (9)$$

$$(s_0 - v) + \{s_0 + (s_1 - s_0) - v\} + \{s_0 + (s_3 - s_0) - v\} = 0 \quad (10)$$

where $t_0$ is the distance between the rotation center RC and the search line $SL_0$;
  $t_1$ is the distance between the rotation center RC and the search line $SL_1$;
  $t_3$ is the distance between the rotation center RC and the search line $SL_3$;
  $s_0$ is the distance between the designated center DC and the search line $SL_0$;
  $s_1$ is the distance between the designated center DC and the search line $SL_1$; and
  $s_3$ is the distance between the designated center DC and the search line $SL_3$.

Figure 40:
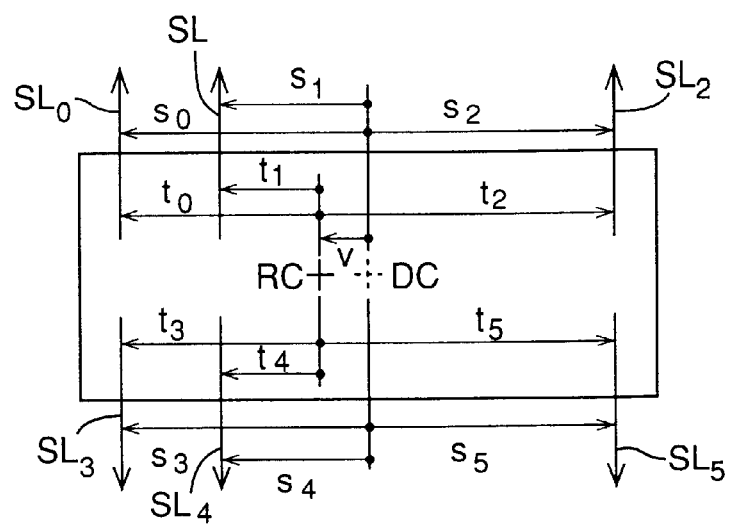
FIG. 40 is a view for explaining a manner in which a position error of a rotation center of an object from a designated center thereof is calculated.

FIG. 40 shows six search lines $SL_0$ to $SL_5$ which are used for two parallel sides of a rectangular object. In this case, the following expression (11) is obtained, and a position error, v, of a rotation center RC from a designated center DC is calculated according to the following expression (12):

$$t_0 + t_1 + t_2 + t_3 + t_4 + t_5 = 0 \quad (11)$$

$$s_0 + \{s_0 + (s_1 - s_0)\} + \{s_0 + (s_2 - s_0)\} + \{s_0 + (s_3 - s_0)\} + \{s_0 + (s_4 - s_0)\} + \{s_0 + (s_5 - s_0)\} - 6v = 0 \quad (12)$$

Figure 41:
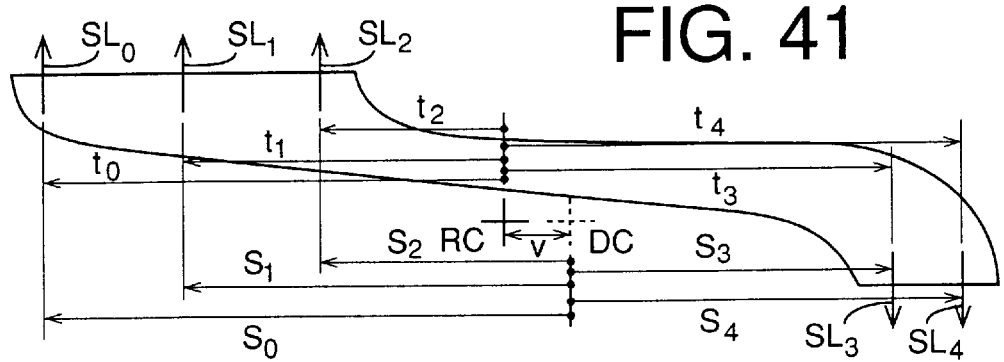
FIG. 41 is a view for explaining another manner in which a position error of a rotation center of an object from a designated center thereof is calculated.

FIG. 41 shows five search lines $SL_0$ to $SL_4$ which are used for two parallel sides of an object being image-processed. In this case, the following expression (13) is obtained, and a position error, v, of a rotation center RC from a designated center DC is calculated according to the following expression (14):

$$t_0 + t_1 + t_2 + t_3 + t_4 = 0 \quad (12)$$

$$s_0 + \{s_0 + (s_1 - s_0)\} + \{s_0 + (s_2 - s_0)\} + \{s_0 + (s_3 - s_0)\} + \{s_0 + (s_4 - s_0)\} - 5v = 0 \quad (14)$$

Figure 42:
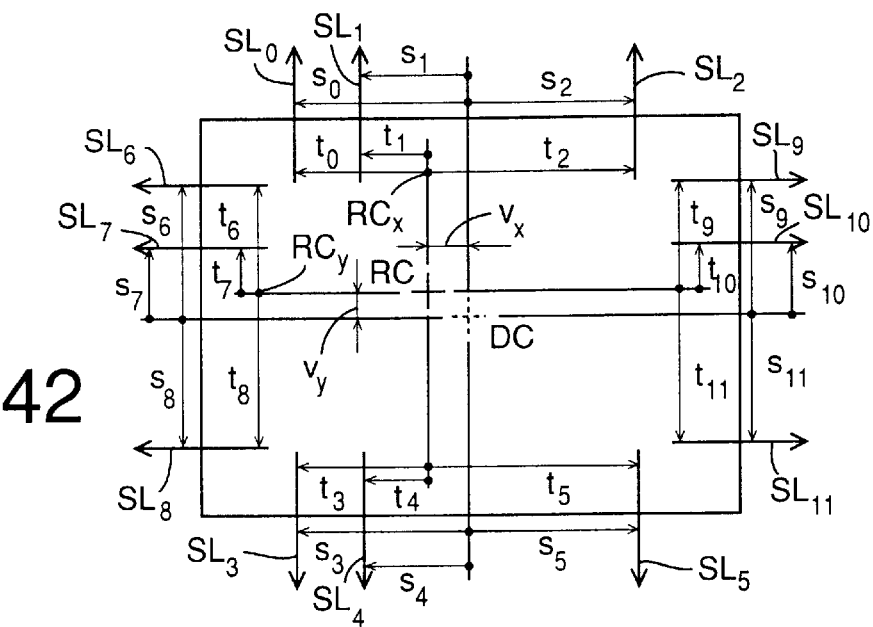
FIG. 42 is a view for explaining a manner in which a rotation center of an object, and a position error of the rotation center from a designated center thereof are calculated in the case where a plurality of search lines extending in two directions perpendicular to each other are employed.

FIG. 42 shows six search lines $SL_0$ to $SL_5$ used for one pair of parallel sides of a rectangular object, and six search lines $SL_6$ to $SL_{11}$ used for the other pair of parallel sides of the same object. In this case, regarding the X and Y axes or directions, the following expressions (15) and (16) are obtained, respectively, and an X-direction position error, $v_x$, and a Y-direction position error, $v_y$, of a rotation center RC from a designated center DC are calculated according to the following expressions (17) and (19), respectively:

$$t_0 + t_1 + t_2 + t_3 + t_4 + t_5 = 0 \quad (15)$$

$$t_6 + t_7 + t_8 + t_9 + t_{10} + t_{11} = 0 \quad (16)$$

$$s_0 + \{s_0 + (s_1 - s_0)\} + \{s_0 + (s_2 - s_0)\} + \{s_0 + (s_3 - s_0)\} + \{s_0 + (s_4 - s_0)\} + \{s_0 + (s_5 - s_0)\} - 6v_x = 0 \quad (17)$$

$$s_6 + \{s_6 + (s_7 - s_6)\} + \{s_6 + (s_8 - s_6)\} + \{s_6 + (s_9 - s_6)\} + \{s_6 + (s_{10} - s_6)\} + \{s_6 + (s_{11} - s_6)\} - 6v_y = 0 \quad (18)$$

The position error $v_x$ of the rotation center $RC_x$ from the designated center DC is calculated according to the expression (17) regarding the X direction, and the position of the rotation center $RC_x$ is determined based on the error $v_x$; and the position error $v_y$ of the rotation center $RC_y$ from the designated center DC is calculated according to the expression (18) regarding the Y direction, and the position of the rotation center $RC_y$ is determined based on the error $v_y$. Regarding the object shown in FIG. 42, a rotation center RC is determined at a position where a straight line passing through the rotation center $RC_x$ and extending parallel to the Y axis intersects a straight line passing through the rotation center $RC_y$ and extending parallel to the X axis.

Figure 43:
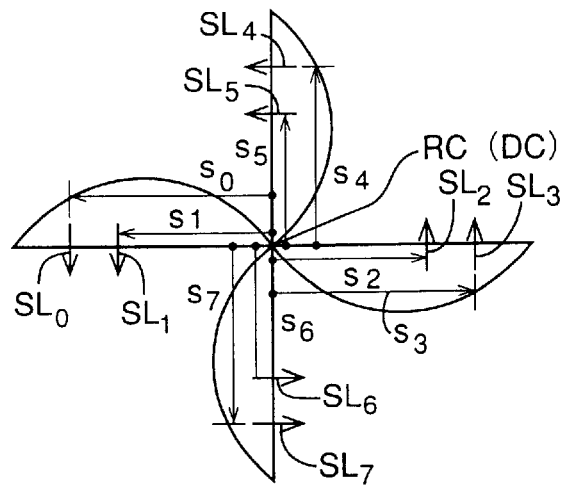
FIG. 43 is a view for explaining another manner in which a rotation center of an object, and a position error of the rotation center from a designated center thereof are calculated in the case where a plurality of search lines extending in two directions perpendicular to each other are employed.

FIG. 43 shows another example wherein eight search lines $SL_0$ to $SL_7$ are used for two directions perpendicular to each other. Regarding this example, it is assumed that there is no position error between a rotation center RC and a designated center DC, i.e., $v_x=v_y=0$, and accordingly that the distance between each search line $SL_0$ to $SL_7$ and the rotation center RC is equal to the distance between each search line and the designated center DC, i.e., $t_0$ to $t_7$ are equal to $s_0$ to $s_7$, respectively. For those search lines, the following expressions (19) and (20) are obtained, and an X-direction position error, $v_x$, and a Y-direction position error, $v_y$, of the rotation center RC from the designated center DC are calculated according to the following expressions (21) and (22), respectively:

$$s_0+s_1+s_2+s_3=0 \quad (19)$$

$$s_4+s_5+s_6+s_7=0 \quad (20)$$

$$s_0+\{s_0+(s_5-s_0)\}+\{s_0+(s_2-s_0)\}+\{s_5+(s_3-s_0)\}-4v_x=0 \quad (21)$$

$$s_4+\{s_4+(s_5-s_4)\}+\{s_4+(s_6-s_4)\}+\{s_4+(s_7-s_4)\}-4v_y=0 \quad (22)$$

Figures 44, 45:
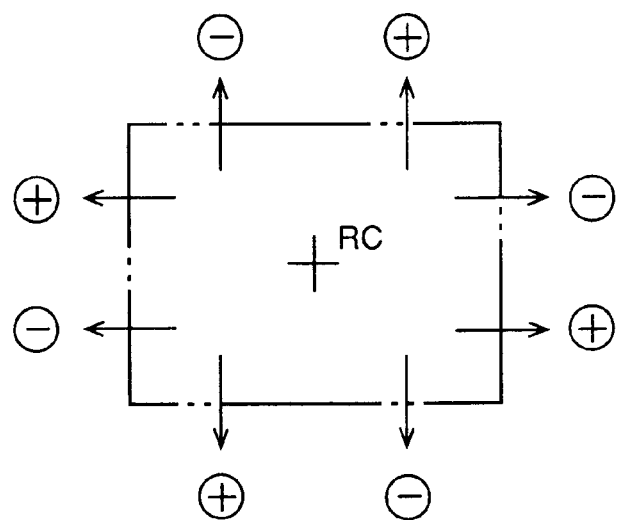
FIG. 44 is a table which contains angle factors employed to calculate a rotation angle of an object being image-processed.
FIG. 45 is a view showing the angle factors of FIG. 44 in relation with an X-Y coordinate plane.

The rotation angle of an object is calculated using predetermined eight angle signs or factors contained in a table shown in FIG. 44. An appropriate one of the angle factors of the table is selected based on the angle (i.e., 0, 180, 90, or −90 degrees), and the position (i.e., upper, lower, left, or right position with respect to a rotation center RC), of each search line. FIG. 45 shows, on an X-Y coordinate plane, the eight angle factors of FIG. 44 which are selected and used for representative eight search lines having different angles and positions with respect to the rotation center RC, respectively.

Figure 46:
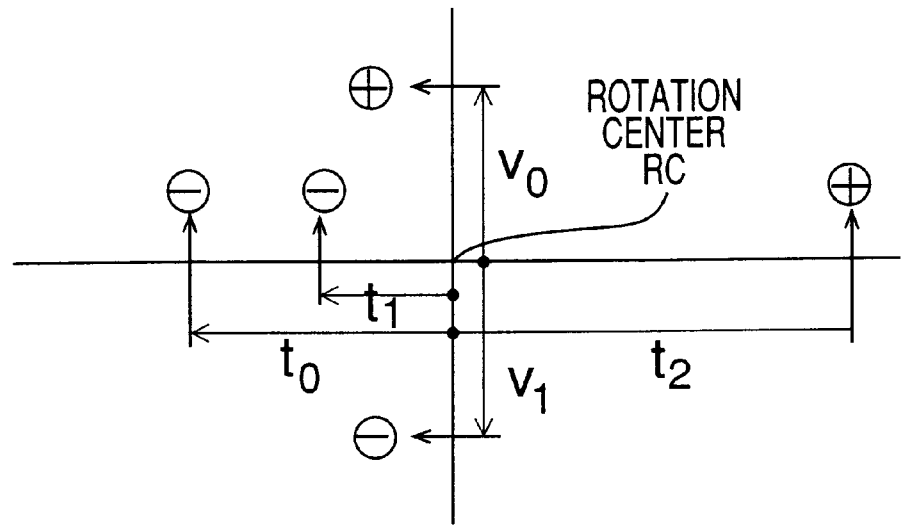
FIG. 46 is a view for explaining a manner in which a rotation center and a rotation angle of an object are calculated.

FIG. 46 shows a manner in which a position and a rotation angle of an object are calculated based on a rotation center RC and the angle factors of FIG. 44. A rotation angle is calculated according to the expressions (23) and (24):

$$(\text{Rotation Angle})=(-d_0 \cdot t_0 - d_1 \cdot t_1 + d_2 \cdot t_2 + d_3 \cdot v_0 - d_4 \cdot v_1)/t_a \quad (23)$$

$$t_a=t_0^2+t_1^2+t_2^2+v_0^2+v_1^2 \quad (24)$$

where $d_0$, $d_1$, $d_2$, $d_3$, and $d_4$ are respective errors of respective edge points of five search lines from respective size points of the same lines, respectively.

In the above expression (33), the positive or negative sign is given to each of the terms, $d_0 \cdot t_0$ to $d_4 \cdot v_1$, according to the table of FIG. 44. The rotation angle determined according to the expression (23) is that of the object being image-processed on the coordinate plane of the individual measure template including the above five search lines.

An X-direction position error, $\delta_x$, and a Y-direction position error, $\delta_y$, of a rotation center RC are calculated according to the following expressions (25) and (26), respectively:

$$\delta_x=(d_3+d_4)/2 \quad (25)$$

$$\delta_y=(d_0+d_1+d_2)/3 \quad (26)$$

The thus obtained position errors $\delta_x$, $\delta_y$ are those of an actual rotation center RC from a reference rotation enter RC.

Figure 47:
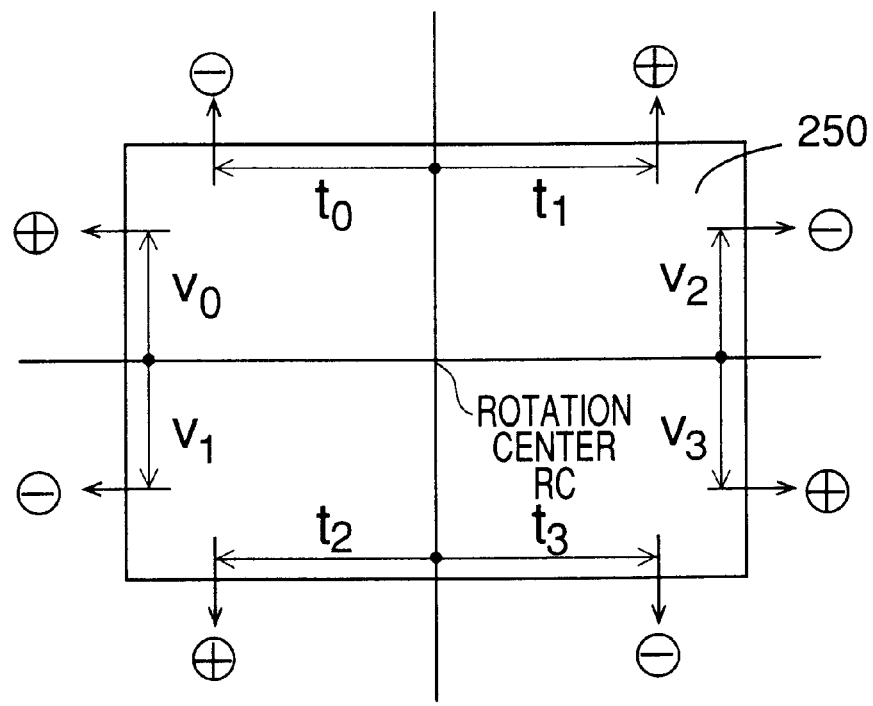
FIG. 47 is a view for explaining another manner in which a rotation center and a rotation angle of an object are calculated.

FIG. 47 shows a rectangular image 258 of an object being image-processed. In the case where four search lines parallel to the X axis and four search lines parallel to the Y axis are used, a rotation angle, and position errors $\delta_x$, $\delta_y$ of an actual rotation center RC are calculated according to the following expressions (27), (28), and (29), respectively:

$$(\text{Rotation Angle})=(-d_0 \cdot t_0 + d_1$$

$$\cdot t_1 + d_2 \cdot t_2 - d_3 \cdot t_3$$

$$+d_4 \cdot v_0 - d_5 \cdot v_1 - d_6$$

$$\cdot v_2 + d_7 \cdot v_3)/(t_0^2$$

$$+t_1^2+t_2^2+t_3^2+v_0^2$$

$$+v_1^2+v_2^2+v_3^2) \quad (27)$$

$$\delta_x=(d_4+d_5+d_6+d_7)/4 \quad (28)$$

$$\delta_y=(d_0+d_1+d_2+d_3)/4 \quad (29)$$

where $d_0$, $d_1$, $d_2$, and $d_3$ are respective errors between the edge and size points of respective search lines having respective distances, $t_0$ to $t_3$, each from the rotation center RC; and $d_4$, $d_5$, $d_6$, and $d_7$ are respective errors between the edge and size points of respective search lines having respective distances, $v_0$ to $v_3$, each from the rotation center RC.

The above expressions (27) to (29) obtained to calculate the rotation angle and the position errors $\delta_x$, $\delta_y$ are actually applied to an example, below, to prove the correctness of those expressions, in place of mathematically proving the correctness of the same.

Figure 48:
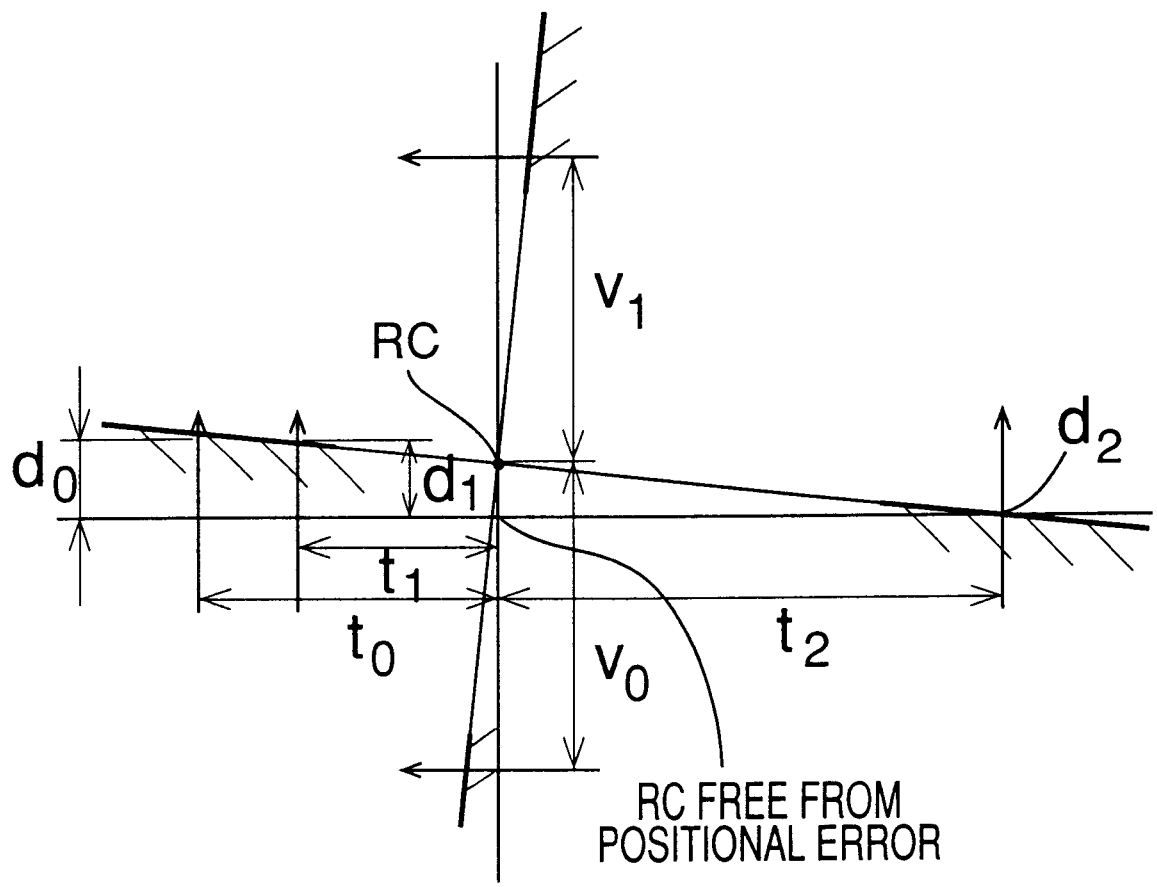
FIG. 48 is a view for explaining yet another manner in which a rotation center and a rotation angle of an object are calculated.

FIG. 48 shows an object whose image is assumed to to be rotated by −0.1 radian about an actual rotation center RC and that the actual rotation center RC is away from a reference rotation center RC by 5 mm in the Y direction and by 0 mm in the X direction. Additionally, assuming that $t_0=30$ mm, $t_1=20$ mm, $t_2=50$ mm, $v_0=30$ mm, and $v_1=30$ mm, and that a rotation angle, $\theta$, is so small that $\sin \theta$ can be regarded as being equal to $\theta$ (i.e., $\sin \theta=\theta$), the following results should be obtained: $d_0=+8$ mm, $d_1=+7$ mm, $d_2=0$ mm, $d_3=-3$ mm, and $d4=+3$ mm. In addition, a value, $t_a$ $(=t_0^2+t_1^2+t_2^2+v_0^2+v_1^2)$, is obtained as 5600 $mm^2$.

When the above values are used to substitute the corresponding variables occurring in the expressions (24), (25), and (26), the rotation angle, and the position errors $\delta_x$, $\delta_y$ of the actual rotation center RC are calculated by the following equations (30), (31), and (32):

$$(\text{Rotation Angle})=\{(-(8\times 30)-(7\times 20)+(0\times 50)+(-3\times 30)-(+3\times 30)\}/5600=-0.1 \quad (30)$$

$$\delta_x=(-3+3)/2=0 \quad (31)$$

$$\delta_y=(8+7+0)/3=5 \quad (32)$$

Thus, a rotation angle of an object about an actual rotation center RC, and X-direction and Y-direction position errors of an actual position of the actual rotation center RC from a reference rotation center are calculated. However, in the case where an object being image-processed is an EC 146, the EC mounting system needs a rotation angle of the EC 146 about a designated center DC, and X-direction and Y-direction position errors of an actual position of the designated center DC from a reference position. Therefore, the latter values are calculated based on the former values. However, a rotation angle of an object about an actual rotation center RC is equal to a rotation angle of an object about the actual designated center DC. Thus, only the position errors of the actual designated center DC are calculated based on the position and rotation-angle errors of the actual rotation center RC.

Figure 49:
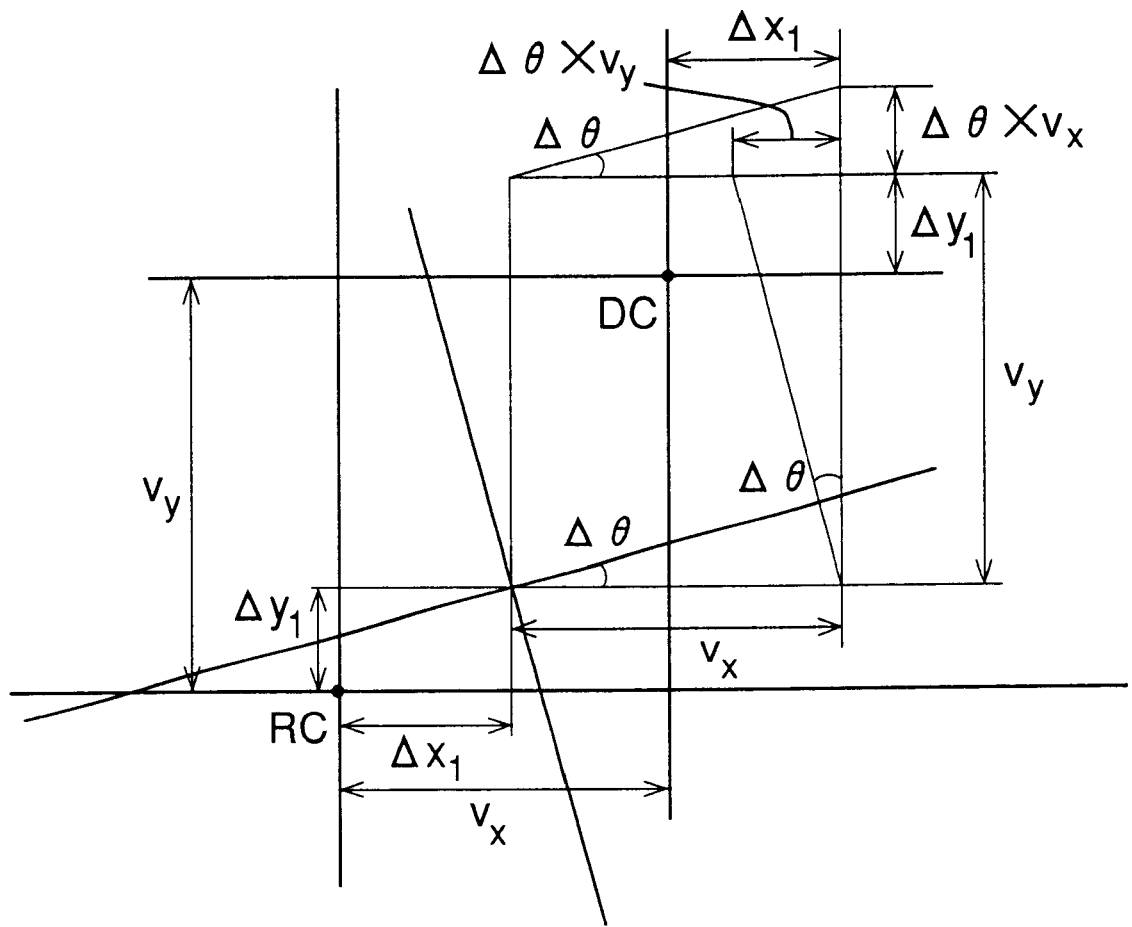
FIG. 49 is a view for explaining a manner in which a position of an actual designated center of an object is calculated in the case where there is a position difference (i.e., distance) between a reference designated center and a reference rotation center of the object and there are position and rotation-angle errors of the object.

In the case where an object being image-processed has no rotation-angle error and has only position errors $\delta_x$, $\delta_y$ in the X and Y directions, both position errors of an actual rotation center RC and position errors of an actual designated center DC, of the object are equal to the errors $\delta_x$, $\delta_y$. However, in the case where the object has a rotation-angle error, $\delta\theta$, the position errors of the actual designated center DC that are away by respective distances, $v_x$, $v_y$, from the actual rotation center RC in the X and Y directions, respectively, are equal to values, $(\delta x_1-\delta\theta\times v_y)$ and $(\delta y_1+\delta\theta\times v_x)$, respectively, as illustrated in FIG. 49.

Figure 50:
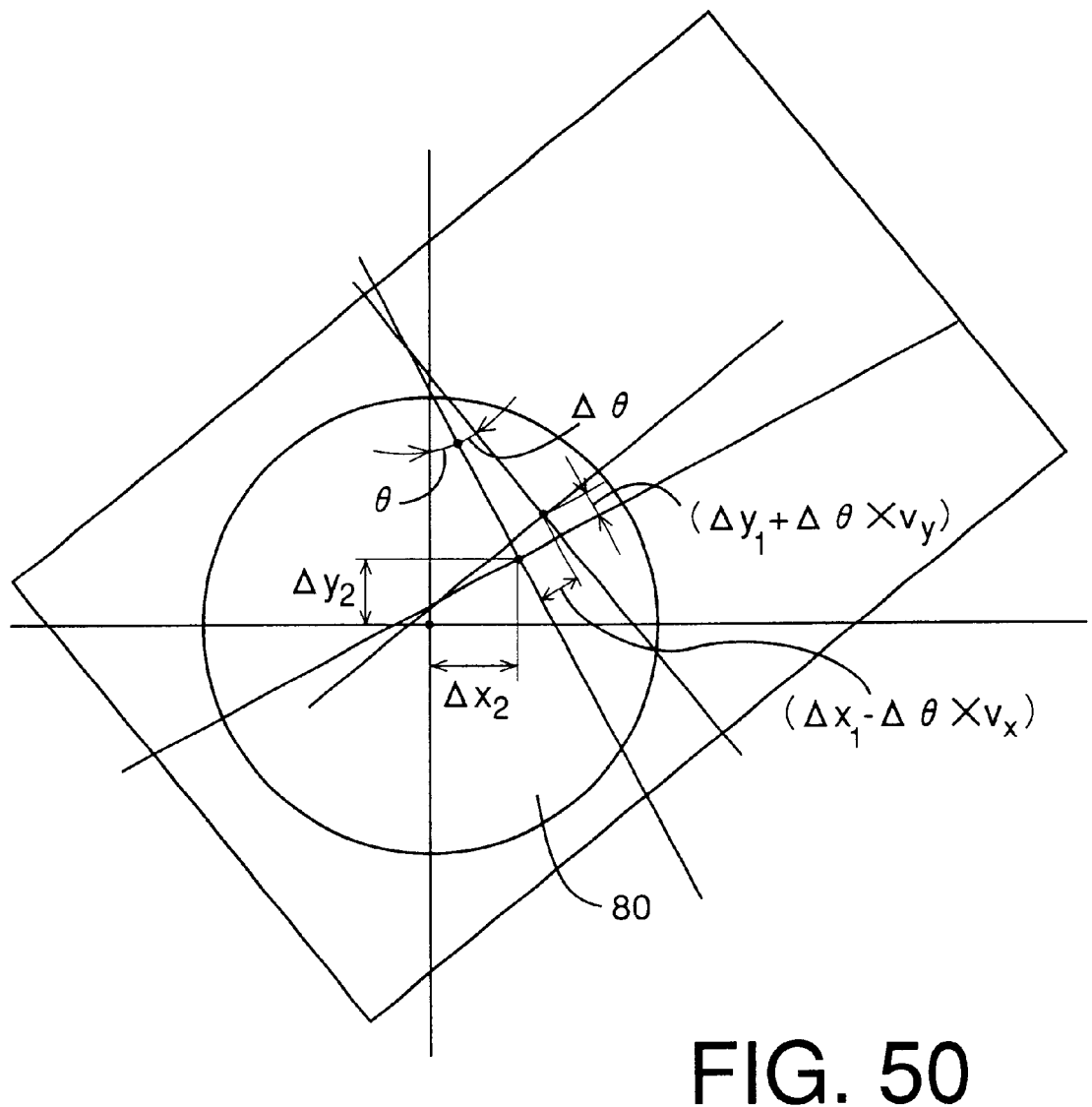
FIG. 50 is a view for explaining a manner in which position and rotation-angle errors of an object from its reference position and reference rotation-angle are calculated.

The thus obtained rotation angle $\delta\theta$ and the position errors $(\delta x_1-\delta\theta\times v_y)$, $(\delta y_1+\delta\theta\times v_x)$ are those of the actual designated center DC of the object on the individual-measure-template coordinate plane. However, usually, the individual-measure-template coordinate plane has a rotation angle, $\theta$, and position errors, $\delta_{x2}$, $\delta_{y2}$, relative to the reference coordinate plane, as shown in FIG. 50, because the individual-measure-template coordinate plane is obtained by coordinate transformation of the reference coordinate plane.

In the present embodiment, the origin of the reference coordinate plane coincides with the optical axis of the CCD camera 76, i.e., the center of the vision field of the same 76. In the case where the CCD camera 76 is used with the EC mounting system, an EC suction pipe 144 is positioned at an EC-image taking position such that the axis line of the suction pipe 144 is aligned with the optical axis of the CCD camera 76. In the present embodiment, therefore, the angle $\theta$ and position errors $\delta_{x2}$, $\delta_{y2}$ of the individual-measure-template coordinate plane relative to the reference coordinate plane are equal to those of the origin of the former plane relative to the axis line of the suction pipe 144.

Thus, the rotation-angle and position errors of the actual designated center DC of the EC 146 as the object being image-processed, relative to the axis line of the EC suction nozzle 144, are equal to $(\theta+\delta\theta)$, $\{\delta x_2+(\delta x_1-\delta\theta\times v_y)\times\cos\theta\}$, and $\{\delta y_2+(\delta y_1+\delta\theta\times v_x)\times\sin\theta\}$, respectively.

The foregoing description relates to the case where one or more failures are recognized with one or more search lines. On the other hand, in the case where no failure is recognized, the x and y coordinates of a reference rotation center RC, the respective distances of search lines from the reference rotation center RC, and the position errors of the reference rotation center RC from a reference designated center DC can be determined in advance based on an individual measure template and a reference object corresponding to the measure template. In the present embodiment, those values are pre-stored as default values in the memory card, and calculations are performed using those default values.

In a particular case where the calculations of dimensions is not prescribed, all search lines consist of sets of paired search lines, and no failure is recognized with any search lines, the calculations of size points are omitted, and position errors between the ideal points and edge points on the search lines are calculated in place of the calculations of errors between the ideal points and the size points. In this case, position and rotation-angle errors may be calculated based on the errors between the ideal points and the edge points. Even if an object being image-processed has a dimension error or errors, those errors do not adversely influence the accuracy of calculation of the position of the object, because respective dimension-error components relating to each set of paired search lines offset each other.

Even in the case where one or more failures are recognized, the calculations of size points are not needed, and accordingly may be omitted, unless the calculations of position errors are prescribed.

Next, there will be described the operation of the image processing device 12 in the case where an object being image-processed has a circular shape, like a reference mark affixed to a printed circuit board ("PCB"), or a partly cut circular shape. Position errors of the PCB on a horizontal plane and a rotation-angle error of the same about a vertical axis line are calculated based on respective images of a plurality of reference marks affixed to the PCB. Thus, the calculation of a rotation-angle error of each reference mark is not needed.

The calculations of position errors of an object having a circular shape or a partly cut circular shape are very similar to the above-described calculations of position errors of an object having a rectangular shape, but are somewhat different from the latter calculations. The following description will be focused on the differences between the former and latter calculations.

Figure 52:
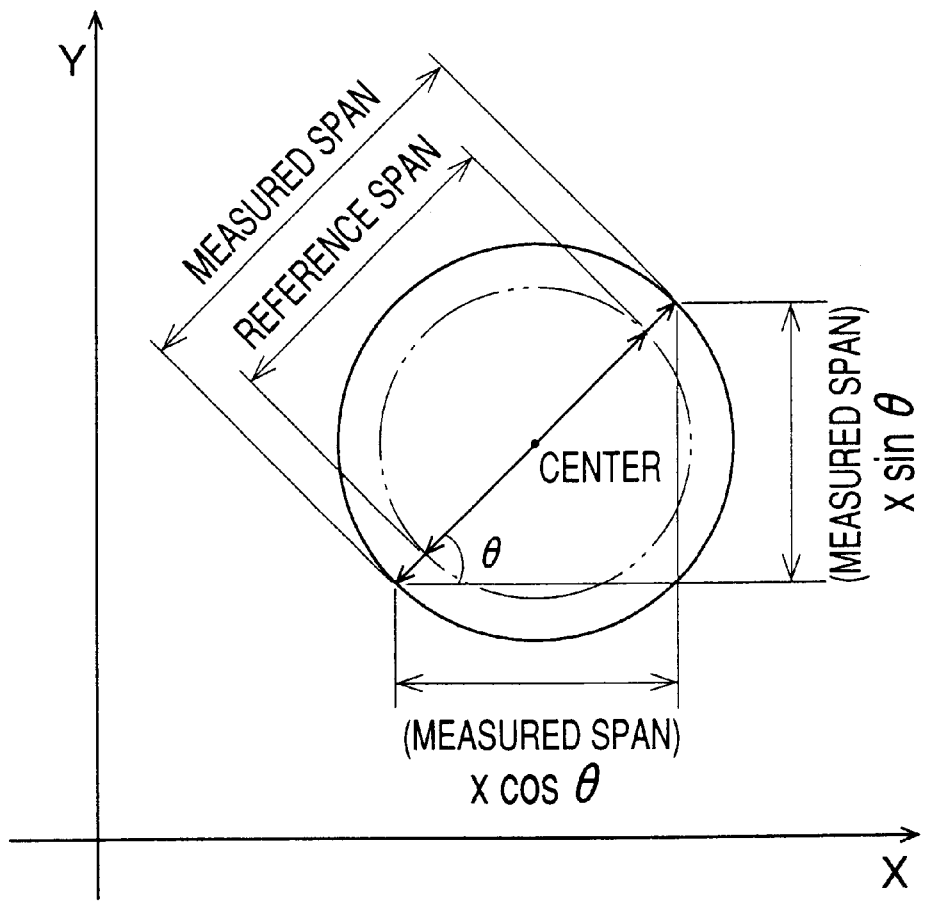
FIG. 52 is a view for explaining a manner in which dimensions of the circular image of FIG. 51 are calculated.
Figure 53:
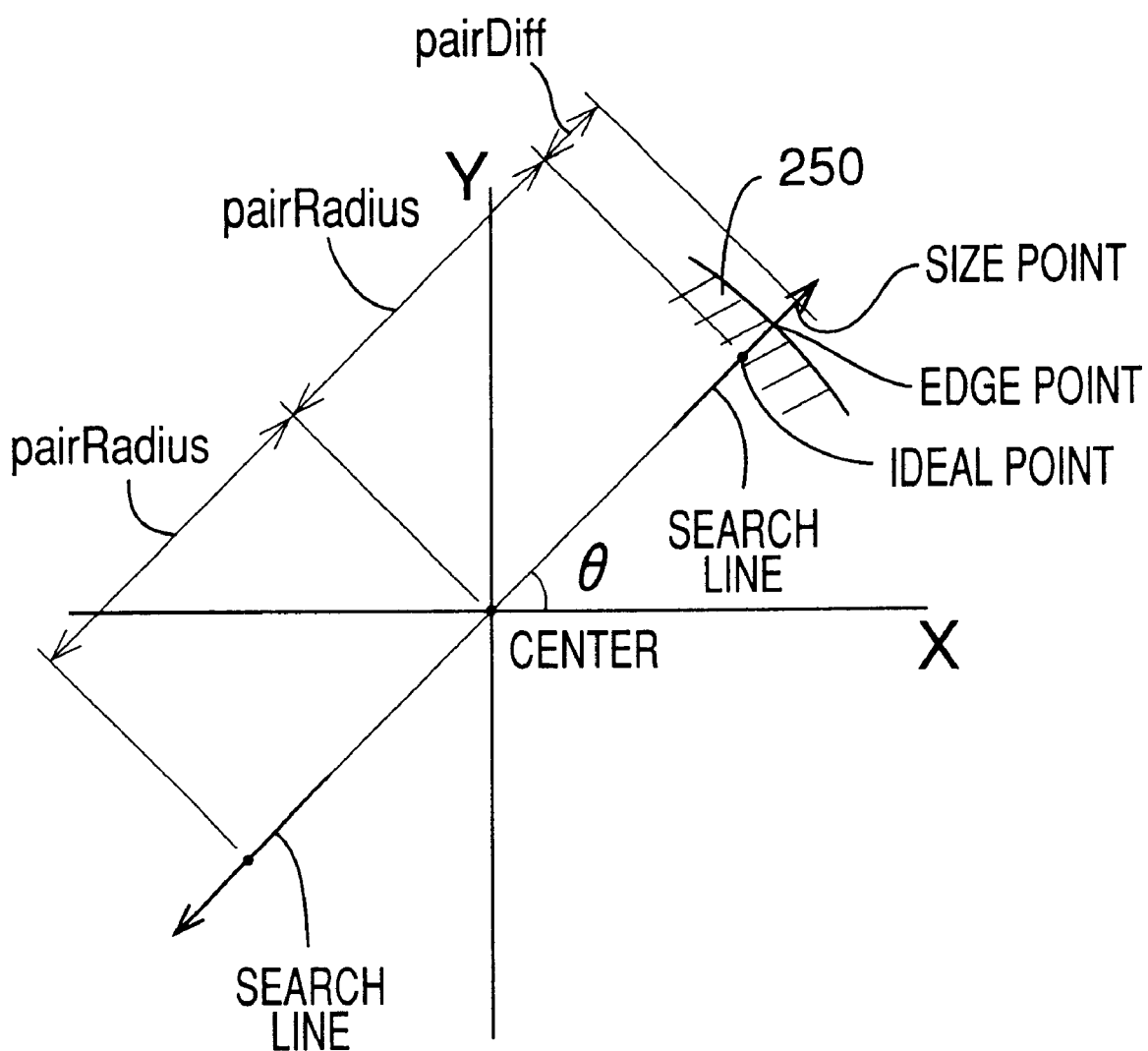
FIG. 53 is a view for explaining a manner in which a size point is determined and the distance between the size point and an edge point is calculated.

First, there will be described, by reference to FIGS. 51, 52, and 53, the case where a failure is recognized with one of search lines which are used for a circular image 260. The failure search line has 0 degree as indicated at broken line in FIG. 51. It is assumed that the actual circular image 260 has a diameter greater than a reference diameter of a reference object, indicated at two-dot chain line in the figure.

In the case of the circular image 260, too, the calculations of dimensions of the image 260 are performed first. The dimension calculations include the calculations of size factors like in the case of the rectangular image 258 shown in FIG. 36. Assuming that eight search lines which are equidistant from one another at a regular interval of 45 degrees extend radially as shown in FIG. 51, an X-direction size factor, sizeFX, and a Y-direction size factor, sizeFY, are calculated according to the following expressions (33), (34), and (35):

for($i=0$; $i<n$; $i$++){sizeXM+=(measured span[$i$]/reference span[$i$])*|(cos angle[$i$])|;

baseXM+=|(cos angle[$i$])|;

sizeYM+=(measured span[$i$]/reference span[$i$])*|(sin angle[$i$])|;

baseYM+=|(sin angle[$i$])|}; (33)

sizeFX=(sizeXM)/(baseXM); (34)

sizeFX=(sizeYM)/(baseYM); (35)

The parameters sizeXM, sizeYM, baseXM, and baseYM occurring in the expression (33) are given respective initial values such that sizeXM=sizeYM=0 and baseXM=baseYM=0. The expression (33) is described in the programming language C, and the word, for($i=0$; $i<n$; $i$++), means the sum of all values obtained according to the expression parenthesized by symbols "{ }" while changing the number, i, from 0 to (n−1). The number, n, means the number of sets of paired search lines used. In the example of FIG. 51, the number n is 4 (n=4), and the number i is changed from 0 to 3. However, when the number i is changed to designate the set of paired search lines including the failure search line, the CPU 154 does not perform any calculations therefor and just adds one to the number i. Thus, regarding the example of FIG. 51, the expression (33) is used for each of the three sets of paired search lines except the set of paired search lines including the failure, 0-degree search line.

In the case of the circular image 260, radial search lines are used which include inclined search lines which are inclined with respect to the X and Y axes. Each of the inclined search lines has respective components of the X-direction and Y-direction size factors. The above expressions (33), (34), and (35) are used to calculate the X-direction and Y-direction size-factor components of each of the inclined search lines. Thus, the X-direction and Y-direction size-factor components of each of the inclined search lines contributes to the determination of the X-direction and Y-direction size factors of the circular image 260.

Next, size points are determined. As shown in FIG. 53, a position error, pairDiff, between an ideal point and a size point is calculated according to the following expressions (36) to (43) (the expressions (36), (37) are described in the programming language C); the-size point is determined based on the thus obtained position error, pairDiff, and the ideal point; and a position error, Diff, between the size point and an edge point are calculated based on the thus determined size point, and the edge point:

$$\delta L_x = \text{pairRadius} * \cos \theta * (\text{size}FX-1); \quad (36)$$

$$\delta L_y = \text{pairRadius} * \sin \theta * (\text{size}FY-1); \quad (37)$$

$$\text{for } \delta L_x \geq 0 \text{ and } \delta L_y \geq 0, \text{pairDiff} = \sqrt{\{(\delta L_x)^2 + (\delta L_y)^2\}}; \quad (38)$$

$$\text{for } \delta L_x < 0 \text{ and } \delta L_y < 0, \text{pairDiff} = -\sqrt{\{(\delta L_x)^2 + (\delta L_y)^2\}}; \quad (39)$$

$$\text{for } \delta L_x < 0 \text{ and } \delta L_y \geq 0, \text{ and } |\delta L_x| \geq |\delta L_y|, \text{pairDiff} = -\sqrt{\{(\delta L_x)^2 - (\delta L_y)^2\}}; \quad (40)$$

$$\text{for } \delta L_x < 0 \text{ and } \delta L_y \geq 0, \text{ and } |\delta L_x| < |\delta L_y|, \text{pairDiff} = \sqrt{\{-(\delta L_x)^2 + (\delta L_y)^2\}}; \quad (41)$$

$$\text{for } \delta L_x \geq 0 \text{ and } \delta L_y < 0, \text{ and } |\delta L_x| \geq |\delta L_y|, \text{pairDiff} = \sqrt{\{(\delta L_x)^2 - (\delta L_y)^2\}}; \quad (42)$$

$$\text{for } \delta L_x = 0 \text{ and } \delta L_y < 0, \text{ and } |\delta L_x| < |\delta L_y|, \text{pairDiff} = -\sqrt{\{(\delta L_x)^2 + (\delta L_y)^2\}}; \quad (43)$$

Figure 51:
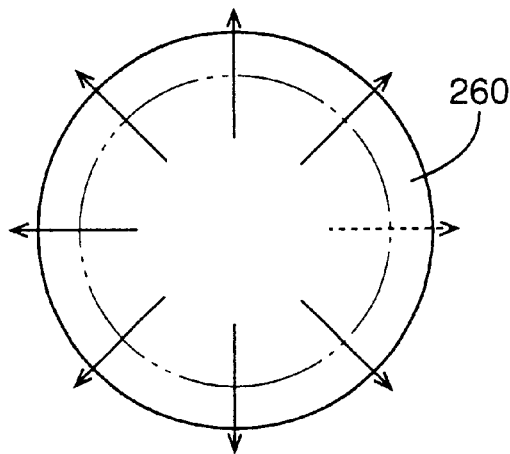
FIG. 51 is a view of search lines which are superposed on a circular image of an object being image-processed.

As described previously, the calculation of a rotation angle of the circular image 260 is not needed, and only a position of the image 260 is calculated. First, a position factor, posFactor, is calculated according to the following expression (44):

$$\text{posFactor}M[i] = 1/\Sigma \cos^2(\text{angle}R[i] - \text{angle}R[n]) \quad (44)$$

where the number, i, indicates each search line and is changed from 0 to 7 (in the example of FIG. 51); and the number, n, indicates the number of the search lines and is changed from 1 to 8 (in the example of FIG. 51).

The expression, $\Sigma \cos^2(\text{angle}R[i] - \text{angle}R[n])$, means the sum of respective squares of respective cosines of respective differences between the angle R[i] of each search line and each of respective angles R[n] of all the search lines except the failure search line. In this calculation operation, too, when the number i is changed to designate the failure search line, the CPU 154 does not perform any calculations therefor and just adds one to the number i. Thus, regarding the example of FIG. 51, the calculations of position factors, posFactor, are not performed on the failure, 0-degree search line, but are performed on each of the other, seven search lines having the 45, 90, 135, 180, 225, 280, and 315 degrees, respectively.

Next, the thus obtained position factor, posFactor, is used to calculate the position of the circular image 260 according to the following expression (45) (described in the programming language C):

$$\text{for}(x=0, y=0, i=0; i<n; i++)\{x=x+\cos(i)*\text{posFactor}M[i]*ss[i]; y=y+\sin(i)*\text{posFactor}M[i]*ss[i];\} \quad (45)$$

where ss[i] is the position error, Diff, between the size point and the edge point of each search line.

Regarding each of all the search lines except the failure search line, the position error, i.e., X-direction and Y-direction error values, ss[i], of each search line is multiplied by the position factor, posFactorM[i], to provide an X-direction and a Y-direction error component of the each search line, respectively. All the thus obtained X-direction components are added to one another and all the thus obtained Y-direction components are added to one another, so that a center position, (x, y), of the circular image 260 is determined. The x and y coordinates of this center position indicate the respective position errors of the center of the circular image 260 from the origin of the individual-measure-template coordinate plane, as measured in the X and Y directions, respectively. As described previously, in the case where one or more failures are recognized with one or more search lines, an actual rotation center RC is away from a reference rotation center RC in the case where no failure is recognized. However, since a position factor, posFactor, is calculated according to the expression (44), and a position error is calculated based on the thus obtained position factor according to the expression (45), the computer can calculate a position error of a center of the circular image 260 that corresponds to the reference rotation center RC, irrespective of whether at least one failure is recognized with at least one search line. Therefore, the position error of the circular image 260 on the reference coordinate plane is obtained by adding, to this center position, the position difference of the individual-measure-template coordinate plane from the reference coordinate plane.

In the case where an image of an object being processed has a circular edge and no failure is recognized with any search lines being used, the calculation of a position of the object is performed by using default values as position factors, etc., like in the case where an object being image-processed has a rectangular image 258.

The term "position factor" has not been used in the previous description relating to the cases where an object being image-processed has a straight-segment image shown in FIG. 38 or a rectangular image shown in FIG. 47. However, in fact, in those cases, too, the calculation of a position factor is performed according to the expression (44). The number "1/3" occurring in the expression (8) or the number "1/4" occurring in the expression (28) or (29) is a position factor. This can easily be demonstrated by applying particular values to substitute the corresponding variables occurring in the expression (44). The expression (44) can be generally used for any shape of an edge of an object. The reason why the expression (44) has not been used in relation to the examples shown in FIGS. 38 and 47, is to help understand the nature of a rotation center RC on those simple examples, and additionally to prove the correctness of the expression (44) by comparing the results of easy calculations in mind on the simple examples with the results of complex calculations in accordance with the expression (44). It goes without saying that the value, 1/3 or 1/4, occurring in the expression (8), (28), or (29) changes if one or more failures are recognized with one or more search lines.

The above-explained calculations that are performed on an object having a circular edge can be done, without needing any modifications, on an object having an octagonal edge which is obtained by cutting off each corner of a rectangle obliquely at 45 degrees. Generally, those dimension and position calculations are applicable to any object having an edge including one or more inclined sides.

While the image processing device 12 has been described with respect to the case where an object being image-processed has a rectangular edge, such as a rectangular EC chip having no lead wires, and the case where an object has a circular edge, such as a reference mark affixed to a CS, the processing device 12 can be used for an EC having a plurality of lead wires, such as a QFP-type EC (hereinafter, referred to as the "QFP"), which may be mounted on a CS. In the case where an object being image-processed is an EC with lead wires, an image of that EC is processed according to a pattern matching manager wherein pattern matchings are combined.

Figure 54:
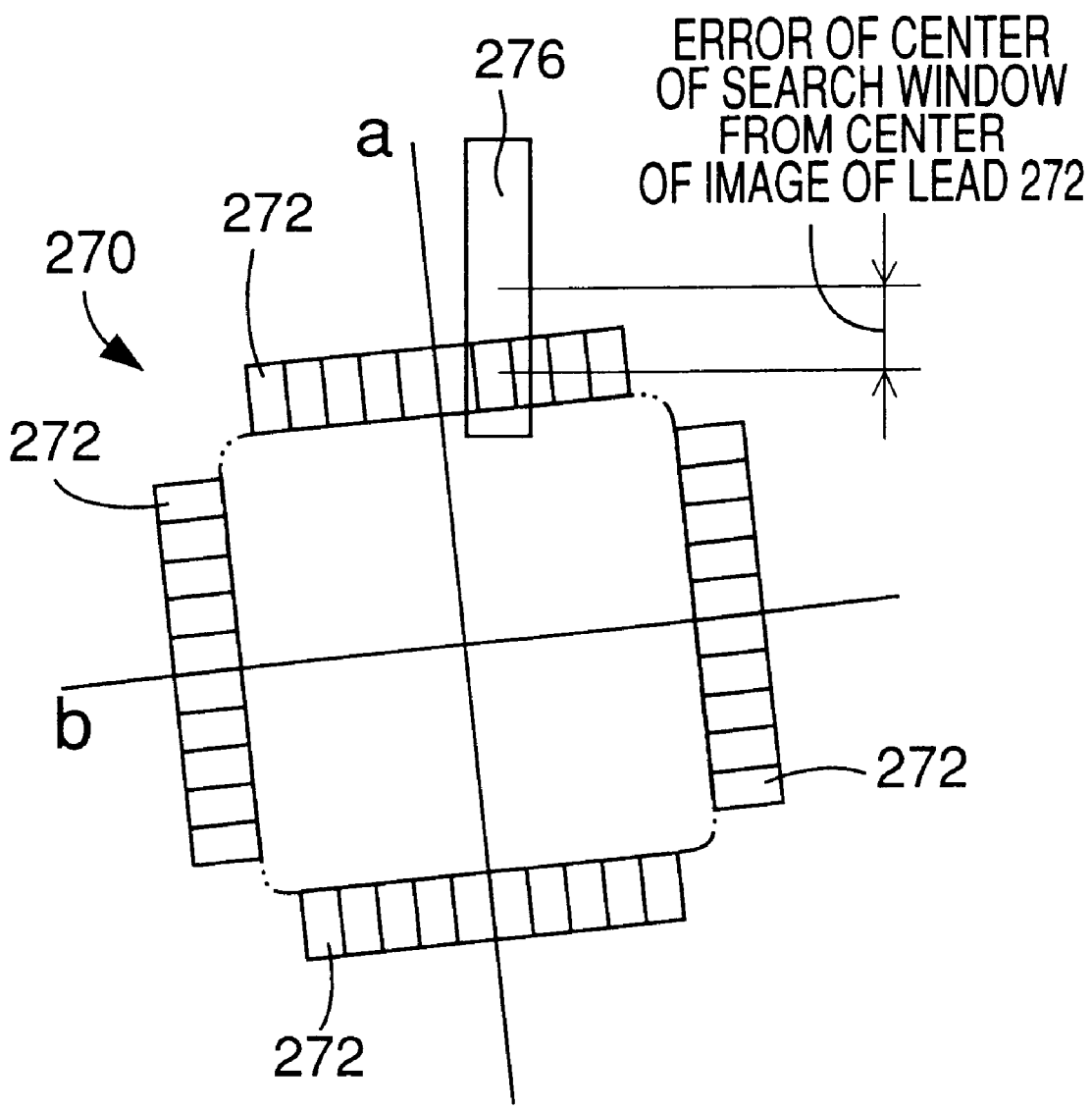
FIG. 54 is a view for explaining a pattern matching which is carried out on a QFP (quad flat package) type electric component ("EC") as an object.

A QFP 270, shown in FIG. 54, is image-processed with respect to not the entire outline thereof but the outline of each lead wire 272 thereof. Errors of positioning of the lead wires 272 with respect to a printed circuit pattern provided on a circuit board ("PCB") can be minimized by mounting the QFP 270 on the PCB based on data indicating the respective positions of the lead wires 272. The dimensions, position, and rotation angle of the QFP 270 are calculated by combining pattern matchings in each of which a corresponding one of the lead wires 272 is dealt with as an object to be image-processed.

Initially, one of the lead wires 272 is sought. To this end, a search window 276 sufficient to cover or encompass the entirety of the one lead wire 272 is produced. Within the search window 276, an individual seek template including a plurality of pairs of points which are produced in advance and pre-stored, is used to seek out the one lead image 272.

A full pattern matching including a seek step, a re-seek step, a measure step, and a re-measure step are carried out to measure a position and a rotation angle of the one lead wire 272. After the position and rotation angle of one lead wire 272 are measured, a half pattern matching including only a seek step and a re-seek step is carried out to seek out all the other lead wires on one of the four sides of the image of the QFP 270. Since a regular interval of distance, i.e., a regular pitch at which the lead wires are provided on each side of the QFP 270 is known in advance to the computer of the image processing device 12, a position and a rotation angle of an individual seek template which is suitably used in the following seek step for seeking out the next lead wire, can be considerably accurately estimated based on the position and rotation angle of the one lead wire 272 obtained in the current re-seek step and the regular pitch of the lead wires 272. Thus, no full pattern patching is needed to accurately seek out the second and following lead wires 272 on each side of the QFP 270.

After pattern matchings are carried out for all the lead wires 272 provided on one side of the QFP 270 and the respective positions of those lead wires 272 are calculated, respective x coordinates of respective centers of those lead wires 272 are added to one another and the thus obtained value is divided by the number of those lead wires 272. Similarly, respective y coordinates of the respective centers of those lead wires 272 are added to one another and the thus obtained value is divided by the number of the lead wires 272. Thus, x and y coordinates of a center of those lead wires 272 are determined. In a similar manner, regarding each of the other, three sides of the QFP 270, x and y coordinates of a center of the lead wires 272 provided on the each side are determined by repeating the half pattern matchings in each of which a position and a rotation angle of an individual seek template are easily determined based on the position and rotation angle of a re-seek template used in the preceding half pattern matching. Since a positional relationship between each one side and the other, three sides is known in advance to the computer, an individual seek template to be used for one side of the QFP 270 can be determined based on a re-seek template used for another side of the same 270. After the x and y coordinates of the center of the lead wires 272 on each of the four sides of the QFP 270 are calculated, the x and y coordinates of a point of intersection of two straight lines, a and b, one of which connects between two of the four centers and other of which connects between the other two centers are calculated as those of a center of the QFP 270 as a whole. A rotation angle of the QFP 270 is calculated according to the following expression (46):

{(angle of slope of straight line, $a$)−90+(angle of slope of straight line, $b$)}/2     (46)

In this way, the recognition of an image of each of almost all sorts of objects (e.g., ECs that are mounted on CSs) can be achieved according to the pattern matching or the pattern matching manager. Though a master seek template and a master measure template are needed for each of different sorts of objects or ECs, the common image processing program can be used to operate each of those templates. Thus, individual image processing programs are not needed for image-processing different sorts of objects or ECs. Thus, the time needed to produce those individual programs is saved.

The time needed to perform the image processing operation increases as the position error of the center of an image of an object from the center of a search window 276 used therefor increases. To avoid this, it is preferred that the position of the center of a search window 276 be determined based on the position of the coordinate plane of the individual seek template used to seek out that object. For example, in the case where a plurality of QFPs 270 are image-processed, it is preferable to determine, after some of those QFPs 270 have been image-processed, a position error between the center of each of a plurality of search windows 276 and a corresponding one of lead wires 272 that has been sought by the each search window 276, calculate an average position error from the thus obtained position errors, and determine the center of another search window 276 at a position where the center of the window 276 offsets the thus obtained average position error.

Figure 55:
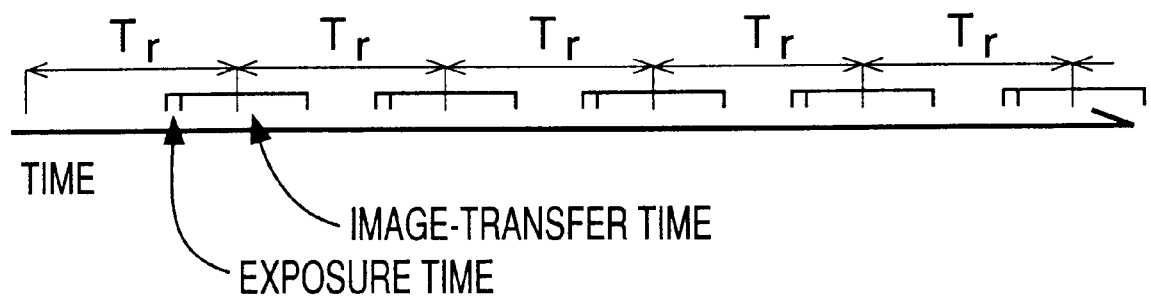
FIG. 55 is a time chart showing a relationship between respective EC-mount cycle times of an EC mounting system and an exposure time and an image-transfer time of a CCD (charge coupled device) camera of the mounting system.

The image processing device 12 carries out, for each of respective images of ECs 146 that are successively taken by the CCD camera 76 (or the CCD camera of the EC mounting system), the pattern matching, or the pattern matching manager, and calculates object vectors with respect to the each image. Thus, the recognition of each EC 146 and the position and rotation-angle errors of the each EC 146 are calculated. As indicated on a time chart of FIG. 55, during a cycle time, $T_r$, needed to mount an EC 146, an image of the EC 146 is taken by the CCD camera 76 while the EC 146 is stopped at an EC-image taking position. Subsequently, a batch of image data representing the taken image of the EC 146 is transferred from the CCD camera 76 to an appropriate one of the four FGMs 164, and processed by the computer. The transferring of a batch of image data and the processing of another batch of image data are performed concurrently with each other.

The four FGMs 164 can store four batches of image data representing respective images of four ECs 146, independent of one another. Therefore, a time needed to complete image processing of one of the four ECs 146 may be longer than a cycle time $T_r$ needed to mount each of the four ECs 146. Image processing of an EC 146 has only to end before the results of image processing are actually used. In the case where, after an image of an EC 146 is taken, a plurality of different ECs 146 are mounted before the results of image processing of the taken image are used, it is not essentially required that the image processing be completed during one EC-mount cycle time $T_r$. The image processing device 12 can complete, while a predetermined number of ECs 146 are mounted, the image processing of the same number of ECs 146. For example, the computer of the device 12 can complete the image processing of one EC 146 while the other three ECs 146 are mounted, in such a manner that a time needed to image-process the one EC 146 is longer by some excessive time than one EC-mount cycle time $T_r$, but a time needed to image-process another EC 146 is shorter than one EC-mount cycle time $T_r$ by a time equal to, or longer than, the above excessive time.

ECs which are mounted on a PCB may include one having no lead wires and accordingly having a simple edge shape, such as a rectangular EC chip, and one having a number of lead wires and accordingly having a complex edge shape. The image processing of a simple EC needs only a short time, whereas the image processing of a complex EC needs a long time. The image processing device 12 can image-process a complex EC in a time longer than an EC-mount cycle time $T_r$, while utilizing a time by which a time needed to image-process a simple EC is shorter than the EC-mount cycle time $T_r$.

If image processing of each of different sorts of ECs must be completed in a predetermined EC-mount cycle time $T_r$, the cycle time $T_r$ must be predetermined to be equal to, or longer than the longest one of respective times needed to image-process all the sorts of ECs. This leads to lowering the EC mounting efficiency. In contrast, the image processing device 12 has the four FGMs 164 which can store four batches of image data, respectively, independent of one another, and can process the four batches of image data in a time equal to four EC-mount cycle times, i.e., $4 \times T_r$, if the sum of respective times needed to process the four batches of image data is not longer than the four EC-mount cycle times ($4 \times T_r$). In other words, the processing device 12 can process a plurality of batches of image data in such a manner that an average of respective times needed to process the batches of image data is not longer than the EC-mount cycle time $T_r$. This leads to shortening the cycle time $T_r$.

Figure 56:
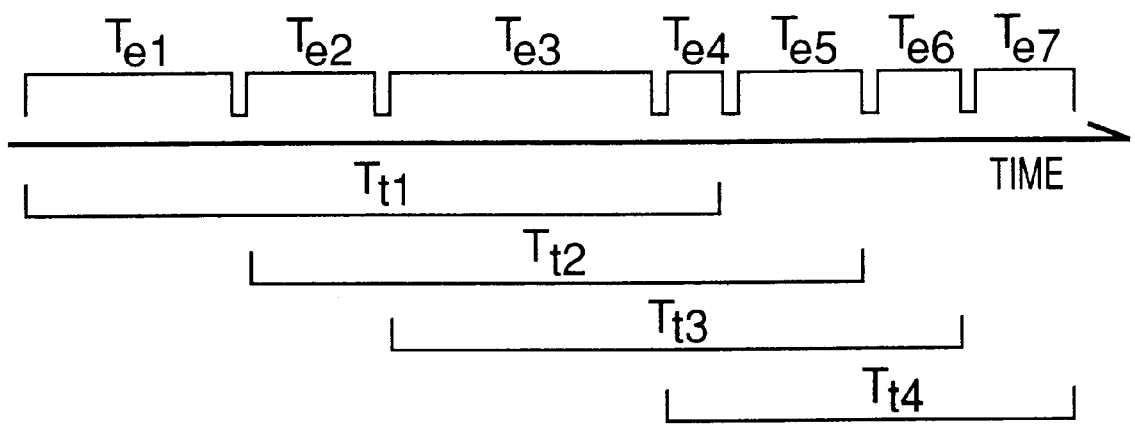
FIG. 56 is a time chart showing image-process cycles of an image processing device of the mounting system of FIG. 55.

FIG. 56 shows an example of respective times, $T_{e1}$ to $T_{e7}$, which are needed to image-process seven ECs, respectively. The image-process times $T_{e1}$ to $T_{e7}$ differ from one another such that some are longer, and some are shorter, than a predetermined cycle time $T_r$ (FIG. 55) needed to mount each EC. However, as can be seen from FIG. 56, each of respective combined times, $T_{t1}$ to $T_{t4}$, that is needed to image-process a corresponding one of four groups of successive ECs (each group includes four ECs) is shorter than a time equal to four EC-mount cycle times, $4 \times T_r$. Thus, the cycle time $T_r$ can be shortened.

The above-explained advantage of employment of the plurality of FGMs 164 is also enjoyed in the case where mixed objects 122 of different sorts are successively conveyed by an object conveying device (not shown) to the present measuring and inspecting apparatus 8. For example, even if respective times needed for the present apparatus 8 to measure and/or inspect respective sorts of objects 122 may differ from each other, the object conveying device can successively convey the objects 122 at a cycle time about an average of respective times needed to measure and/or inspect the same number of successive objects 122 as the number (e.g., 4) of the FGMs 164.

Even in the case where only a single sort of successive objects 122 are sequentially measured and/or inspected by the measuring and inspecting apparatus 8, such that respective times needed to measure and/or inspect those objects 122 are equal to each other, the above-explained advantage of the FGMs 164 is also enjoyed if the CCD camera 76 takes respective images of the objects 122 at irregular time intervals, because a time or times can be given and taken between or among respective times needed for the camera 76 to take the respective images of the objects 122.

Figure 58:
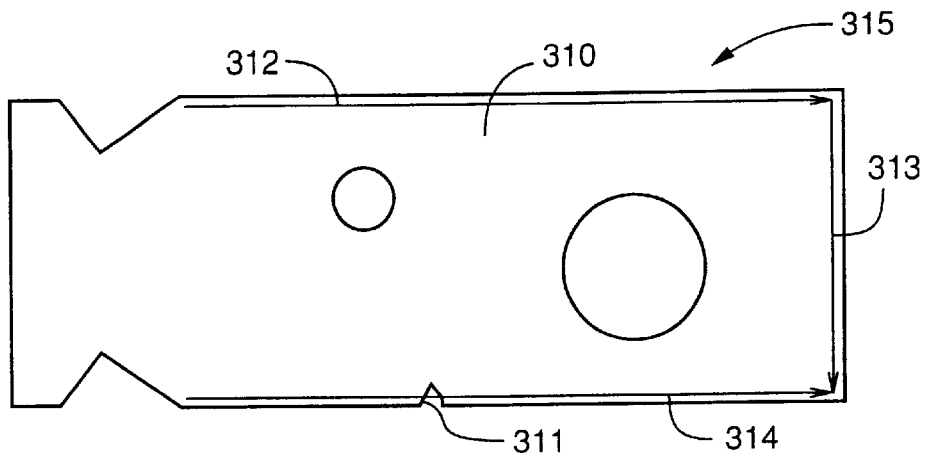
FIG. 58 is a view for explaining a manner in which a chip of an object is inspected using an individual inspect template.

Finally, the inspect step is described in detail, with respect to, e.g., an image 310 of an object (e.g., a part or a component) having a shape shown in FIG. 58. In the case where the image processing device 12 inspects whether the object has a chip 311 as a sort of defect on one of three sides of the image 310 that are adjacent to one another, the computer of the processing device 12 places, slightly inside the three sides of the image 310, three negative search lines 312, 313, 314 parallel to the three sides, respectively. More specifically described, the computer reads, from the DRAM 156, a master inspect template, or a batch of inspect-template data representing the master inspect template, which is produced in advance based on a reference object having a reference position and a reference rotation angle and is pre-stored in the memory card and then in the DRAM 156, and coordinate-transforms the master inspect template based on the actual position and rotation angle of the image 310 of the object that have been measured before the inspect step. Thus, the computer produces an individual inspect template 315 including the negative search lines 312, 313, 314. Data indicating the thus produced individual inspect template 315 are also stored in the DRAM 156. Thus, the DRAM 156 functions as a memory which stores the batch of inspect-template data and the data indicating the individual inspect template 315.

Here it is assumed that the image 310 shown in FIG. 58 is a silhouette of the object and that the chip 311 is lighter than the image 310. The negative search lines 312, 313, 314 are placed or superposed inside the dark image 310, such that the negative search lines 312, 313, 314 do not intersect an edge of the dark image 310. That is, the negative search lines 312, 313, 314 are expected not to intersect the edge of the dark image 310. However, if there is the chip 311, the boundary between the object and the chip 311 provides an edge of the dark image 310. Accordingly, a negative judgment is made with respect to each of the first and second negative search lines 312, 313, if it is judged whether each search line intersects the edge of the dark image 310. On the other hand, a positive judgment is made with respect to the third negative search line 314. If a positive judgment is made with respect to at least one of all the negative search lines 312–314 belong to the individual inspect template 315, the computer concludes that the object having the dark image 310 has the chip 311 as the defect and does not pass the inspection. This is displayed on the CRT monitor device 14.

The size of a chip which can be detected using the individual inspect template 315 can be changed by changing the distance between each negative search line 312–314 and the corresponding side of the image 310. In the case where parts having small chips only pass the inspection, the negative search lines 312–314 are located at respective positions where the lines 312–314 do not intersect such small chips. The master inspect template may be modified to include a plurality of negative search lines which are parallel to each side of the image 310 but have different distances from the each side. In this case, the more distant one or ones of the negative search lines from the each side can detect only the greater one or ones of different sizes of chips. Thus, with the modified master inspect template, the image processing device 12 can inspect how many chips the object has in each of different ranges of size.

Figure 59:
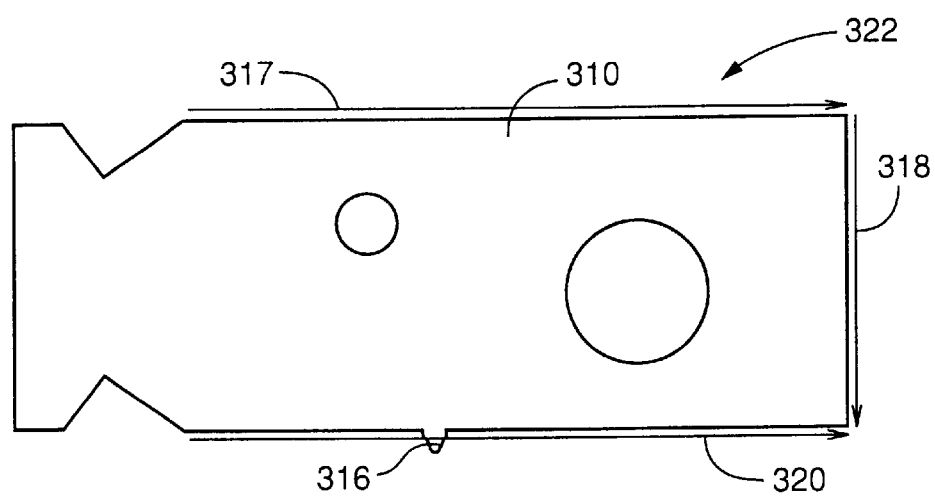
FIG. 59 is a view for explaining a manner in which a burr of an object is inspected using an individual inspect template.

The image processing device 12 can inspect whether an object having an image 310 has a burr 316 as a sort of defect as shown in FIG. 59. In this case, the processing device 12 places, slightly outside three sides of the image 310, an individual inspect template 322 including three negative search lines 317, 318, 320 parallel to the three sides, respectively. More specifically described, the computer of the processing device 12 reads, from the DRAM 156, a master inspect template is pre-stored in the DRAM 156, and coordinate-transforms the master inspect template to obtain the individual inspect template 322. If it is judged whether each one search line 317, 318, 320 intersects the edge of the dark image 310, a positive judgment is made with respect to the third negative search line 320. Accordingly, the computer concludes that the object having the image 310 has the burr 316 as the defect and does not pass the inspection. This conclusion or result is displayed on the monitor device 14.

Figure 60:
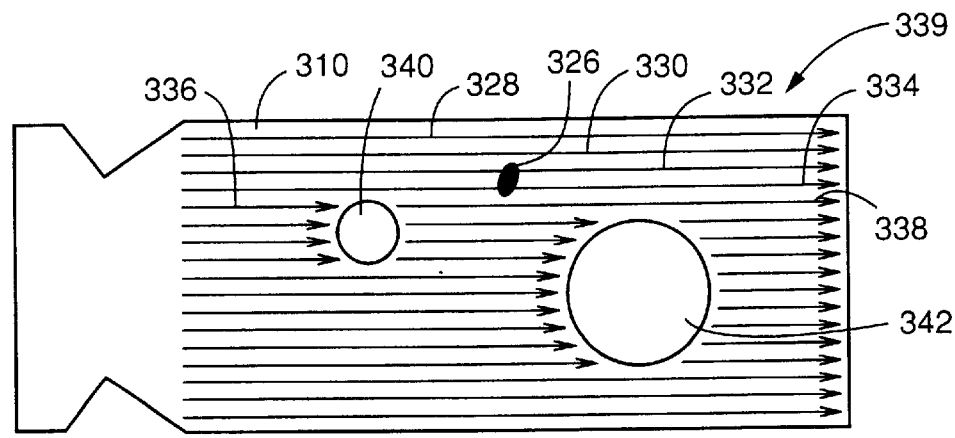
FIG. 60 is a view for explaining a manner in which a scar of an object is inspected using an individual inspect template.

In the case where it is needed to inspect whether an object having an image 310 has a scar 326 as a sort of defect as shown in FIG. 60, the image processing device 12 places, inside an edge of the image 310, an individual inspect template 339 consisting of a number of negative search lines including negative search lines 328, 330, 332, 334, 336, 338. Since the image 310 or the object has two holes 340, 342 inside the edge thereof, the inspect template 339 includes the negative search lines 336, 338 which are expected not to intersect respective edge of the holes 340, 342. Therefore, if at least one of the negative search lines 336, 338 intersects at least one of the edges of the holes 340, 342, a positive judgment is made that at least one of the negative search lines 332–338 of the individual inspect template 339 intersects at least one of the edges of the image 310. Assuming that the image of the scar 326 is darker than the image 310 of the outer surface of the object, the negative search lines 332, 334 which are expected not to intersect any edges of the image 310 intersect an edge of the scar 326. From this fact, the image processing device 12 concludes that the object having the image 310 has the scar 326 and does not pass the inspection.

The image processing device 12 can produce a master or individual inspect template which includes both the negative search lines 312, 313, 314 shown in FIG. 58 and the negative search lines 317, 318, 320 shown in FIG. 59. In this case, the processing device 12 can check an object for each of a chip 311 and a burr 316. Moreover, the processing device 12 can produce a master or individual inspect template which includes the negative search lines 328–338 shown in FIG. 60, in addition to the negative search lines 312, 313, 314, 317, 318, 320 shown in FIGS. 58 and 59. In the last case, the processing device 12 can check an object for each of a chip 311, a burr 316, and a scar 326.

Figure 61:
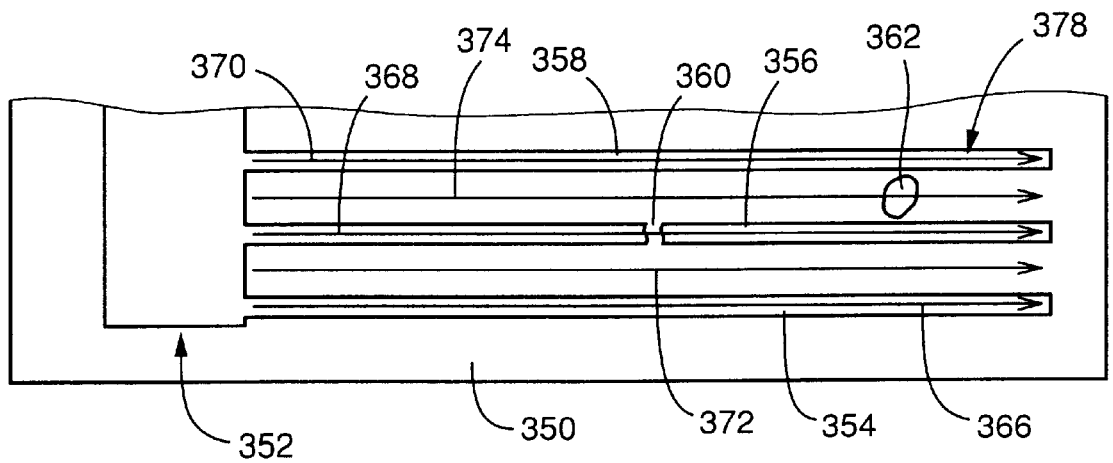
FIG. 61 is a view for explaining a manner in which a discontinuous portion of an object and dirt adhered to the object are inspected using an individual inspect template.

The present measuring and inspecting apparatus 8 can inspect not only the entirety of an object but also a particular portion of an object. An example of the latter sort of inspection is illustrated in FIG. 61. In this case, the image processing device 12 processes an image of a grid pattern 352 of a solar cell 350, and accordingly the grid pattern 352 is an object to be inspected. The grid pattern 352 includes a number of grids 354, 356, 358 extending parallel to one another. If at least one of the grids 354–358 includes a discontinuous portion 360, the solar cell 350 cannot be used and should be rejected. In addition, if the grid pattern 352 has dirt 362 between the grids 354–358 thereof, the cell 350 may suffer malfunction. Hence, the processing device 12 produces, inside respective edges of the grids 354–358, respective negative search lines 366, 368, 370 for finding any discontinuous portions 360, and additionally produces, between the grids 354–358, negative search lines 372, 374 for finding any dirt 362. Those negative search lines 366, 368, 370, 372, 374 extend parallel to one another in a longitudinal direction of the grids 354–358 and cooperate with one another to provide an individual inspect template 378.

Since the negative search line 368 of the individual inspect template 378 passes through the discontinuous portion 360, the negative search line 368 intersects an edge of the grid pattern 352. Thus, the image processing device 12 concludes that the grid pattern 352 of the solar cell 350 has the discontinuous portion 360 as a sort of defect and accordingly the grid pattern 352 or the solar cell 350 does not pass the inspection. In addition, since the negative search line 374 passes through the dirt 362, the negative search line 374 intersects an edge of the grid pattern 352. Thus, the processing device 12 concludes that the grid pattern 352 or the solar cell 350 has the dirt 362 as a sort of defect and accordingly the grid pattern 352 or the solar cell 350 does not pass the inspection. To this end, the image processing device 12 can distinguish, in the individual inspect template 378, the negative search lines 366–370 for finding the discontinuous portion 360, from those 372, 374 for finding the dirt 362.

When each of the above-described inspect templates is used, the image processing device 12 judges that if at least one of the negative search lines of the each template intersects an edge of an object, the object does not pass the inspection. However, the processing device 12 may be adapted such that if the object has only such a defect which does not adversely influence the performance of the object, such as a small scar or a small dirt, the processing device 12 allows the object to pass the inspection. For example, the processing device 12 may be adapted to detect the size of a defect by determining what number of consecutive negative search lines intersect an edge of an object. If the thus detected size of the defect is greater than a reference size, the processing device 12 may conclude that the object does not pass the defect inspection. Alternatively, the processing device 12 may be adapted to conclude that the object does not pass the inspection, if the total number of negative search lines which intersect the edge is greater than a reference number. It is preferred that the CRT monitor device 14 display not only the positive or negative conclusion that the object has passed, or failed, the defect inspection, but also the identified sort, size, and/or number, of the defect or defects.

Figure 62:
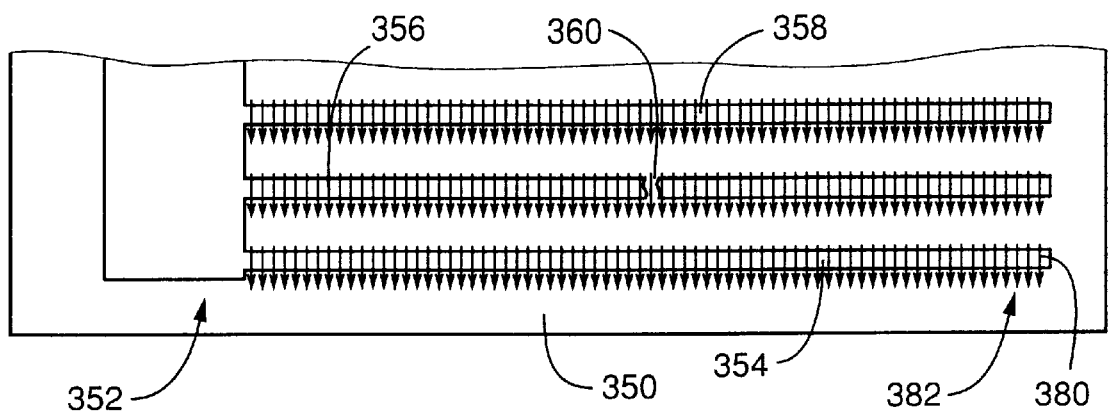
FIG. 62 is a view for explaining a manner in which a discontinuous portion of an object are inspected using a different individual inspect template.

In the foregoing description, positive search lines are used to measure or inspect a position, rotation angle, and one or more dimensions of an object, and negative search lines are used to inspect one or more possible defects of an object. However, the positive search lines or the negative search lines can find their different applications. For example, FIG. 62 shows an example in which positive search lines are used to inspect one or more possible defects of an object. In this example, the image processing device 12 produces a number of positive search lines 380 which extend perpendicularly to a longitudinal direction of each of the grids 354–358 of the solar cell 350 and are expected to intersect the edge of the each grid 354–358. The positive search lines 380 are used to inspect whether the grids 354–358 have any discontinuous portions 360. To this end, the positive search lines 380 are arranged at a predetermined pitch which is shorter than an expected dimension of a discontinuous portion 360, and cooperate with one another to define an individual inspect template 382. All the positive search lines 380 are expected to intersect the edges of the grids 354–358 but, if the grids 354–358 have the discontinuous portion 360, some of the positive search lines 380 do not intersect any edges of the grids 354–358. Thus, the image processing device 12 concludes that at least one of the positive search lines 380 does not intersect any edges of the.solar cell 350 and that the solar cell 350 does not pass the inspection.

Figure 63:
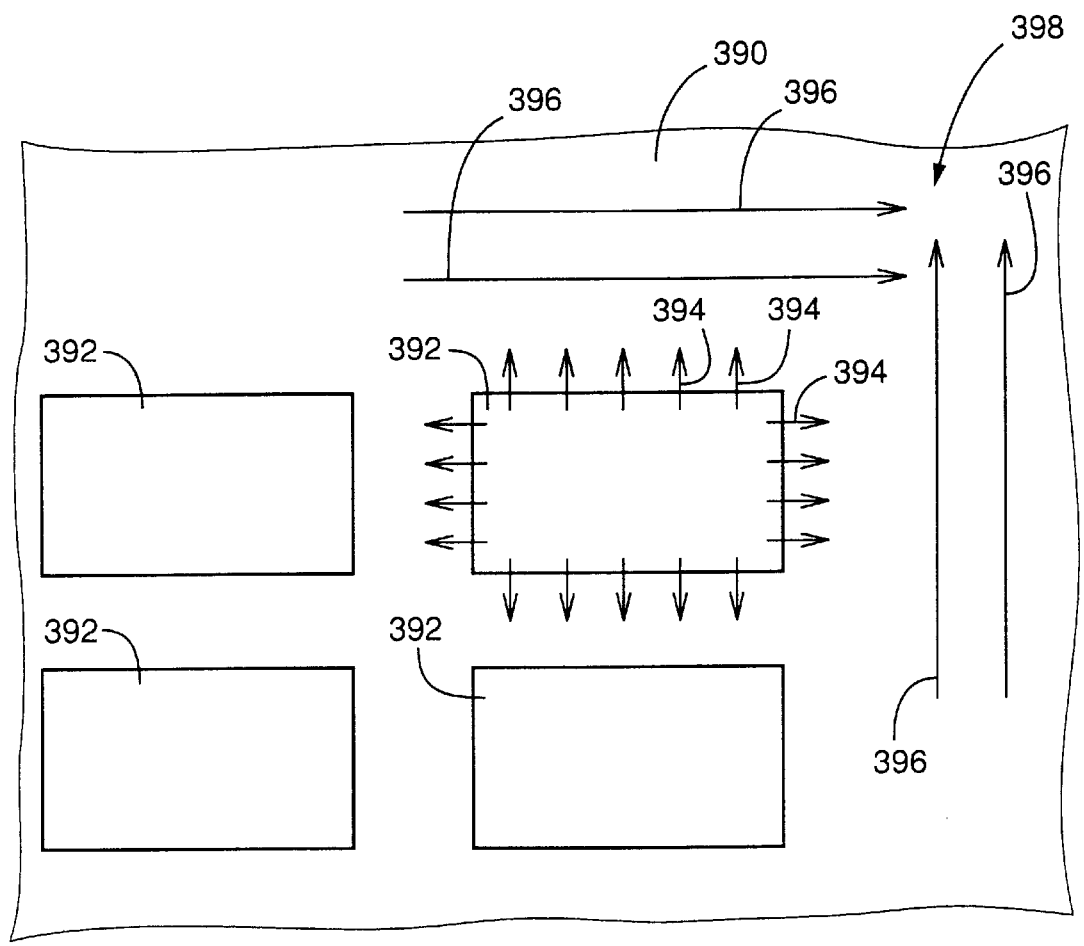
FIG. 63 is a view for explaining a manner in which an object is sought using an individual seek template including negative search lines and positive search lines.

FIG. 63 shows an example in which negative search lines are used to seek an object. In this example, a part or component as an object whose image 390 is dark has a number of rectangular pads 392 whose images are light, and the image processing device 12 seeks one of the pads 392 which is located at the right-hand, upper corner of the image 390. To this end, the processing device 12 produces an individual seek template 398 including a number of positive search lines 394 which are expected to intersect an edge of the one pad 392 to be sought, and a plurality of (e.g. four) negative search lines 396 which are expected not to intersect the edge of the one pad 392. The processing device 12 judges whether each of the positive search lines 394 intersects any one of the respective edges of all the pads 392, and judges whether each of the negative search lines 396 does not intersect any ones of the respective edges of all the pads 392. If each of the positive search lines 394 intersects any one of the respective edges of all the pads 392, and simultaneously if each of the negative search lines 396 does not intersect any ones of the respective edges of all the pads 392, the processing device 12 concludes that the pad 392 whose edge is intersected by the positive search lines 394 is the pad 392 being sought, i.e., the pad 392 located at the right-hand upper corner of the image 390. For example, if the positive search lines 394 intersect the edge of a different pad 392 located on the left-hand side of the pad 392 being sought, the two vertical negative search lines 396 intersect the edge of the pad 392 being sought; and if the positive search lines 394 intersect the edge of a different pad 392 located below the pad 392 being sought, the two horizontal negative search lines 396 intersect the edge of the pad 392 being sought. In each of the two latter cases, the processing device 12 judges that at least one of the negative search lines 396 intersects any one of the respective edges of all the pads 392. Thus, the processing device 12 can recognize that the pad 392 whose edge is intersected by the positive search lines 394 is not the pad 392 being sought, i.e., the pad 392 located at the right-hand upper corner of the image 390. Thus, only when the seek template 398 is positioned relative to the image 390 as shown in FIG. 63, the processing device 12 concludes that the pad 392 whose edge is intersected by the positive search lines 394 is the pad 392 being sought.

Figure 64:
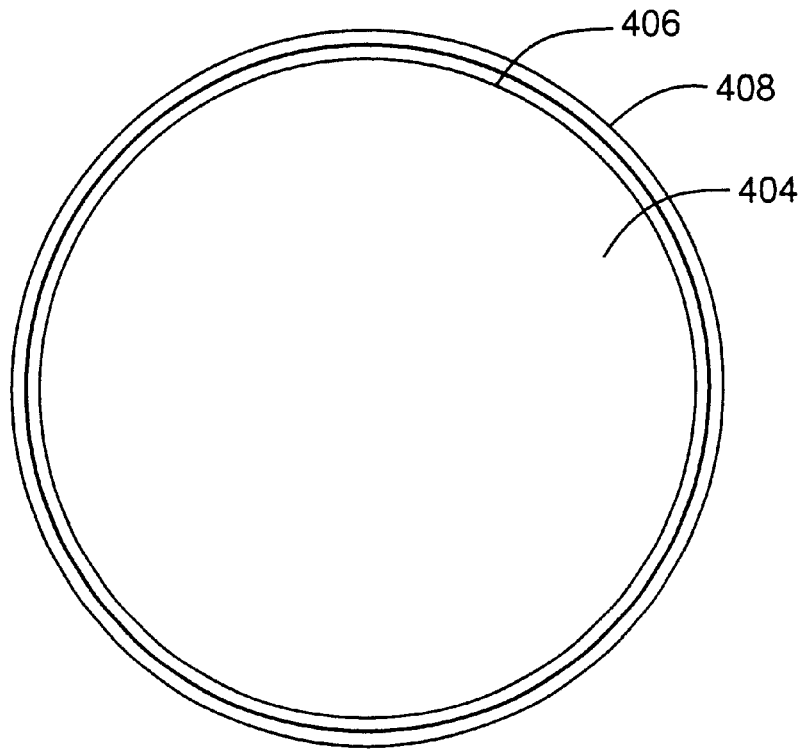
FIG. 64 is a view of another master inspect template.

In each of the above-described examples, each of positive and/or negative search lines is defined by a finite straight line having opposite ends, i.e., a straight segment. However, this is not an essential requirement. For example, FIG. 64 shows circular negative search lines 406, 408 which are concentric with a circular image 404 of an object to be image-processed. The inner negative search line 406 is for finding a chip of the object, and the outer negative search line 408 is for finding a burr of the object. The image processing device 12 may produce, inside the edge of the circular image 404, a number of negative search lines each concentric with the image 404, for finding any possible inside-area defects, such as a scar or dirt, which may occur to the inside area of the image 404.

Figure 65:
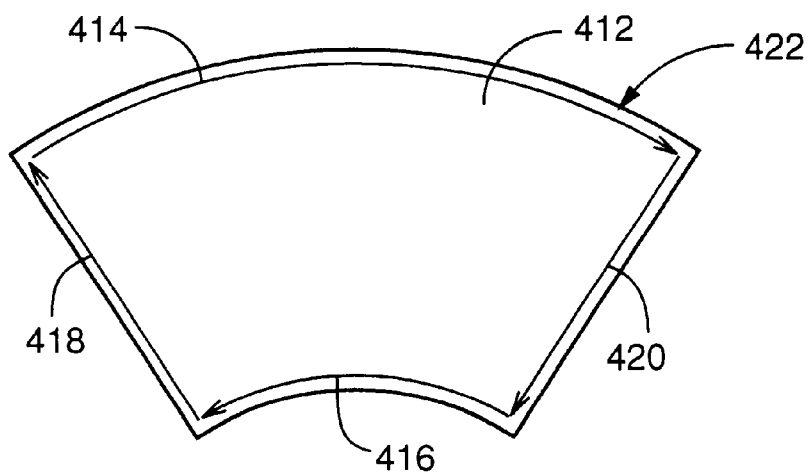
FIG. 65 is a view of yet another master inspect template.

FIG. 65 shows a sectorial image 412 of an object to be inspected. The image processing device 12 produces an individual inspect template 422 including two arcuate negative search lines 414, 416 and two straight-segment negative search lines 418, 420. The inspect template 422 is for finding one or more possible chips of the sectorial image 412. Otherwise, the processing device 12 may produce an inspect template for finding one or more possible burrs of the sectorial image 412, or an inspect template for finding one or more possible inside-area defects of the same 412.

After in this way the image processing device 12 judges whether an object being image-processed has any defects, the processing device 12 judges, based on the result of judgment, whether the object should pass the inspection. The simplest judging manner is that if the object has at least one defect, the processing device 12 judges that the object does not pass the inspection. However, it is possible that if the defect or defects of the object satisfy a predetermined condition, e.g., a condition that the size of a defect is larger than a reference size or a condition that the total number of defects is greater than a reference number, the image processing device 12 judge that the object does not pass the inspection. In those cases, data indicating the simplest judging manner or the predetermined condition are produced in advance for each sort of object to be image-processed, are pre-stored in the memory card, and are read by the processing device 12 to be stored in the DRAM 156.

As can be understood from the foregoing description, the image processing device 12 processes, by using the pattern matching or the pattern matching manager, a batch of image data representing an image taken by the CCD camera 76 of the object 122 to be measured and/or inspected, the EC 146, or the reference mark affixed to the CS (e.g., PCB). In the pattern matching or the pattern matching manager, a seek template, a re-seek template, a measure template, a re-measure template, and an inspect template are used to seek an object to be image-processed and determine edge points of the object. Thus, only portions of the image that correspond to those templates are sought, measured, and inspected. That is, only portions of the image that need to be processed are processed, and the other portions of the image that need not be processed are not processed. Accordingly, the image-processing of the image data can be completed in a short time. In addition, the image-processing is not adversely affected by almost all sorts of image noise (e.g., white or black spots), unless the noise directly rides on the image.

In the seek step, the image processing device 12 judges whether the difference of respective optical characteristic values (e.g., luminance values) of each pair of points of an individual seek template satisfy the predetermined condition; and in each of the re-seek step, the measure step, the re-measure step, and the inspect step, the processing device 12 determines, on each search line, an edge point based on the rate of change of respective optical characteristic values (e.g., luminance values) of division points designated on the each search line. Thus, even in the case where an object being image processed is considerably large like a QFP-type EC and accordingly respective portions of the object may be unevenly lighted, the processing device 12 compares respective characteristic values of respective portions of the object that are lighted under substantially the same condition, with each other. Thus, the image processing device 12 can accurately process image data without being adversely influenced by a possible uneven lighting of the object.

In addition, even if the CCD camera 76 may be replaced with a different CCD camera including CCDs (i.e., solid-state image-take elements) whose size is different from that of the CCDs 80 of the camera 76, the image processing device 12 can operate without having to substantially modify the previously described control programs. Moreover, since the processing device 12 inspects a possible defect of an object according to the technique similar to that employed to measure and inspect a position, rotation angle, and dimensions of the object, the processing device 12 can complete, in a short time, the defect inspection together with the measurement and inspection of the position, rotation angle, and dimensions.

In the illustrated embodiment, it has been assumed that the origin of the master-measure-template coordinate plane coincides with a reference designated center DC of an object to be image-processed. However, the origin may coincide with a position other than the reference designated center DC. In the latter case, it is possible to determine a position error (or a rotation-angle error) of an actual designated center DC of the object on the reference coordinate plane, by adding, to a position difference (or a rotation-angle difference) between the reference rotation center RC and the reference designated center DC, a position difference (or a rotation-angle difference) between the reference designated center DC and the master-measure-template coordinate plane and a position difference (or a rotation-angle difference) between the master-measure-template coordinate plane and the reference coordinate plane.

In the illustrated embodiment, the image processing device 12 can know the shape and dimensions of an object to be measured or inspected, and utilizes this fact in performing a special image processing operation in which the seek template 200, the re-seek template 228, the measure template 236, the re-measure template, and the inspect template 315 are used to inspect the dimensions and possible defect of the object. Therefore, the processing device 12 can complete the image processing operation in a short time. In addition, since the object-support plate 72 as a device for supporting an object 122 to be measured or inspected is provided by a transparent flat plate and the various sorts of templates 200, 228, 236, 315 are automatically produced based on the position and rotation angle of the object 122, the operator has only to just place the object 122 on the object-support plate 72. That is, even if the operator may place the object 122 at inaccurate position and/or rotation angle, the image processing device 12 measures the dimensions of the object 122 and detects one or more possible defects of the object 122. Thus, each object 122 can be easily set on the image taking device 10. Moreover, since the operator can input, through the foot switch 22, a command to start the image processing operation of the processing device 12, the operator can use his or her two hands in a different operation. In this respect, too, the present measuring and inspecting apparatus 8 can be used with ease. Furthermore, the present apparatus 8 need not fix an object 122 to be measured or inspected, and may measure one or more dimensions of the object 122 without physical contact therewith. Therefore, the present apparatus 8 can easily measure one or more dimensions, and inspect one or more possible defects of a product formed of, e.g., rubber or soft synthetic resin. Thus, the present apparatus 8 can perform even an each-individual dimension inspection in which one or more dimensions of each individual of a great number of injection-molded or press-molded products are measured. In addition, the present apparatus 8 can inspect not only a dimension of a predetermined portion of a product, such as the inner diameter of a through-hole, a pitch at which an array of holes are formed, a pitch at which an array of projections are formed, the outer diameter of a cylindrical tube, the distance between two flanges, or the length of an axis member, but also inspect whether a product has one or more portions which should have been worked but in fact have not been worked yet, or whether a product has lost one or more parts.

It emerges from the foregoing description that in the present embodiment, the FGMs 164 of the image processing device 12 provide the image-data memory in which the image data is stored; the DRAM 156 provides the seek-template-data memory, the measure-template-data memory, and the inspect-template-data memory. A portion of the processing device 12 that carries out the seek step solely, or both the seek step and the re-seek step, of the pattern matching program, provides the object jugding means for judging whether the object is one being sought. A portion of the processing device 12 that carries out the seek step, the re-seek step, the measure step, and the re-measure step of the pattern matching program, provides the measuring device which measures at least one of a position, a rotation angle, and a dimension of the object, and a portion of the measuring device that determines a position of an edge point in each of the re-seek step, the measure step, and the re-measure step, provides the edge-point-position determining means. A portion of the processing device 12 that designates a virtual point whose luminance value is to be calculated in each of the seek step, the re-seek step, the measure step, and the re-measure step of the pattern matching program, provides the virtual-point designator. A portion of the processing device 12 that calculates a luminance value of the designated virtual point, provides the virtual-point-data calculating means.

In addition, a portion of the image processing device 12 that compares the measured dimension of the object with a reference dimension and judges whether the object passes the inspection, provides a dimension inspecting means. A portion of the processing device 12 that produces an inspect template including negative search lines, or a seek template including negative search lines, provides the negative-search-line producing means; a portion of the processing device 12 that produces an inspect template including positive search lines, or a seek template including positive search lines, provides the positive-search-line producing means; and each one or both of the negative-search-line producing means and the positive-search-line producing means provides or provide the search-line producing means. A portion of the processing device 12 that judges whether one or more negative search lines intersect an edge of the object, provides the judging means, and the judging means cooperates with a portion of the processing device 12 that judges whether the object passes the inspection, to provide the inspection judging means; The search-line producing means and the judging means cooperate with each other to provide a defect judging means for judging whether the object has one or more defects.

In the illustrated embodiment, respective size factors are calculated with respect to the X direction and the Y direction, so as to deal with the case where an object 122 has different rates of dimension error in the X direction and the Y direction, respectively. However, it may be assumed that an object 122 has a common rate of dimension error in both the X and Y directions. For example, regarding the rectangular image 250 shown in FIG. 36, it is possible to calculate, as a size factor, an average value of all the values that are obtained by measuring an X-direction span of the image 250 with each pair of search lines out of all pairs of search lines that are parallel to the X direction but do not include any "failure" pairs of search lines each including at least one "failure" search line, dividing each of the thus measured X-direction spans with a corresponding one of reference X-direction spans, measuring a Y direction span of the image 250 with each pair of search lines out of all pairs of search lines that are parallel to the Y direction but do not include any "failure" pairs of search lines, and dividing each of the thus measured Y-direction spans with a corresponding one of reference Y-direction spans. The thus obtained size factor can be commonly used to calculate both a size point on a search line parallel to the X direction and a size point on a search line parallel to the Y direction.

The above-indicated assumption can apply to the circular image 260 shown in FIG. 51. Regarding the circular image 260, it is possible to calculate, as a size factor, an average value of all the values that are obtained by measuring a span of the image 260 with each pair of search lines out of all pairs of search lines, shown in FIG. 51, except one or more "failure" pairs of search lines, and dividing each of the thus measured spans with a corresponding one of reference spans. The thus obtained size factor can be commonly used to multiply each of the respective values, pairRadius, of all the search lines except the one or more "failure" search lines, and thereby determine respective size points on those search lines and calculate the error, Diff, between each of the size points and a corresponding one of the edge points. The calculations of position factors and a position are performed in the same manner as described in the illustrated embodiment.

In the illustrated embodiment, the image processing device 12 carries out the re-seek step just one time. However, the processing device 12 may be modified to repeat the re-seek step. More specifically described, after in the first re-seek step only not more than the predetermined number of failure search lines are found and the edge points of the object 122 are determined, another re-seek template is produced and another re-seek step is carried out. The processing device 12 produces the another or second re-seek template, based on the first re-seek template used in the previous re-seek step and the respective positions of the edge points determined in that step, such that the second re-seek template has smaller position and rotation-angle errors relative to the object 122 than the first re-seek template. Experiences show that the possibility that at least one failure occurs to at least one search line in the following measure step is lower when the re-seek step is repeated than when the re-seek step is carried out just one time. The reason for the above experiences has not been elucidated. However, it has been suggested that if in the seek step an object being image-processed is narrowly judged as an object being sought, though there are considerably large errors between the seek template and the object being image-processed, there is some possibility that large errors may occur between a re-seek template and the object being image-processed, which may lead to some possibility in the following measure step as well that large errors may occur between a measure template and the object being image-processed and accordingly at least one failure may occur to at least one search line. In contrast, if the re-seek step is repeated, the above possibility may decrease in the measure step.

In a particular case where the image processing device 12 can know, in advance, the shape, and rough position and rotation angle, of an object being image-processed, the processing device 12 can accurately place, without having to use a seek template to seek the object, search lines of a measure template just on an edge of the object and determine respective edge points on the search lines. In this case, the seek step is omitted.

In the illustrated embodiment, the measure step is carried out after the re-seek step is carried out using a re-seek template. However, in a particular case where it is known in advance that an object being image-processed has only small dimension errors and/or small shape-related defects, the measure step may be carried out to follow the seek step. The re-seek step is omitted. In this case, a re-seek template to be used in the re-seek step may be used as a measure template in the measure step. However, it is preferred to employ, as a measure template, a template which includes more search lines than those of the re-seek template.

In the illustrated embodiment, the image processing device 12 judges whether an abnormality has occurred to the pattern matching operation, by judging whether more than the predetermined or programmed number of permissible failures have occurred. However, the present invention is not limited to this judging manner. For example, the processing device 12 may select, in response to a selection command input by the operator, either one of a first program which commands calculations of object vectors with respect to only objects each without any failures, and a second program which allows objects each with not more than the predetermined number of failures and commands calculations of object vectors with respect to only the allowed objects. Since each batch of image data can be processed in a short time according to the first program, the operator can select the first program depending on the circumstances to improve the inspection efficiency, or shorten a time needed to mount each EC 146 on a CS.

In the illustrated embodiment, the image processing device 12 seeks, in a taken image, an edge at which the optical characteristic of the image significantly changes, in such a manner that the processing device 12 first seeks, in a seek template, each pair of points whose respective optical characteristic values have a difference from each other greater than a reference value, and then determines, as an edge point, a position where the differential values of optical characteristic values obtained on each search line (i.e., measuring search line) of a measure template take a maximum. However, the present invention is not limited to this manner. For example, the processing device 12 may be modified to determine, as an edge point, a position where the differential values of optical characteristic values obtained on each search line of a measure template take a value greater than a reference value. In the latter case, a plurality of continuous positions may be determined as continuous edge points on each search line. In the last case, the processing device 12 may determine, as a proper edge point, one of the edge points that corresponds to a maximum differential value.

Figure 66:
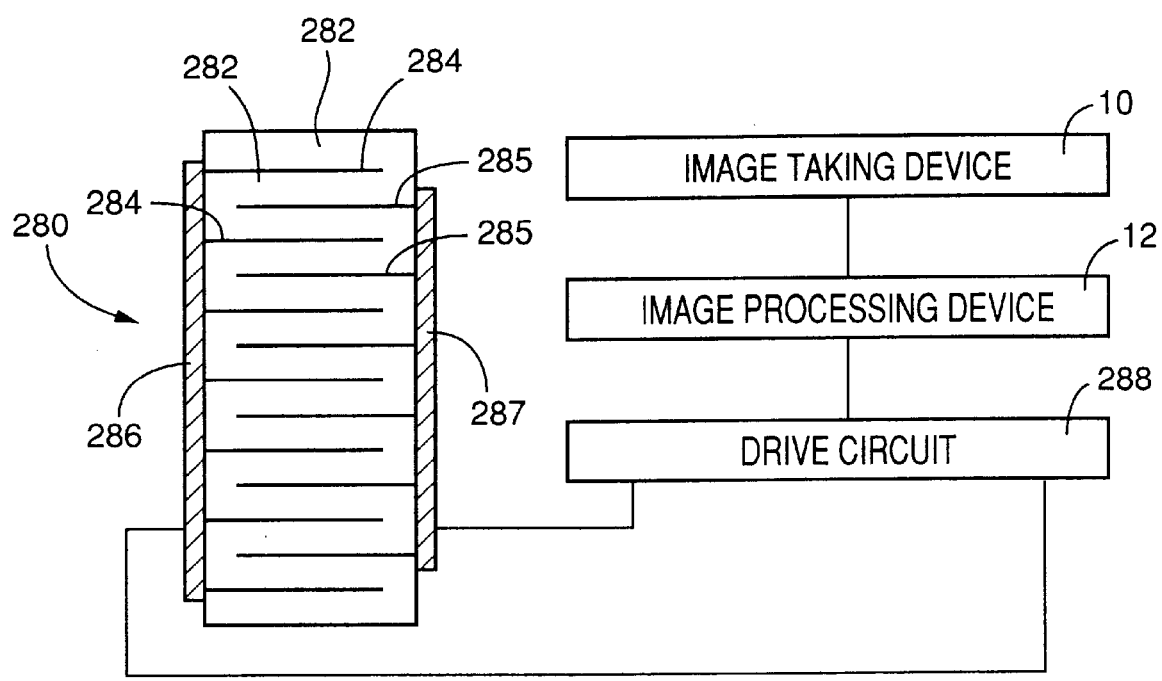
FIG. 66 is a diagrammatic view of a height-position adjusting device of an image taking device of another measuring and inspecting apparatus as a second embodiment of the present invention.

In the illustrated embodiment, the relative position between the focal point O of the object lens 108 and the aperture 100 of the orifice member 94 in the direction parallel to the optical axis of the lens 108 is adjusted by operating the adjusting screw 50, and the direction of the reflecting surface 70 of the mirror 68 is adjusted by operating one or more of the adjusting screws 66. However, the screw 50 and/or the screws 66 may be replaced with a laminous piezoelectric element 280 shown in FIG. 66. The laminous piezoelectric element 280 includes a plurality of thin ceramics plates 282 each of which is cut from sintered ceramics and then ground, and two inner electrodes 284, 285 which are connected to two outer electrodes 286, 287, respectively. The ceramics plates 282, and the fins of the first and second inner electrodes 284, 285 are alternately laminated on each other, and the fins of *the first inner electrode 284 and the fins of the second inner electrode 285 are alternately arranged on each other among the ceramic plates 282. The outer electrodes 286, 287 are connected to a drive circuit 288, and the drive circuit 288 is controlled by the image processing device 12 and the image taking device 10 so as to adjust the relative position between the focal point O of the object lens 108 and the aperture 100 of the orifice member 94 in the optical-axis direction, or adjust the direction of the reflecting surface 70 of the mirror 68. The length of the laminous piezoelectric element 280 can be changed by changing the electric voltage applied thereto. An image of the calibrating jig 126 or the object 122 is taken by the image taking device 10, and the taken image is processed by the image processing device 12 to measure the distance between the respective centers of each pair of reference marks 129, or measure the dimensions of the object 122. The image processing device 12 can automatically control, while taking the measured distances or dimensions into account, the drive circuit 288 to adjust the relative position between the focal point O of the object lens 108 and the aperture 100 of the orifice member 94 in the optical-axis direction, or adjust the direction or orientation of the reflecting surface 70 of the mirror 68.

In the illustrated embodiment, the simple transparent flat plate 72 is used as the object supporting device which supports an object to be measured and/or inspected. The flat plate 72 also functions as a mirror protecting device which protects the surface of the mirror 68 from being damaged. Thus, it is possible to use the mirror 68 as the object supporting device. It is not essentially required that the object supporting device be formed of a transparent material, so long as the supporting device supports the object within the area inside the outline of the object, or has such a shape which does not adversely influence a taken image of a particular portion of the object whose dimension or dimensions is or are to be measured. The object supporting device may be one which supports the object while positioning the same at a predetermined position and/or a predetermined rotation angle. In the last case, a time needed to process a batch of image data can be shortened.

It is to be understood that the present invention may be embodied with other changes, improvements, and modifications that may occur to a person skilled in the art without departing from the scope and spirit of the invention defined in the appended claims.

What is claimed is:

1. An object inspecting apparatus, comprising:
    an image taking device which takes an image of an object;
    an image-data memory in which image data representing the taken image of the object is stored;
    negative-search-line producing means for producing at least one negative search line which is expected, when at least one of a position, a rotation angle, and a dimension of the object satisfies a first predetermined condition, not to intersect an edge of the image of the object represented by the image data, an optical characteristic of the image significantly changing at said edge; and
    inspection judging means for judging that the object passes the inspection, when said at least one negative search line does not intersect the edge of the image of the object, and judging that the object does not pass the inspection, when said at least one negative search line intersects the edge of the image of the object.

2. An apparatus according to claim 1, further comprising a measuring device which measures at least one of the position, the rotation angle, and the dimension of the object, wherein the negative-search-line producing means produces said at least one negative search line based on the measured one of the position, the rotation angle, and the dimension of the object.

3. An apparatus according to claim 1, further comprising positive-search-line producing means for producing at least one positive search line which is expected, when at least one of the position, the rotation angle, and the dimension of the object satisfies a second predetermined condition, to intersect the edge of the image of the object represented by the image data.

4. An apparatus according to claim 3, wherein the inspection judging means judges, when said at least one negative search line does not intersect the edge of the image of the object and simultaneously when said at least one positive search line satisfies at least a third condition that said at least one positive search line intersects the edge of the image of the object, that the object is an expected object and passes the inspection.

5. An apparatus according to claim 1, wherein said at least one negative search line comprises at least one of (a) at least one finite line having opposite ends and (b) at least one closed line.

6. An apparatus according to claim 1, wherein the image taking device comprises a plurality of image-take elements each of which produces an electric signal representing an optical characteristic value of a corresponding one of a plurality of picture elements of the image of the object, wherein the image-data memory stores, as the image data, the respective optical characteristic values represented by the respective electric signals produced by the image-take elements, such that each of the respective optical characteristic values is associated with a position of a corresponding one of the picture elements in the image of the object, wherein the apparatus further comprises a virtual-point designator which designates an arbitrary virtual point on a virtual screen corresponding to a physical screen defined by the image data stored in the image-data memory; and virtual-point-data calculating means for calculating an optical characteristic value of the designated virtual point based on the respective optical characteristic values of at least two picture elements of the image that correspond to the designated virtual point, and wherein the negative-search-line producing means produces, on the virtual screen, said at least one negative search line.

7. A recording medium on which an object-inspecting control program is recorded which is readable by a computer and is usable by the computer to inspect an object based on image data representing an image of the object taken by an image taking device, the image data being stored in an image-data memory, the program comprising the steps of:
    producing at least one negative search line which is expected, when at least one of a position, a rotation angle, and a dimension of the object satisfies a predetermined condition, not to intersect an edge of the image of the object represented by the image data, an optical characteristic of the image significantly changing at said edge, and
    judging that the object passes the inspection, when said at least one negative search line does not intersect the edge of the image of the object, and judging that the object does not pass the inspection, when said at least one negative search line intersects the edge of the image of the object.

8. A recording medium according to claim 7, wherein said at least one negative search line comprises at least one of (a) at least one finite line having opposite ends and (b) at least one closed line.

9. An object inspecting apparatus, comprising:
    an image taking device which takes an image of an object;
    an image-data memory in which image data representing the taken image of the object is stored;
    search-line producing means for producing (a) at least one negative search line which is expected, when at least one of a position, a rotation angle, and a dimension of the object satisfies a first predetermined condition, not to intersect an edge of the image of the object represented by the image data, an optical characteristic of the image significantly changing at said edge, and (b) at least one positive search line which is expected, when at least one of the position, the rotation angle, and the dimension of the object satisfies a second predetermined condition, to intersect the edge of the image of the object; and inspection judging means for judging that the object passes the inspection, when said at least one negative search line does not intersect the edge of the image of the object and said at least one positive search line satisfies at least a third condition that said at least one positive search line intersects the edge of the image of the object, and judging that the object does not pass the inspection when said at least one negative search line intersects the edge of the image of the object and said at least one positive search line does not satisfy at least the third condition.

10. An apparatus according to claim 9, further comprising a measuring device which measures at least one of the position, the rotation angle, and the dimension of the object, wherein the search-line producing means produces (a) said at least one negative search line and (b) said at least one positive search line, based on the measured one of the position, the rotation angle, and the dimension of the object.

11. An apparatus according to claim 10, wherein the measuring device comprises:

a seek-template data memory in which seek-template data representing a seek template is stored, the seek template comprising a plurality of pairs of points, the two points of each pair out of said pairs being distant from each other;

object judging means for making, when the seek template represented by the seek-template data is superposed on a screen on which the image represented by the image data is present and respective optical characteristic values corresponding to the two points of said each pair satisfy a fourth predetermined condition relating to an amount of difference between respective optical characteristic values inside and outside the edge of the image, an individual positive judgment that one of said two points of said each pair is located inside the edge of the image and the other point of said each pair is located outside the edge of the image, and further making, when said individual positive judgment is made with respect to the two points of each pair out of not less than a predetermined amount of said pairs, a total positive judgment that the object is an object being sought by the seek template;

a measure-template data memory in which measure-template data representing a measure template is stored, the measure template comprising a plurality of measuring search lines; and edge-point-position determining means for superposing the measure template represented by the measure-template data, on the screen on which the image represented by the image data is present, and determining respective positions of respective edge points at which the measuring search lines intersect the edge of the image.

12. An apparatus according to claim 11, further comprising seek-template producing means for automatically producing the seek-template data based on reference-object defining data defining a reference object.

13. An apparatus according to claim 11, further comprising measure-template producing means for automatically producing the measure-template data based on the seek-template data representing the seek template.

14. An apparatus according to claim 13, further comprising re-measure-template producing means for automatically producing a re-measure template as a new measure template for re-measurement of the object, based on at least one of the position, the rotation angle, and the dimension of the object measured using the measure template.

15. An apparatus according to claim 9, wherein at least one of (a) said at least one negative search line and (b) said at least one positive search line comprises at least one finite line having opposite ends.

16. An apparatus according to claim 15, wherein said at least one finite line comprises at least one straight segment.

17. An apparatus according to claim 9, wherein at least one of (a) said at least one negative search line and (b) said at least one positive search line comprises at least one closed line.

18. An apparatus according to claim 9, wherein the image taking device comprises a plurality of image-take elements each of which produces an electric signal representing an optical characteristic value of a corresponding one of a plurality of picture elements of the image of the object, wherein the image-data memory stores, as the image data, the respective optical characteristic values represented by the respective electric signals produced by the image-take elements, such that each of the respective optical characteristic values is associated with a position of a corresponding one of the picture elements in the image of the object, wherein the apparatus further comprises a virtual-point designator which designates an arbitrary virtual point on a virtual screen corresponding to a physical screen defined by the image data stored in the image-data memory; and virtual-point-data calculating means for calculating an optical characteristic value of the designated virtual point based on the respective optical characteristic values of at least two picture elements of the image that correspond to the designated virtual point, and wherein the search-line producing means produces, on the virtual screen, (a) said at least one negative search line and (b) said at least one positive search line.

19. A recording medium on which an object-inspecting control program is recorded which is readable by a computer and is usable by the computer to inspect an object based on image data representing an image of the object taken by an image taking device, the image data being stored in an image-data memory, the program comprising the steps of:

producing (a) at least one negative search line which is expected, when at least one of a position, a rotation angle, and a dimension of the object satisfies a first predetermined condition, not to intersect an edge of the image of the object represented by the image data, an optical characteristic of the image significantly changing at said edge, and (b) at least one positive search line which is expected, when at least one of the position, the rotation angle, and the dimension of the object satisfies a second predetermined condition, to intersect the edge of the image of the object, and inspection judging means for judging that the object passes the inspection, when said at least one negative search line does not intersect the edge of the image of the object and said at least one positive search line satisfies at least a third condition that said at least one positive search line intersects the edge of the image of the object, and judging that the object does not pass the inspection when said at least one negative search line intersects the edge of the image of the object and said at least one positive search line does not satisfy at least the third condition.

20. A recording medium according to claim 19, wherein at least one of (a) said at least one negative search line and (b) said at least one positive search line comprises at least one of (a) at least one finite line having opposite ends and (b) at least one closed line.

21. An object inspecting apparatus, comprising:

an image taking device which takes an image of an object;

an image-data memory in which image data representing the taken image of the object is stored;

a measuring device which measures, based on the image data stored in the image-data memory, at least one of a position, a rotation angle, and a dimension of the object;

negative-search-line producing means for producing, based on the measured one of the position, the rotation angle, and the dimension of the object, at least one negative search line which is expected, when at least one of the position, the rotation angle, and the dimension of the object satisfies a predetermined condition, not to intersect an edge of the image of the object represented by the image data, an optical characteristic of the image significantly changing at said edge; and defect judging means for judging, when said at least one negative search line intersects the edge of the image of the object, that the object has an unexpected edge, and thereby judging that the object has a defect.

22. An object inspecting apparatus according to claim 21, wherein the image taking device comprises a telecentric optical system.

23. An apparatus according to claim 22, wherein the telecentric optical system comprises:

a reflecting plane surface which reflects light beams;

a first lens system whose optical axis is perpendicular to the reflecting plane surface and which converges the light beams reflected by the plane surface, to a focal point of the first lens system;

an object supporting device which supports the object at a position intermediate between the reflecting plane surface and the first lens system;

a beam splitter which has a reflecting surface and which is provided on one of opposite sides of the first lens system that is more distant from the reflecting plane surface than the other side;

an orifice which is provided at a position which is plane-symmetric with the focal point of the first lens system with respect to the reflecting surface of the beam splitter;

a light source which is provided on one of opposite sides of the orifice that is more distant from the beam splitter than the other side; and a second lens system which has a focal point at the focal point of the first lens system and which converts the light beams which have been converged by the first lens system and have passed through the beam splitter, into parallel light beams, and wherein the image taking device comprises an image-take sensor which is provided at a position where the image-take sensor takes an image formed by the parallel light beams provided by the second lens system.

24. An apparatus according to claim 21, wherein said at least one negative search line comprises at least one of (a) at least one finite line having opposite ends and (b) at least one closed line.

25. An apparatus according to claim 21, wherein the image taking device comprises a plurality of image-take elements each of which produces an electrical signal representing an optical characteristic value of a corresponding one of a plurality of picture elements of the image of the object, wherein the image-data memory stores, as the image data, the respective optical characteristic values represented by the respective electric signal produced by the image-take elements, such that each of the respective optical characteristic values is associated with a position of a corresponding one of the picture elements in the image of the object, wherein the apparatus further comprises a virtual-point designator which designates an arbitrary virtual point on a virtual screen corresponding to a physical screen defined by the image data stored in the image-data memory; and virtual-point-data calculating means for calculating an optical characteristic value of the designated virtual point based on the respective optical characteristic values of at least two picture elements of the image that correspond to the designated virtual point, and wherein the negative-search-line producing means produces, on the virtual screen, said at least one negative search line.

* * * * *